(12) United States Patent
Lyons

(10) Patent No.: US 9,866,416 B2
(45) Date of Patent: *Jan. 9, 2018

(54) SYSTEM AND METHOD FOR SIMULTANEOUS COMMUNICATION WITH MULTIPLE WIRELESS COMMUNICATION DEVICES

(71) Applicant: Cisco Technology, Inc., San Jose, CA (US)

(72) Inventor: Daniel Joseph Lyons, Medina, OH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/274,215

(22) Filed: Sep. 23, 2016

(65) Prior Publication Data

US 2017/0012809 A1 Jan. 12, 2017

Related U.S. Application Data

(63) Continuation-in-part of application No. 14/860,817, filed on Sep. 22, 2015, now Pat. No. 9,467,986.

(Continued)

(51) Int. Cl.
*H04L 27/26* (2006.01)
*H04B 7/0452* (2017.01)
(Continued)

(52) U.S. Cl.
CPC ....... *H04L 27/2601* (2013.01); *H04B 7/0452* (2013.01); *H04L 5/0007* (2013.01); *H04L 27/2672* (2013.01); *H04W 84/12* (2013.01)

(58) Field of Classification Search
CPC .. H04B 7/0617; H04B 7/0413; H04B 7/0691; H04B 7/0452; H04B 7/0848;
(Continued)

(56) References Cited

U.S. PATENT DOCUMENTS

2004/0196930 A1* 10/2004 Molnar ................ H04B 7/0837
375/344
2005/0047384 A1* 3/2005 Wax .................... H04W 72/046
370/338

(Continued)

*Primary Examiner* — Vineeta Panwalkar

(57) ABSTRACT

Embodiments of the present invention relate to methods and systems for simultaneous communication with multiple wireless communication devices. In some embodiments, a method for simultaneous communication with multiple wireless communication devices includes receiving, using a plurality of antennas at a first wireless station, a plurality of packets, comprised of orthogonal frequency division multiplexing (OFDM) wireless signals, transmitted simultaneously from a plurality of other wireless stations wherein each of the simultaneously transmitted packets includes a plurality of frequency tones, frequency domain transform the received packets, grouping frequency domain transform outputs for each subcarrier, determining a difference between subcarrier groups formed over different sample sets, and determining a set of weights for each subcarrier, wherein the weights are selected such that the first wireless station can at least one of detect or demodulate the received plurality of packets.

15 Claims, 39 Drawing Sheets

Related U.S. Application Data

(60) Provisional application No. 62/065,357, filed on Oct. 17, 2014, provisional application No. 62/174,707, filed on Jun. 12, 2015.

(51) Int. Cl.
*H04L 5/00* (2006.01)
*H04W 84/12* (2009.01)

(58) Field of Classification Search
CPC ............... H04L 27/2601; H04L 5/0007; H04L 27/2672; H04W 84/12
See application file for complete search history.

(56) References Cited

U.S. PATENT DOCUMENTS

| | | | |
|---|---|---|---|
| 2006/0140161 A1* | 6/2006 | Stephens | H04W 88/00 370/338 |
| 2007/0263736 A1* | 11/2007 | Yuda | H04B 7/0615 375/260 |
| 2011/0200126 A1* | 8/2011 | Bontu | H04L 25/0232 375/260 |

\* cited by examiner

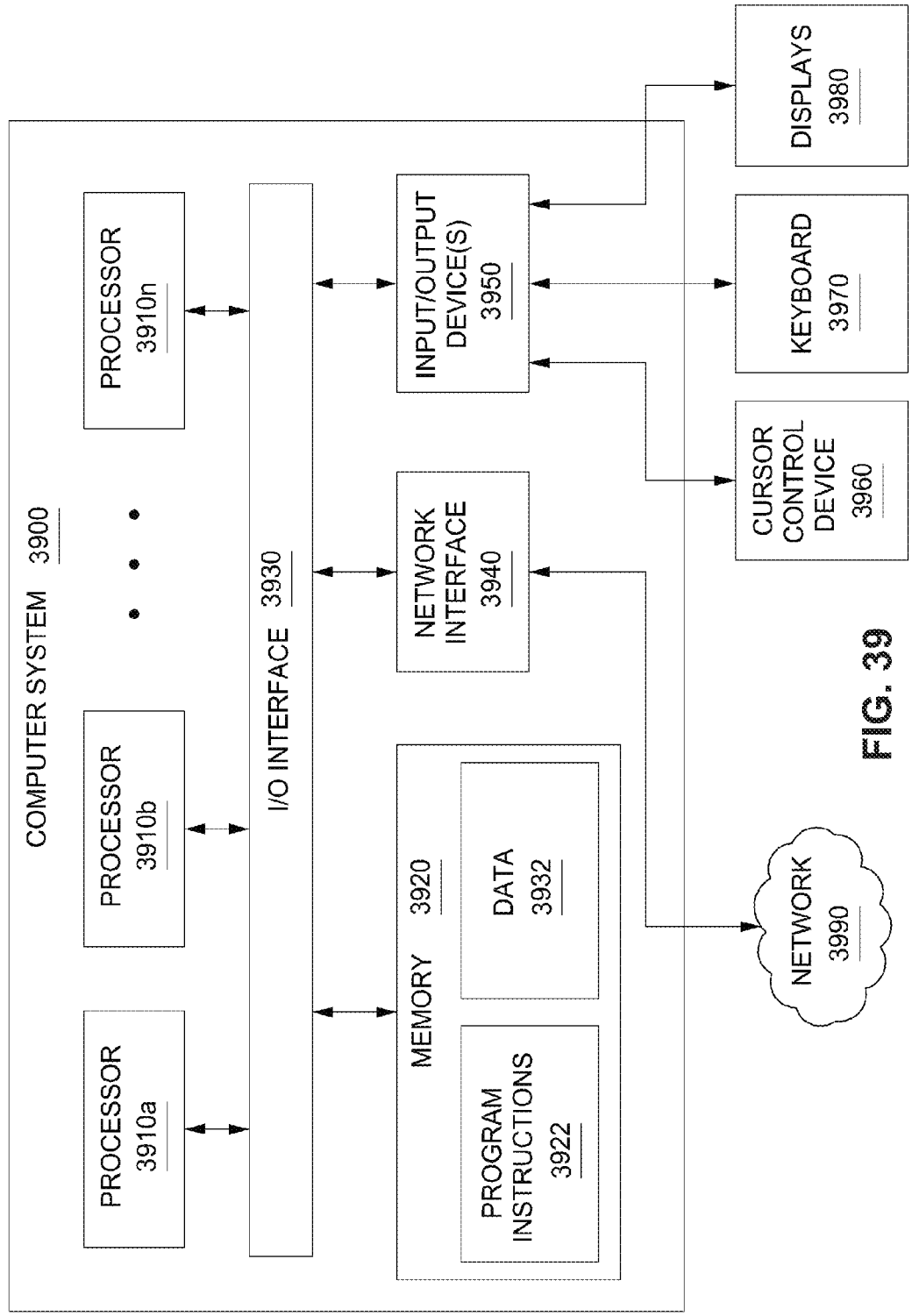

SYSTEM AND METHOD FOR SIMULTANEOUS COMMUNICATION WITH MULTIPLE WIRELESS COMMUNICATION DEVICES

CROSS-REFERENCE TO RELATED APPLICATIONS

This application is a continuation-in-part of U.S. patent application Ser. No. 14/860,817 filed Sep. 22, 2015, which claims benefit of U.S. Provisional Patent Application Ser. No. 62/065,357 filed Oct. 17, 2014 and U.S. Provisional Patent Application Ser. No. 62/174,707 filed Jun. 12, 2015, all of which are incorporated herein by reference in their entireties.

BACKGROUND

Field

Embodiments of the present invention generally relate to methods and systems for simultaneous communication with multiple wireless communication devices.

Description of the Related Art

Wireless local area networks (WLAN)s provide means of transferring data between access points (AP)s and client devices using wireless signaling as defined in the IEEE 802.11 standards. The initial WLAN standards (802.11 a/b/g) were built upon the assumption that only one AP or client device could transmit on a specific channel at a time and the transmitting device would transmit only one set of information at once. Later, the 802.11n standard introduced methods for transmitting multiple information sets simultaneously using a technique known as multiple input multiple output (MIMO), but still with the assumption that only one device could transmit at a time and the information sets would be destined to only one client device or a group of client devices all receiving the same information. Later, the 802.11ac standard introduced methods of permitting an AP to transmit multiple sets of information simultaneously with each information set destined for different client devices using a technique referred to as downlink (DL) multi-user MIMO (MU-MIMO), but still with the limitation that only one device could transmit at once. The advancements in 802.11 technologies have led to peak over the air data rates of up to 6.9333 gigabits per second (Gbps) while utilizing 160 MHz of bandwidth in the 802.11ac standard.

For all these advances in 802.11 technologies, however, WLAN APs are frequently limited in practice to providing under 30 megabits per second (Mbps) of total throughput in many real world scenarios with a high density of client devices. There are many reasons for this practical limitation in throughput in high density scenarios. Firstly, 802.11 uses a distributed scheduling mechanism in which the AP and client devices individually attempt to determine appropriate times to access the wireless medium. If multiple AP or client devices transmit simultaneously, the information is generally lost because the signals interfere. WLAN devices compensate for this by accessing the medium less frequently in an attempt to reduce the probability of additional data loss. This results in an inefficient and frequently unreliable method of sharing the medium in high density environments. Secondly, the MU-MIMO techniques available for WLAN devices are limited in usefulness for solving the primary problems in high density environments. 802.11 supports no uplink (UL) MU-MIMO mechanism which would allow the AP to receive from multiple client devices simultaneously. Although UL MU-MIMO is available in other technologies such as LTE (3GPP TS 36), a similar implementation would require fundamental changes to the 802.11 standard and devices. DL MU-MIMO which is supported by 802.11ac requires frequent updates on the channel between the AP and client devices in order to create a DL MU-MIMO transmission. The gathering of channel information to support DL MU-MIMO happens frequently due to the rapidly changing channel. Without any UL MU-MIMO technique to allow the AP to quickly gather this information, the AP must gather this information from each device individually resulting in decreasing efficiency as more devices are added to the DL MU-MIMO transmission and resulting in a practical limit to the effectiveness of DL MU-MIMO. For these reasons and more, the throughput and reliability of WLAN is generally problematic in high density scenarios. In summary, most of the problems and limitations of WLAN in environments with a high density of client devices stems from the inability to receive multiple WLAN signals simultaneously.

The prevalent implementations of 802.11 utilize orthogonal frequency division multiplexing (OFDM) in which many symbols are transmitted simultaneously with each simultaneously transmitted symbol utilizing a different frequency. The individual frequencies used to transmit the different symbols are referred to as subcarriers. OFDM generally relies on the average signal to interference plus noise ratio (SINR) at the individual subcarriers to be sufficient to permit proper channel estimation and subsequent demodulation. In the case where multiple 802.11 transmissions occur simultaneously and with no prior knowledge of the channel to resolve the transmissions, information from multiple sources contributes to the subcarrier. Given that 802.11 has no inherent mechanism for resolving the information on a subcarrier when the information arises from multiple sources, the information from all sources is generally lost.

One method for overcoming this limitation is for a receiving device with multiple antennas to know what devices will be transmitting, know the change the channel will induce on each subcarrier for the various devices at each of the antennas, and determine appropriate subcarrier weighting vectors to apply to the received signals to isolate each of the various signals. Such a mechanism is available within LTE (3GPP TS 36) in which the base station device can explicitly control when devices are permitted to transmit and has mechanisms for getting channel estimates from the client devices of interest. LTE further enforces tight frequency alignment for devices, tight timing control over devices, and has signal properties permitting the base station to readily gather channel estimates from multiple client devices simultaneously. 802.11, conversely, has a shared scheduling mechanism in which devices seemingly transmit at random. Furthermore, 802.11 has none of the strict frequency alignment, strict timing control, or signal design features permitting channel estimates from various sources to be determined simultaneously. Therefore, overcoming the limitations of being able to receive multiple 802.11 signals simultaneously using conventional techniques is not practical for 802.11.

SUMMARY

Embodiments of the present invention relate to methods and systems for simultaneous communication with multiple wireless communication devices. In some embodiments, a method for simultaneous communication with multiple wireless communication devices includes receiving, using a plurality of antennas at a first wireless station, a plurality of packets, comprised of orthogonal frequency division multiplexing (OFDM) wireless signals, transmitted simultaneously from a plurality of other wireless stations wherein each of the simultaneously transmitted packets includes a plurality of frequency tones, frequency domain transform the received packets, grouping frequency domain transform outputs for each subcarrier, determining a difference between subcarrier groups formed over different sample sets, and determining a set of weights for each subcarrier, wherein the weights are selected such that the first wireless station can at least one of detect or demodulate the received plurality of packets.

In other embodiments, a system for simultaneous communication with multiple wireless communication devices includes a first wireless station comprising a plurality of antennas configured to receive a plurality of packets transmitted simultaneously from a plurality of other wireless stations, a plurality of RF nodes each coupled to at least one of the plurality of antennas, wherein each of the RF nodes performs signal packaging and unpackaging of the plurality of packets, at least one aggregator communicatively coupled to the plurality of RF nodes, wherein the at least one aggregator is configured to frequency domain transform the received packets, group frequency domain transformed outputs for each subcarrier, determine a difference between subcarrier groups formed over different sample sets, and determine a set of weights for each subcarrier, wherein the weights are selected such that the first wireless station can at least one of detect or demodulate the received plurality of packets.

Other and further embodiments of the present disclosure are described below.

BRIEF DESCRIPTION OF THE DRAWINGS

FIG. 39 depicts a computer system that can be utilized in various embodiments of the present invention, according to one or more embodiments of the invention.

Figure 1:
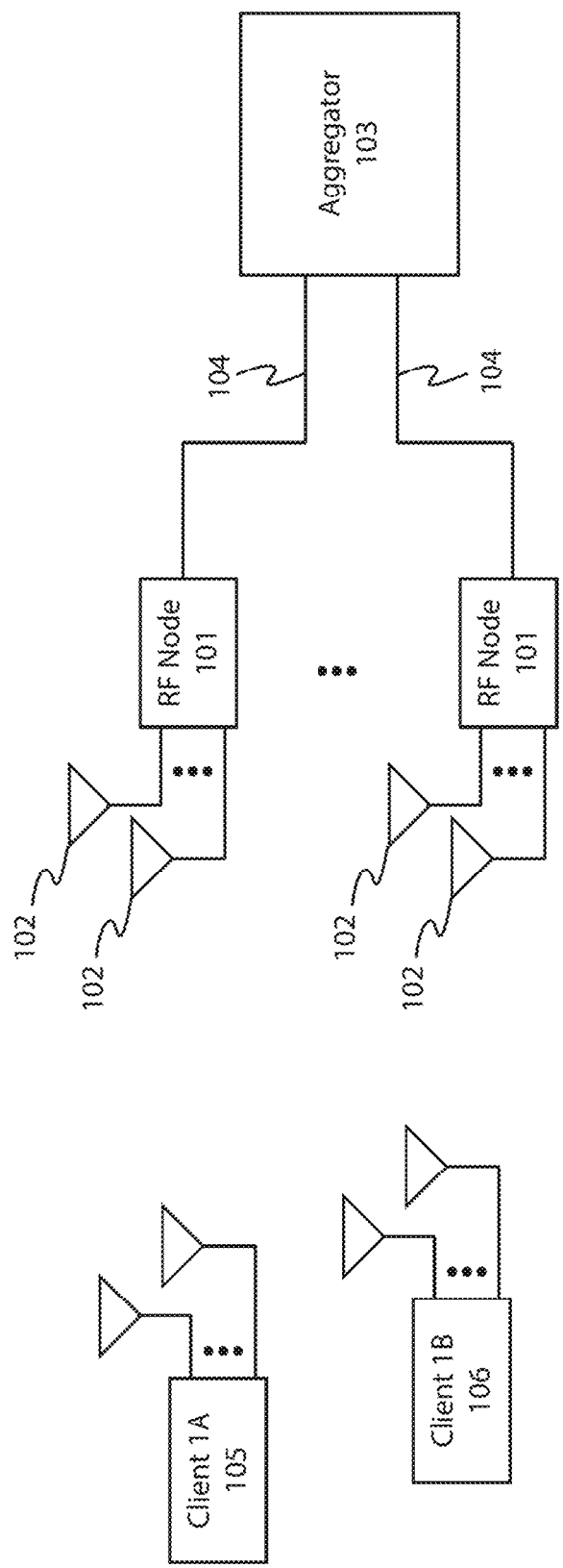
FIG. 1 illustrates an example architecture in which the system comprised of multiple RF nodes and an aggregator communicates with multiple client devices in accordance with some embodiments of the present invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention generally relate to the field of wireless communications. Specifically, some embodiments of the present invention relate to systems and methods for allowing simultaneous communication with multiple wireless local area network (WLAN) client devices to provide throughput and reliability enhancements in environments with a high density of client devices. Embodiments of the present invention have advantages to overcome the performance limitations of conventional WLAN architectures including the ability to receive multiple uplink (UL) signals from different client devices simultaneously without any a-priori channel information, the ability to effectively transmit information to one or more client devices while simultaneously receiving information from one or more other client devices, and the ability to substantially increase the number of simultaneous UL and downlink (DL) information sets that may simultaneously be transmitted and received in comparison to conventional architectures.

Furthermore, embodiments of the present invention are compatible with existing WLAN devices and protocols used by such devices. Particularly, some embodiments of the present invention relate to PHY layer (i.e., OSI Physical Layer 1) methods for enabling UL multi-user MIMO (MU-MIMO), efficient DL MU-MIMO, simultaneous UL and DL transmissions, interference reduction, and architectures in which one or more remote radio frequency (RF) nodes provide signals to a centralized unit that performs the PHY layer processing.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In some embodiments, individual 802.11 OFDM transmissions are demodulated when multiple 802.11 OFDM transmissions occur simultaneously. Each of the OFDM tones observed across multiple receive antennas can be envisioned as a subcarrier vector. The cumulative subcarrier vector consists of the sum of individual subcarrier vectors with each individual subcarrier vector associated with an individual source. Although there is no inherent mechanism within 802.11 permitting the individual subcarrier vectors to be directly determined when multiple 802.11 transmissions occur simultaneously, embodiments consistent with the present invention utilize the fact that the individual subcarrier vectors for an 802.11 source will remain constant under specific conditions whereas other subcarrier vectors will generally change. By subtracting different cumulative subcarrier vectors and therefore eliminating the vector component associated with an 802.11 signal of interest having a constant subcarrier vector, embodiments consistent with the present invention are able to build a vector subspace consisting of interfering subcarrier vectors only. By further finding a weighting vector orthogonal to the subspace of interfering subcarrier vectors and applying the weighting vector to the cumulative subcarrier vector, embodiments consistent with the present invention are able to extract and demodulate an individual 802.11 transmission in the presence of the interference sources. The ability to resolve multiple interfering 802.11 signals leads directly to further benefits including the enablement of UL MU-MIMO, efficient DL MU-MIMO, and overall interference reduction providing significantly increased system capacity.

The disclosure described herein is a system and associated methods allowing for simultaneous communication to multiple 802.11 devices. As illustrated in FIG. 1, one such embodiment consists of one or more remote RF nodes 101 with one or more antennas 102 at a first wireless station each used to transmit and receive wireless signals to other wireless stations and/or multiple client devices simultaneously. Each RF node 101 would be connected to an aggregator 103 via a wired connection 104 permitting the aggregator 103 to be able to retrieve signals from and send signals to the attached RF nodes 101. The embodiment described herein pertains to transferring digital baseband signal information via an Ethernet connection, but the signal could be passed between the RF node 101 and aggregator 103 via various other forms such as, but not limited to, the transfer of analog signals being sent using fiber optic cable. The aggregator 103 would perform much of the signal processing required to transmit signals to and receive signals from the various client devices. The RF node 101 would convert between an RF signal and the signal information format used by the aggregator 103.

Figure 2:
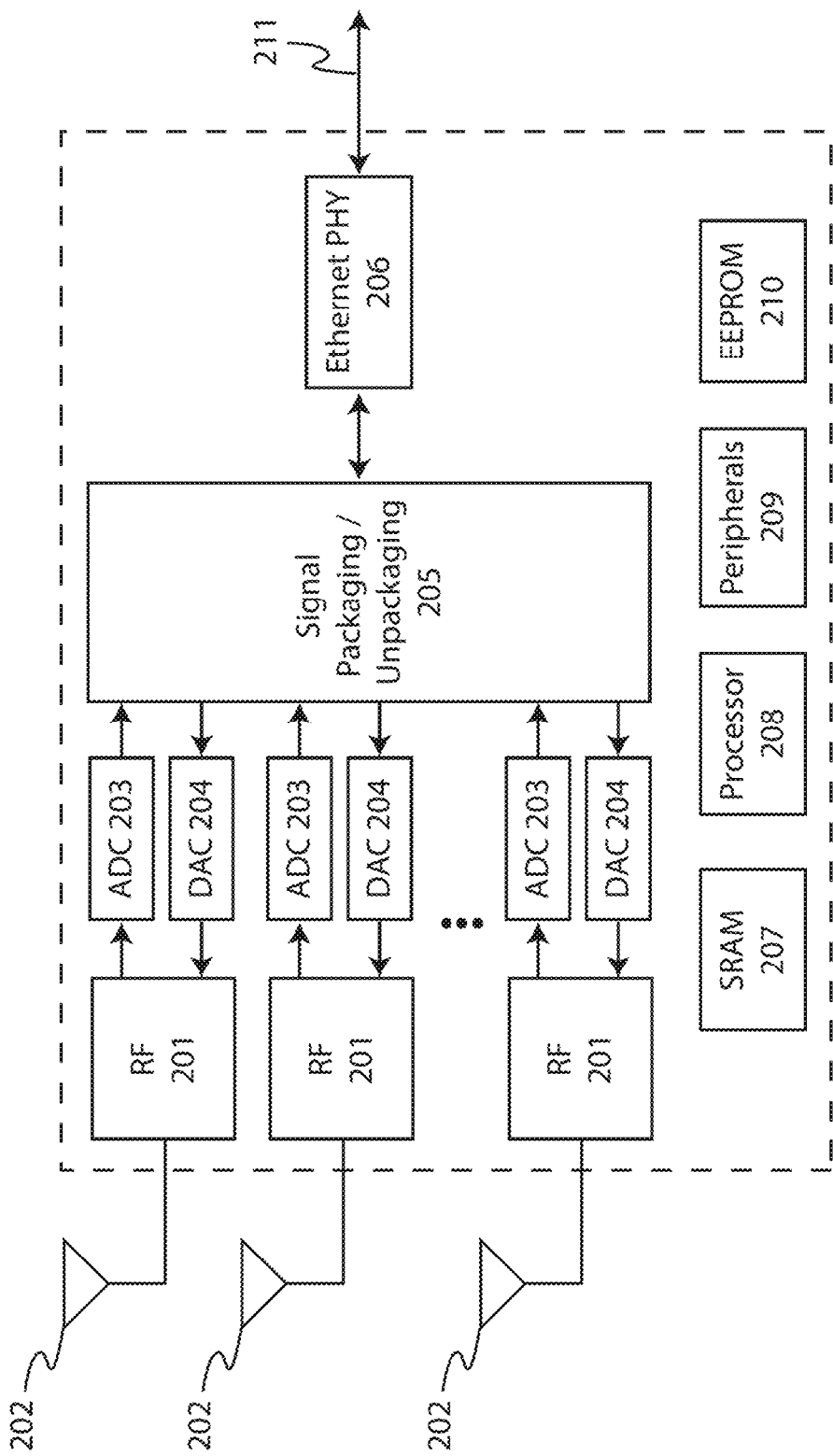
FIG. 2 is a block diagram of a RF node in accordance with some embodiments of the present invention.

FIG. 2 illustrates a possible embodiment of an RF node. The RF node would connect to one or more antennas 202. One or more RF sections 201 would convert between the RF signals present at the antenna(s) 202 and baseband signals either captured by an analog to digital converter (ADC) 203 or supplied by a digital to analog converter (DAC) 204. A data encapsulation unit 205 would perform signal packaging and unpackaging. Specifically, the data encapsulation unit 205 would convert between the ADC 203 and DAC 204 interface to a format capable of low latency transport across a wired medium. For signals received from the antennas 202 by the RF node, the data encapsulation unit 205 would encapsulate the digitized signal information and convey other relevant information such as timestamps and RF gain settings so that the signal could be appropriately reconstructed at the aggregator. For signals received from the aggregator via Ethernet PHY 206, the data encapsulation unit 205 would extract the data along with relevant information such as timestamps and RF gain settings and apply the information to the RF section(s) 201 and DAC(s) 204 to ensure the desired output signal is output from the RF node to the antenna(s) 202. The RF node would connect to the wired medium 211 via an Ethernet PHY 206. The RF node could also include common items such as EEPROM 210, SRAM 207, a processor 208, and various peripherals 209.

Figure 3:
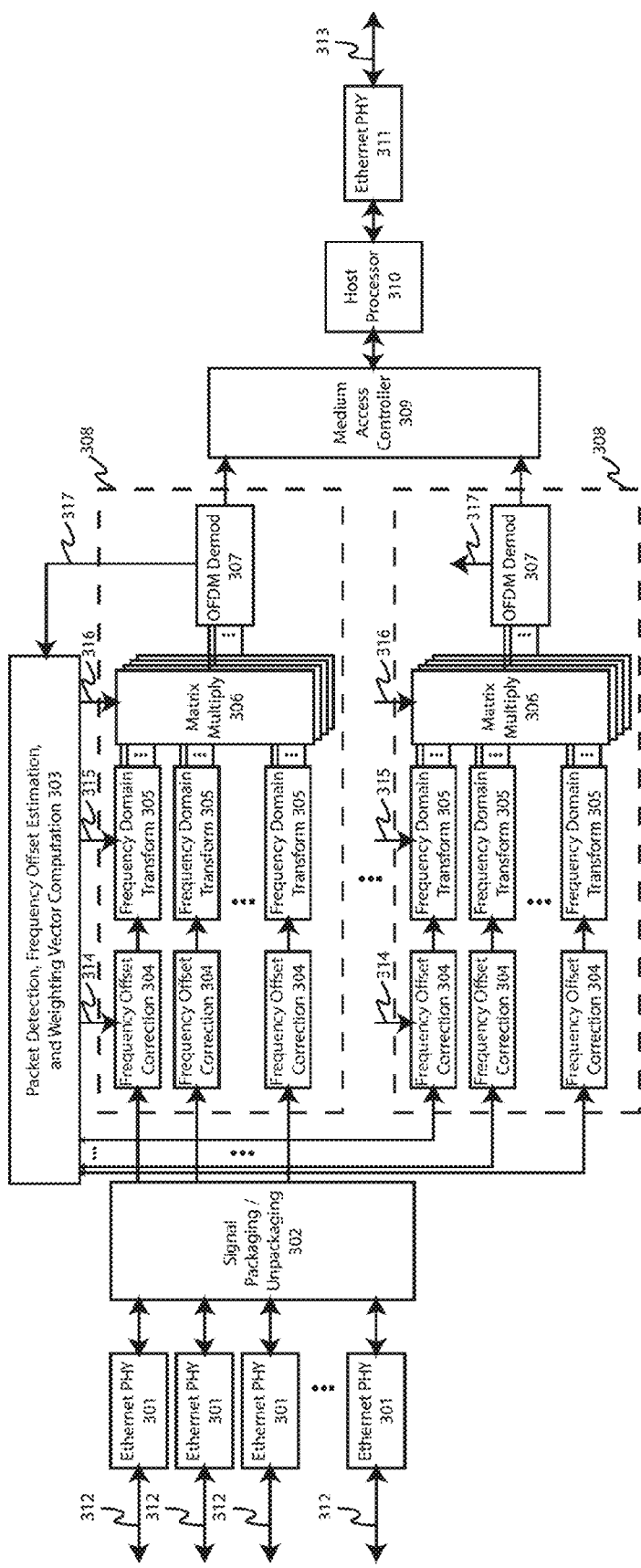
FIG. 3 is a block diagram of an aggregator in accordance with some embodiments of the present invention.

FIG. 3 illustrates an embodiment of the aggregator. To simplify the explanation, the data flow for the aggregator illustrates the processing blocks that would be used to process incoming 802.11 signals rather than showing both the signal reception and generation steps. Those skilled in the art would realize similar inverse operations would be required in practice for transmitting signals. The aggregator would be connected to one or more RF nodes via wired connections 312 (211 in FIG. 2) with one or more Ethernet PHYs 301 (206 in FIG. 2). A data encapsulation unit 302 would convert between an encapsulated format used by the RF node and a format useable for signal processing. The received signals would be shared between various processing blocks used for packet demodulation 308 as well as packet detection and frequency offset estimation 303. The packet detection and frequency offset estimation block 303 would generally run continuously looking for the presence of 802.11 packets to decode. When a packet is detected, an individual packet decoding block 308 would start the decoding process. The packet decoding block 308 would be provided with initial information from the packet detection and frequency offset estimation block 303 including packet frequency offset information 314, the initial packet timing estimate 315, and initial weighting vector information 316 used to separate the packet of interest from other interfering signals. The frequency offset block 304 would apply a frequency offset correction to compensate for any difference between the client devices center frequency and the center frequency of the RF node and aggregator system. A frequency domain transform 305 would then be performed to transform the input time domain signal into frequency domain information. The frequency domain transform 305 could be a Fast Fourier Transform (FFT) as is common in 802.11 processing, but could also be a modified transform incorporating a windowing function prior to the time to frequency conversion. Such a modified transform has inherent advantages in the presence of interring 802.11 signals with different frequency offsets as would be common in a high density environment. Frequency domain transforms within an individual packet decoding block 308 would produce outputs at subcarriers populated for the incoming 802.11 signal type. For each populated subcarrier for the incoming 802.11 signal, the corresponding frequency domain transform 305 outputs would be grouped into a vector specific to this subcarrier index. The vector for each subcarrier index would then multiply a matrix 306 using a weighting vector selected to isolate the packet of interest from other interference sources. This matrix multiplication 306 would be repeated for populated subcarriers within the 802.11 signal using a potentially unique weighting vector for each subcarrier index. The symbol estimates would then be known for subcarrier indices and could be passed to an OFDM demodulation block 307 which would incorporate standard processing items such as pilot tracking, constellation de-mapper, de-interleaving, forward error correction decoding, and all other items required to demodulate an 802.11 OFDM signal. The symbol state information produced by the OFDM demodulation 307 could optionally be fed back 317 to improve the weighting vector computation used to separate the packets of interest. Additionally, symbol state information of packets currently being generated by the aggregator and channel state information between the individual nodes could be used to improve the weighting vector as well. The output of the OFDM demodulation 307 would be provided to a medium access controller (MAC) 309 which would provide further decoding of the information, provide interaction to higher networking layers, and determine appropriate times to access the channel. Unlike a convention MAC which is capable of processing just one packet at a time, the MAC 309 within the aggregator would be designed to accept multiple packets simultaneously, coordinate the transmission of multiple packets simultaneously, and simultaneously accept incoming packets while scheduling the transmission of outgoing packets. The MAC 309 would connect to a host processor 310 which would perform higher layer operations and interface to the network via an Ethernet PHY 311. The Ethernet PHY 311 would connect to a wired connection.

Figure 4:
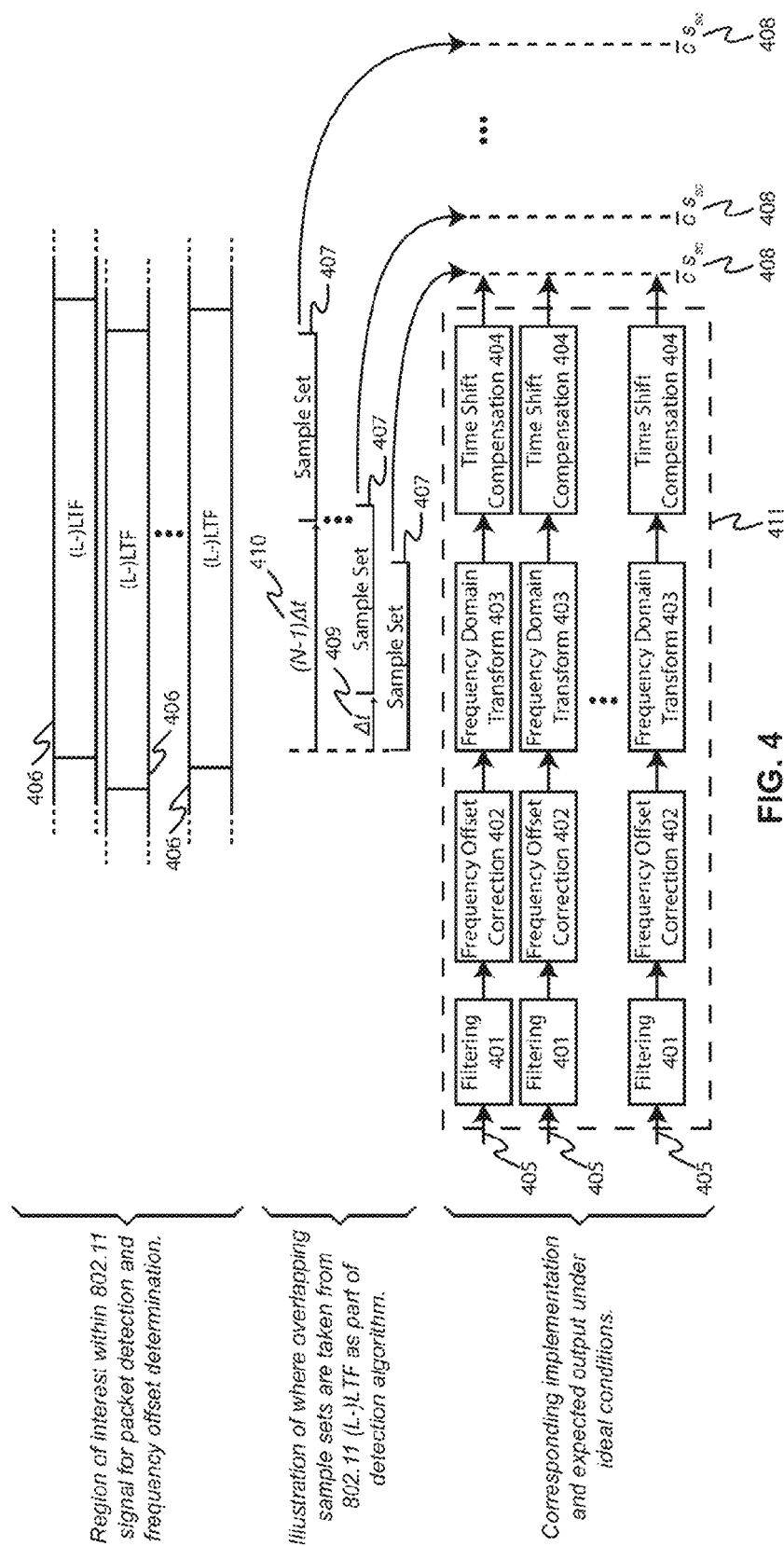
FIG. 4 depicts the subcarrier vector computation which is used in various algorithms throughout this disclosure and explains the properties of its output in the presence of OFDM signals in accordance with some embodiments of the present invention.

FIG. 4 illustrates the subcarrier vector computation 411 which is a fundamental processing block used in both the packet detection and packet demodulation processes. FIG. 4 additionally illustrates the long training field (LTF in 802.11a/g, L-LTF in 802.11n/ac) within the 802.11 signal that is used for packet timing detection and frequency offset determination and how the proposed method utilizes certain properties of the (L-)LTF for packet detection. The LTF is also referred to as a long symbol. Properties of the signal and algorithm are explained in the context of no interfering signals to simplify the explanation in this illustration. The incoming signals 405 are first filtered 401 to obtain the desired bandwidth that will be used for later processing steps. The output of the filters 401 are passed to a frequency offset correction 402 block which corrects for a specified frequency offset in the incoming signal. The same frequency offset would generally be applied to incoming signals by the various frequency offset correction 402 blocks. The frequency corrected signals are then passed through a frequency domain transform 403. The frequency domain transform 403 will accept a fixed number of continuous samples to form a sample set 407 spaced at regular intervals of $\Delta t$ 409. As is true of all OFDM symbols, the signal within the (L-)LTF is cyclical. Assuming the proper frequency offset was applied by the frequency offset correction 402, the output of the frequency domain transform 403 for all samples sets contained with the (L-)LTF will be the same with the exception that the time shift between samples sets will result in linear phase change across the bandwidth of the signal in the frequency domain. The time shift compensation 404 applies a linear phase change opposite of that induced by the time shift of the signal. Therefore, the resulting output of the time shift compensation 404 will be the same for all sample sets that are contained within the (L-)LTF. The output at each subcarrier is given by $$\bar{c}s$$

where $\bar{c}$ is the channel response vector corresponding to the channels between the client device and each of the receive antennas and s is the symbol state transmitted by client device during the (L-)LTF at the particular subcarrier.

Although the properties and results described here would be applicable to all the OFDM symbols within the 802.11 packet, the (L-)LTF is used for detection as it has several features that make it unique for detection purposes. First, only the short training field (STF in 802.11a/g, L-STF in 802.11n/ac) and the (L-)LTF fields are 8 microseconds in duration whereas the remaining OFDM symbols are 4 microseconds or less in duration. The STF is also referred to as a short symbol. The subcarrier vector computation 411 will output a constant vector during the (L-)STF and (L-)LTF for more intervals than the remaining OFDM symbols. Second, the (L-)LTF has approximately 4 times the number of subcarriers populated than the (L-)STF. By excluding any subcarriers used by the (L-)STF, the algorithm is capable of discerning the (L-)LTF from the (L-)STF.

It is fully expected that the various (L-)LTF 406 signals received on the various antennas would be delayed in time relative to each other due to differences in signal propagation time between the client device and various RF nodes. This will manifest itself by the period over which the signal remains constant being different for the various outputs. The packet detection algorithm inherently deals with this phenomenon, however, by assuming that detection of a constant shifted in time is actually two different signals. This detection of two different packets which is actually just one may lead to two different demodulation blocks decoding the same packet using different time shifts. If the information is deemed to be the same through the demodulation process, however, the information resulting from the two different demodulation processes can be combined resulting in improved performance or one of the demodulation processes can be stopped and the weighting vectors for the surviving demodulation process can be recalculated using different time offsets per path to effectively re-align the signals in time prior to demodulation.

Figure 5:
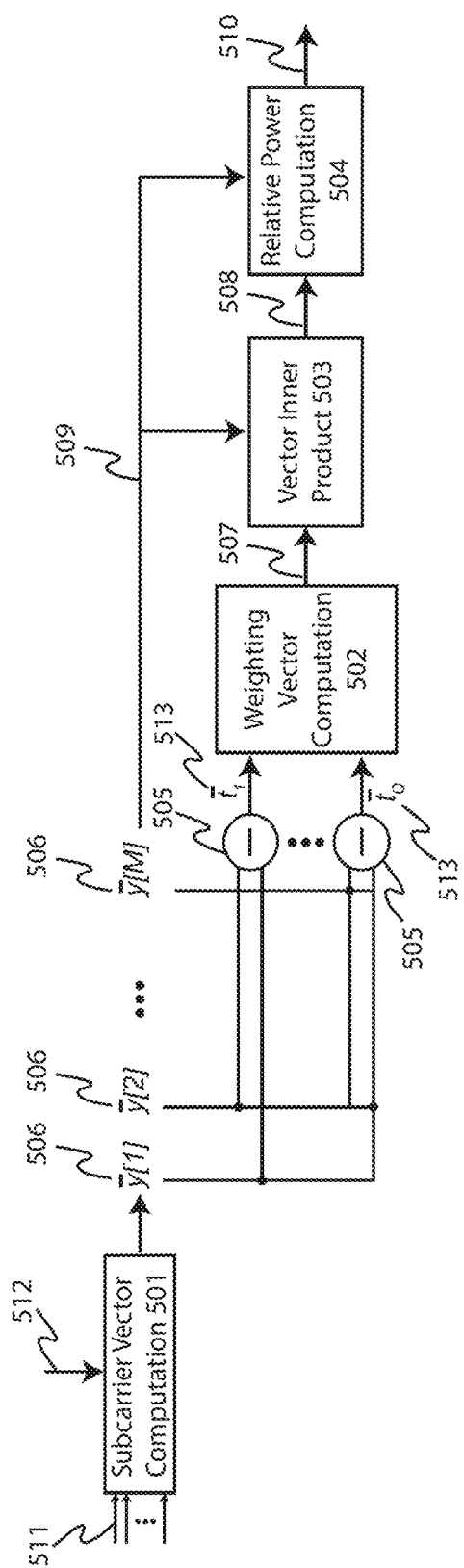
FIG. 5 provides illustration of the method of detecting 802.11 signals in the presence of other interfering signals in accordance with some embodiments of the present invention.

FIG. 5 illustrates the packet detection and frequency offset determination algorithm. The subcarrier vector computation 501 was described previously in FIG. 4 and accepts a specified frequency offset and outputs a vector of subcarrier estimates. The subcarrier vector computation outputs vectors 506 at regular intervals. Unlike the description presented in FIG. 4, the algorithm is now explained in the context of both the signal of interest and other interfering signals being present. Assuming we are at the (L-)LTF section of the packet and have the correct frequency offset, the output vectors 506 will have a constant vector component for the duration of the (L-)LTF corresponding to the desired signal plus additional non-constant vector components corresponding to interfering sources which could be other 802.11 signals as well as non 802.11 signals. For each subcarrier, these vectors may be represented by $$\bar{y}[m] = \bar{c}s + \sum_{i=1}^{I} \bar{c}_{INT,i} x_i[m]$$

where $\bar{y}[m]$ is the signal vector 506 at a particular time instant, $\bar{c}$ is the channel response vector for the desired signal, s is the (L-)LTF symbol transmitted by the client at that subcarrier, I is the total number of interferers, $\bar{c}_{INT,i}$ is the channel response vector for the $i^{th}$ interference source, and $x_i[m]$ is the frequency domain transform of the $i^{th}$ interference source signal at the current subcarrier. The various output vectors 506 will be a linear combination of the desired channel vector ($\bar{c}$) and all the interfering channel vectors ($\bar{c}_{INT,1}, \bar{c}_{INT,2}, \ldots, \bar{c}_{INT,I}$). Subtracting different combinations of these vectors 505 yields an intermediate set of Q vectors ($\bar{t}_1, \ldots, \bar{t}_Q$). Because the desired signal $\bar{c}$ s within $\bar{y}[m]$ is constant, the resultant vectors ($\bar{t}_1, \ldots, \bar{t}_Q$) produced by finding the difference in Q combinations of $\bar{y}[m]$ will have no component of the desired channel response $\bar{c}$ but will be a linear combination of the interfering vectors. For example, subtracting $\bar{y}[m_1]$ from $\bar{y}[m_2]$ provides $$\bar{y}[m_2] - \bar{y}[m_1] = \sum_{i=1}^{I} \bar{c}_{INT,i}(x_i[m_2] - x_i[m_1])$$

which is a linear combination of the interfering channel vectors only. The weighting vector computation 502 accepts the intermediate set of vectors ($\bar{t}_1, \ldots, \bar{t}_Q$) and finds a vector orthogonal to the interfering vector space but not orthogonal to the desired channel response $\bar{c}$. This vector may be determined by starting with $\bar{y}[m]$, using Gram-Schmidt orthogonalization to produce an orthonormal basis ($\bar{v}_1, \ldots, \bar{v}_Q$) from ($\bar{t}_1, \ldots, \bar{t}_Q$), and then subtracting the components of $\bar{y}[m]$ that lie within the span of ($\bar{v}_1, \ldots, \bar{v}_Q$) according to $$\bar{z} = \bar{y}[m] - \sum_{q=1}^{Q} \bar{v}_q^h \bar{y}[m]$$

where $\bar{z}$ is the computed vector orthogonal to the interference channel vectors and h denotes conjugate transpose. The weighting vector is formed by normalizing according to $$\bar{w} = \frac{\bar{z}}{\sqrt{\bar{z}^h \bar{z}}}.$$

$\bar{w}$ can be used to determine the energy in $\bar{y}[m]$ orthogonal to the interfering sources relative to the total energy in $\bar{y}[m]$ using $$\frac{\bar{w}^h \bar{y}[m]}{\sqrt{\bar{y}^h[m]\bar{y}[m]}}$$

which is computed in the relative power computation 504. The above detection steps resulting in the relative power output 510 are repeated at various frequency inputs 512 to detect where the relative power computation produces peaks across the spectrum of possible client device frequency offsets. Additionally, to properly resolve between the (L-)LTF and other packet symbols, the input vectors 506 should be taken across a time span approaching 8 microseconds. Under these conditions and avoiding subcarriers used by the (L-)STF allows the algorithm to properly detect the (L-)LTF.

The disclosed method is able to detect and resolve 802.11 OFDM packets by the end of the (L-)LTF. This is advantageous in that the demodulation of the packet can begin immediately after the (L-)LTF and therefore avoid any latency in decoding the packet. The method relies on some amount of frequency or timing offset between multiple packets to be able to resolve the individual packets. In practice, the disclosed method was found to be capable of resolving packets with as little as 200 Hz of frequency offset separation between packets or as little as 300 nano-seconds of timing separation between packets. Given the 802.11 standards allows for up to +/−118 kHz of frequency error for a device, the likelihood of having multiple packets within 200 Hz of frequency offset is relatively low. In the event that two packets are so closely aligned in timing and frequency as to be unresolvable by the detection algorithm, the algorithm is still capable of detecting and decoding additional packets that have adequate frequency and/or timing difference from the two unresolvable packets.

Figure 6:
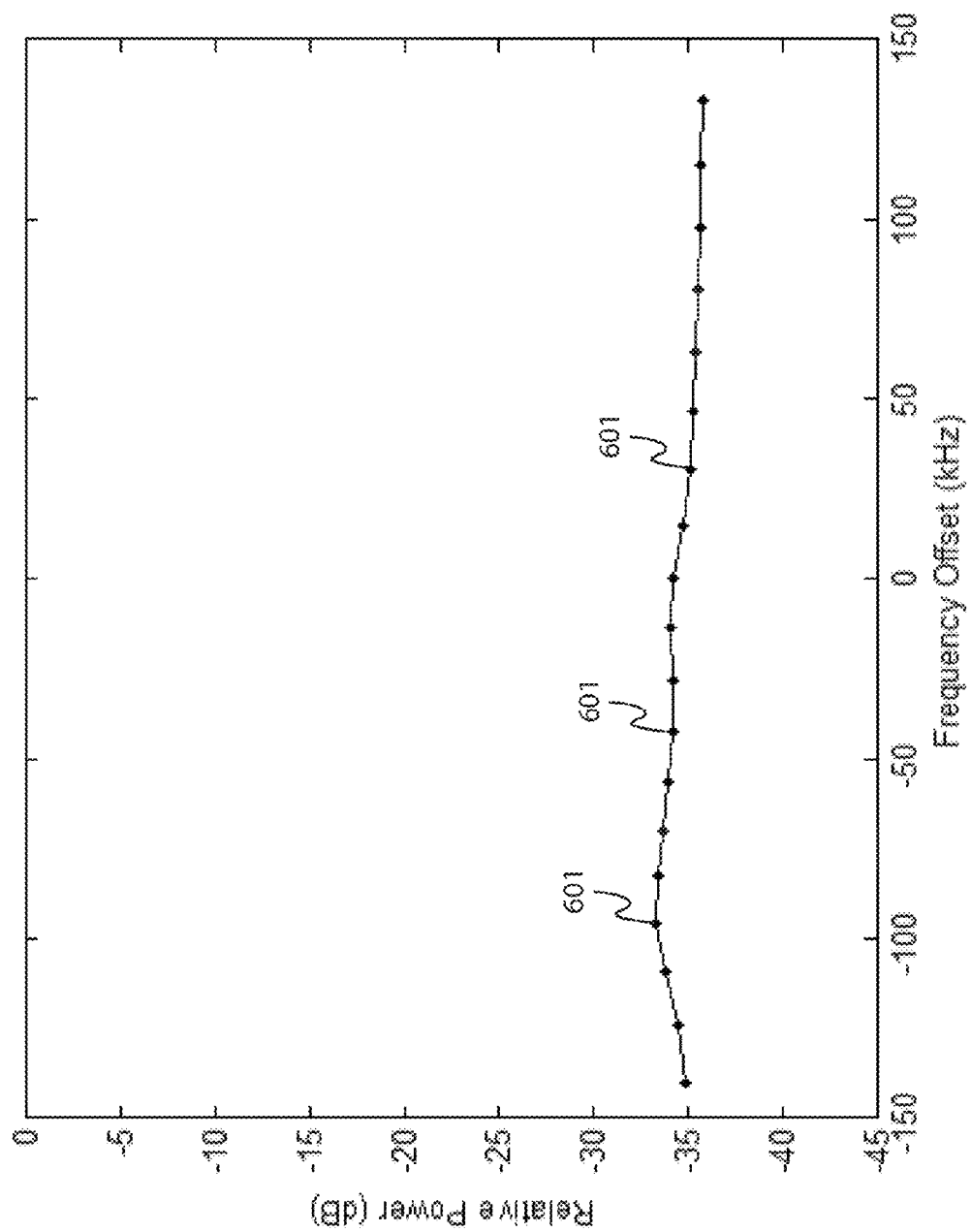
FIG. 6, FIG. 7, FIG. 8, and FIG. 9 provide results showing the output of the packet detection method in accordance with some embodiments of the present invention.
Figure 7:
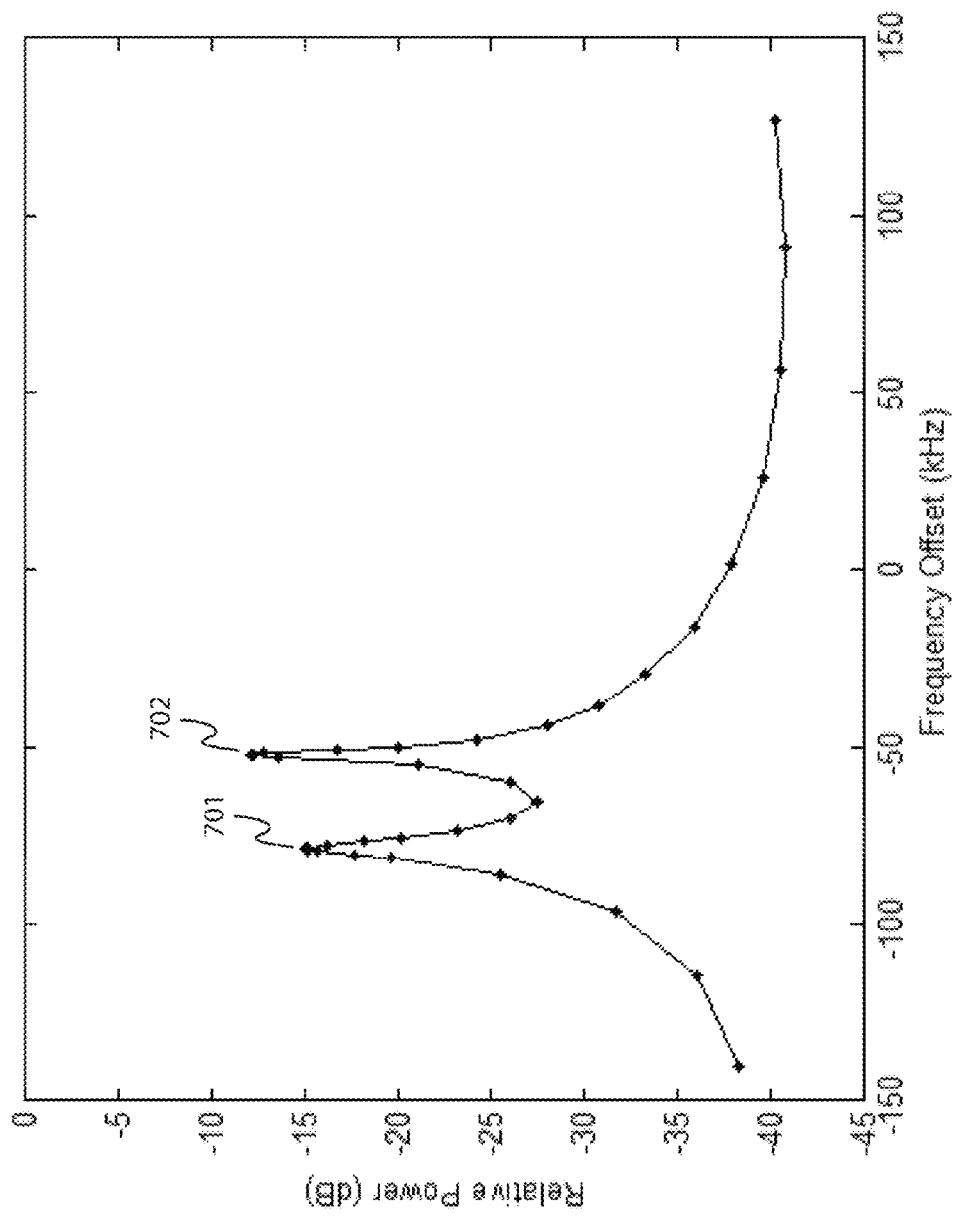
Figure 8:
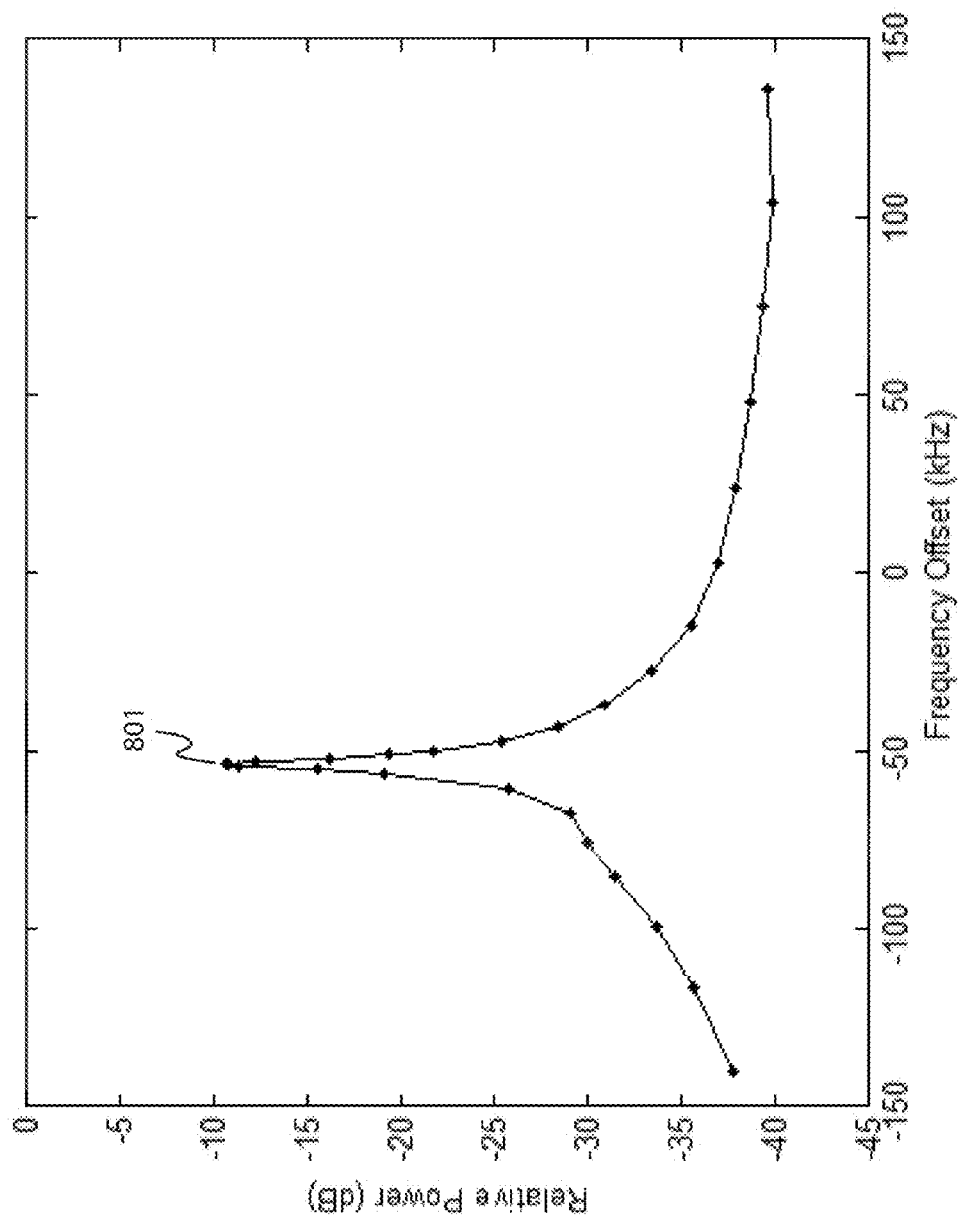
Figure 9:
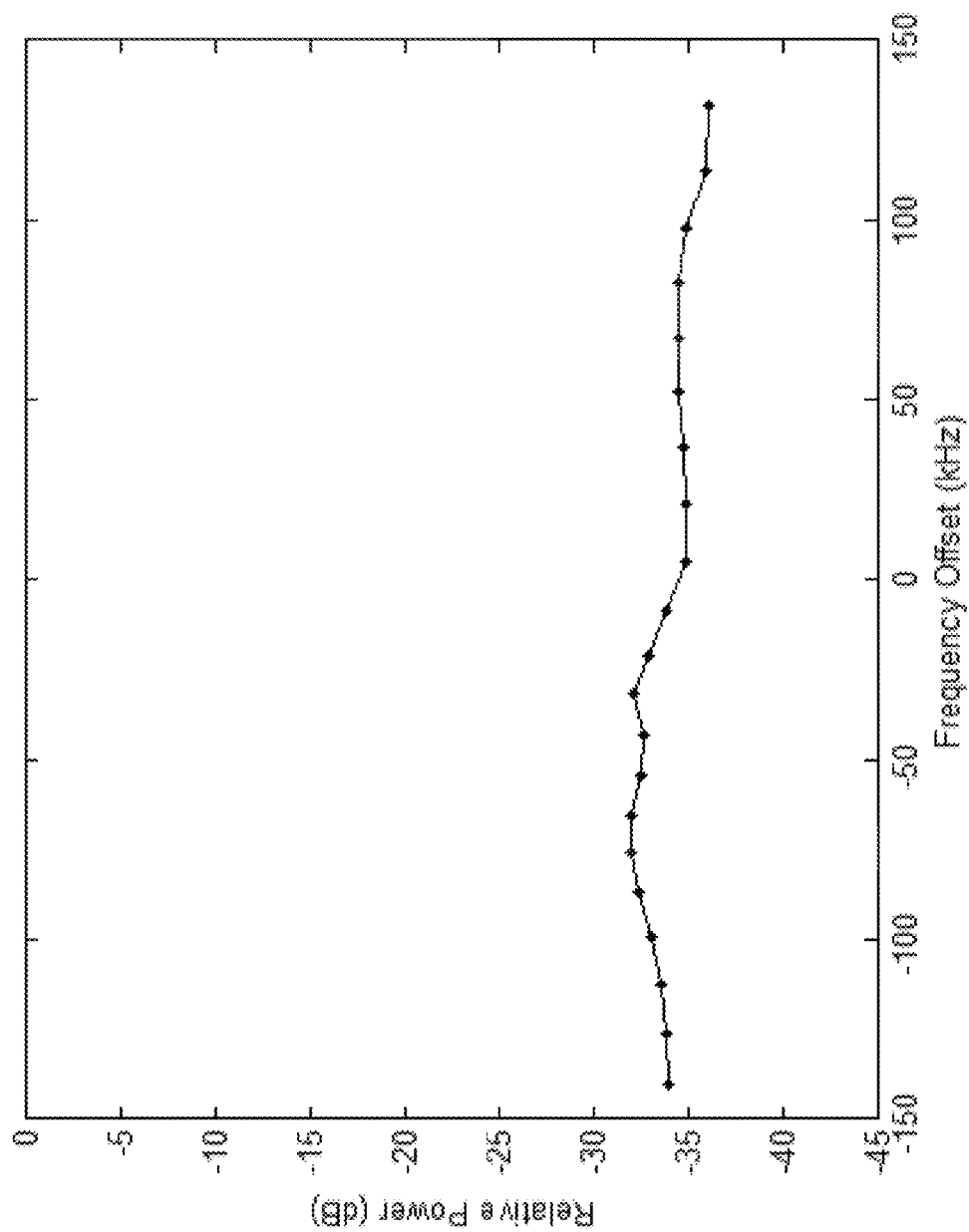

FIG. 6, FIG. 7, FIG. 8, and FIG. 9 show results of using the packet detection algorithm. In all cases presented, there were three 802.11 OFDM packets received within 1 microsecond of each other and each with a unique frequency offset. FIG. 6 illustrates the output of the packet detection algorithm converted to decibels and the algorithm performed at discrete points 601 across the frequency range of interest. In this case, packet timing is roughly 500 nanoseconds prior to the (L-)LTF of the first packet and no noticeable peaks are detected. FIG. 7 illustrates the packet detection algorithm at approximately the timing position where the samples sets used for the detection algorithm are centered in the (L-)LTF for two of the three packets. In this case, we see clear peaks 701 and 702 in the spectrum output indicating there are two potential packets present. FIG. 8 illustrates the packet detection algorithm at approximately the timing position where the samples sets used for the detection algorithm are centered in the (L-)LTF of the third packet. At this point, we see only one peak 801 signifying there is only one packet of interest at this timing offset. The frequency offset between the packet in FIG. 8 801 and the packet in FIG. 7 at 702 are very small and yet the algorithm is properly able to resolve between the two packets due to a timing offset between the two packets. FIG. 9 illustrates the packet detection algorithm output after the (L-)LTF of all packets has passed in which no peaks can be seen in the spectrum output as expected.

Figure 10:
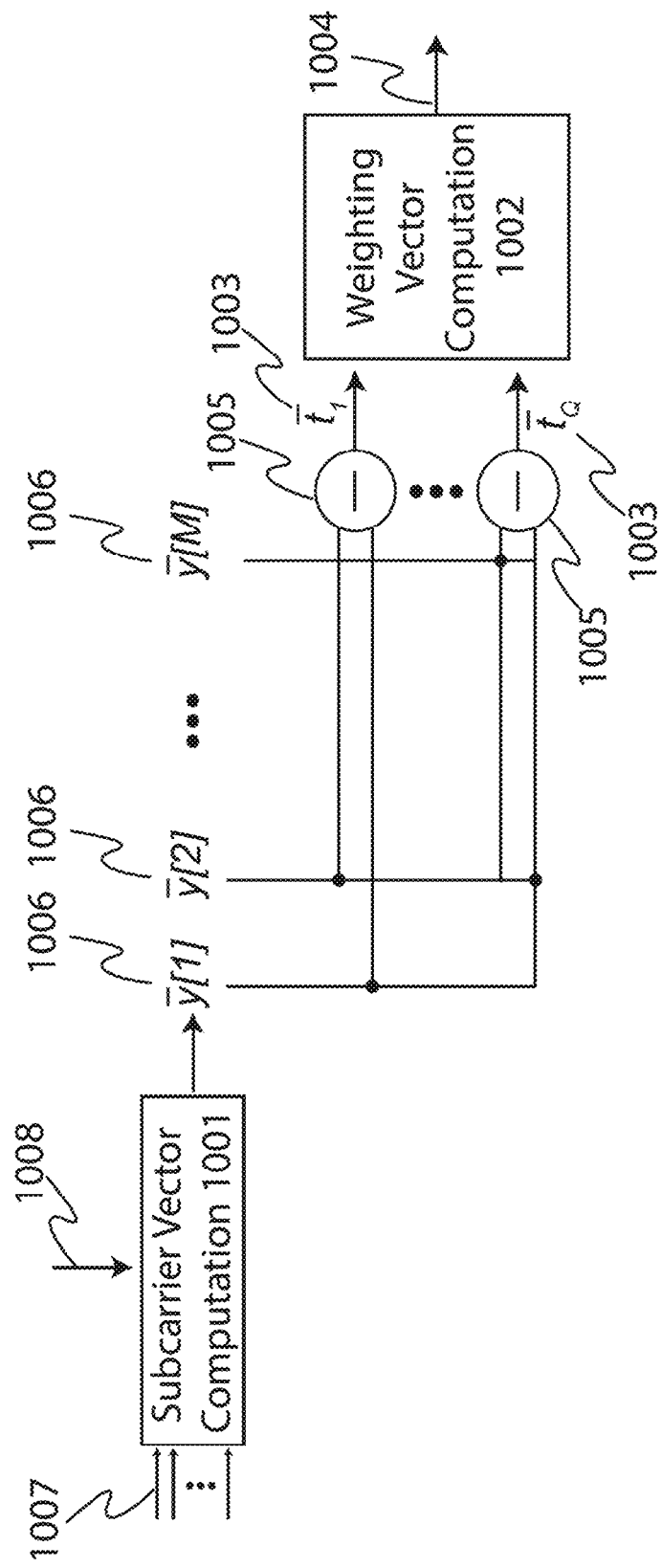
FIG. 10, FIG. 11, FIG. 12, FIG. 13, and FIG. 14 provide illustration of the methods of determining the weighting vector to resolve individual packets prior to demodulation in the presence of other interfering signals in accordance with some embodiments of the present invention.

FIG. 10 illustrates the method used for determining the initial weighting vector to be applied as part of the OFDM demodulation process. The process follows a similar procedure as outlined for the packet detection process but with several differences. The transform vector computation 1001 outputs vectors 1006 at regular intervals. The subcarrier vector computation 1001 is similar to that used as part of the detection algorithm described in FIG. 4 with the noted exception that the bandwidth of the filter selected by 401 is always equal to or greater than the signal bandwidth. Assuming we are at the (L-)LTF section of the packet and have the correct frequency offset, the output vectors 1006 will have a constant vector component for the duration of the (L-)LTF corresponding to the desired signal plus additional non-constant vector components corresponding to interfering sources which could be other 802.11 signals as well as non 802.11 signals. For each subcarrier, these vectors may be represented by $$\bar{y}[m] = \bar{c}s + \sum_{i=1}^{I} \bar{c}_{INT,i} x_i[m]$$

where $\bar{y}[m]$ is the signal vector 1006 at a particular time instant, $\bar{c}$ is the channel response vector for the desired signal, s is the (L-)LTF symbol transmitted by the client at that subcarrier, I is the total number of interferers, $\bar{c}_{INT,i}$ is the channel response vector for the $i^{th}$ interference source, and $x_i(t)$ is the frequency domain transform of the $i^{th}$ interference source signal at the current subcarrier. The various output vectors 1006 will span the space of both the desired signal $\bar{c}$ s and all the interfering sources $\sum_{i=1}^{I} \bar{c}_{INT,i} x_i[m]$. By subtracting different combinations of these vectors 1005 yields an intermediate set of Q vectors $(\bar{t}_1, \ldots, \bar{t}_Q)$. Because the desired signal $\bar{c}$ s within $\bar{y}[m]$ is constant, the resultant vectors $(\bar{t}_1, \ldots, \bar{t}_Q)$ produced by finding the difference in Q combinations of $\bar{y}[m]$ will have no component of the desired channel response $\bar{c}$ but will be a linear combination of the interfering vectors. For example, subtracting $\bar{y}[2]$ from $\bar{y}[1]$ provides $$\bar{y}[1] - \bar{y}[2] = \sum_{i=1}^{I} \bar{c}_{INT,i}(x_i[1] - x_i[2])$$

which is a linear combination of the interfering channel vectors only. The weighting vector computation 1002 accepts the intermediate vectors $(\bar{t}_1, \ldots, \bar{t}_Q)$ and finds a vector orthogonal to the interfering vector space but not orthogonal to the desired signal space. This vector may be determined in practice starting with $\bar{y}[m]$, using Gram-Schmidt orthogonalization to produce an orthonormal basis $(\bar{v}_1, \ldots, \bar{v}_Q)$ from $(\bar{t}_1, \ldots, \bar{t}_Q)$, and then subtracting the components of $\bar{y}[m]$ that lie within the span of $(\bar{v}_1, \ldots, \bar{v}_Q)$ according to $$\bar{z} = \bar{y}[m] - \sum_{q=1}^{Q} \bar{v}_q^h \bar{y}[m]$$

where $\bar{z}$ is a the vector orthogonal to the interference channel vectors. The weighting vector is formed by normalizing $\bar{z}$ according to $$\bar{w} = \frac{\bar{z}}{\sqrt{\bar{z}^h \bar{z}}}$$

where $\bar{w}$ is used to isolate the desired information from interfering signals at the computed subcarrier index. Although the computation above shows the computation of a single weighting vector, the process can easily be extended to produce multiple weighting vectors rather than just one. Multiple weighting vectors are used for the demodulation of 802.11n/ac packets which may have more than one spatial stream and therefore use multiple inputs per subcarrier as part of the demodulation process. In the case where multiple weighting vectors are required, we would want to ensure that each weighting vector maintains the property of being orthogonal to the interfering channel vectors. Assume there are N input signals corresponding to N antennas receiving a signal simultaneously. Assume the dimension of the interfering vector space is Q. There will therefore be N-Q possible weighting vectors to provide N-Q unique subcarrier inputs to the OFDM demodulation. The N-Q weighting vectors could be found by starting with the Q orthonormal vectors $(\bar{v}_1, \ldots, \bar{v}_Q)$ and then extending the Gram-Schmidt orthogonalization to determine an additional N-Q orthonormal vectors. These N-Q vectors would each be orthogonal to each other as well as the interfering vectors space.

The method used to determine the initial weighting vector discussed previously can be formed by the end of the (L-)LTF which is significant as it allows the proceeding signal field OFDM symbol(s) to be demodulated as they arrive. The signal field of the Wi-Fi packet contains information related to the length of the packet and modulation parameters in use. Being able to decode the signal field as it arrives allows the receiver to properly re-configure for reception of the data portion of the packet prior to the data symbols arriving. The initial weighting vector is generally suboptimal in that it does not attempt to maximize the signal to interference ratio (SIR), but is generally acceptable for decoding the signal field as the signal field is transmitted at a robust modulation and coding scheme which is tolerant to low SIR. Demodulating the data portion of the packet, however, will generally benefit from a more optimized weighting vector as the data may be transmitted using a high order constellation type such as 64 QAM or 256 QAM which has substantially higher SIR requirements.

Embodiments consistent with the present invention form a more optimized weighting vector by performing a statistical characterization of different subsets of signals within the environment and then finds a solution that enables separation of the signal of interest from all other signals. This is accomplished primarily through formation of two different covariance matrices where a covariance matrix in the context of multi-antenna receivers computes the covariance between the various signals present on the antenna elements and stores the covariance between all signal pairs in matrix form. Analysis of a covariance matrix provides understanding of the cumulative effect of the channel vectors for the signals contributing to the covariance matrix. Throughout this disclosure, the covariance matrices are discussed in the context of one subcarrier with the assumption that the methods would be applied equally to all subcarriers of interest. Embodiments consistent with the present invention rely on estimating one covariance matrix that would be observed assuming only the interfering signals are present at the receive antenna elements. Assuming no noise and only the interfering signals are present on the antennas, the covariance matrix of the interfering signals would be given by $$\bar{R}_{INT} = \sum_{i=1}^{I} \bar{c}_{INT,i} \bar{c}_{INT,i}^{h} E[|x_i|^2].$$

Embodiments consistent with the present invention additionally rely on estimating a covariance matrix that would be observed assuming both intended and interfering signals are present at the receive antenna elements. Assuming no noise and both intended and interfering signals being present, the covariance matrix of all sources would be given by $$\bar{R} = \bar{c}\,\bar{c}^{h} E[|s|^2] + \sum_{i=1}^{I} \bar{c}_{INT,i} \bar{c}_{INT,i}^{h} E[|x_i|^2].$$

If the estimates of both $\bar{R}_{INT}$ and $\bar{R}$ are reasonably accurate, simply subtracting $\bar{R}_{INT}$ from $\bar{R}$ provides an estimate of the matrix $\bar{c}\,\bar{c}^h\, E[|s|^2]$ which could be used to indirectly determine the channel vector of the intended source using singular value decomposition. Additionally, singular value decomposition of $\bar{R}_{INT}$ provides a set of orthonormal vectors $[\bar{u}_1\ \bar{u}_2\ \ldots\ \bar{u}_P]$ and corresponding singular values $[SV_1\ SV_2\ \ldots\ SV_P]$ which together allow for the determination of the amount of interference signal power depending on the weighting vector applied. Given $\bar{c}$ along with the singular value decomposition of $\bar{R}_{INT}$ provides sufficient information to determine a weighting vector to separate the intended signal from the interfering signals. One approach to find the weighting vector would be to form a matrix given by $$\bar{\bar{G}} = [\bar{c}\,\sqrt{SV_1}\bar{u}_1\,\sqrt{SV_2}\bar{u}_2\ \ldots\ \sqrt{SV_P}\bar{u}_P]$$

and apply a linear equalization technique such as the zero-forcing algorithm $$\frac{\bar{\bar{G}}^h}{\bar{\bar{G}}^h \bar{\bar{G}}}$$

or apply the minimum mean-square-error algorithm $$\frac{\bar{\bar{G}}^h}{\left(\bar{\bar{G}}^h \bar{\bar{G}} + \rho^{-1} I\right)}$$

where $\rho$ is a signal to noise ratio estimate and I is an identity matrix. In either case, the first column vector from the resultant matrix would be used as the weighting vector to separate the intended signal from the interfering signals.

Starting with estimates of $\bar{R}$ and $\bar{R}_{INT}$, those familiar with the art would realize many additional techniques could be applied to form an appropriate weighting vector.

Figure 11:
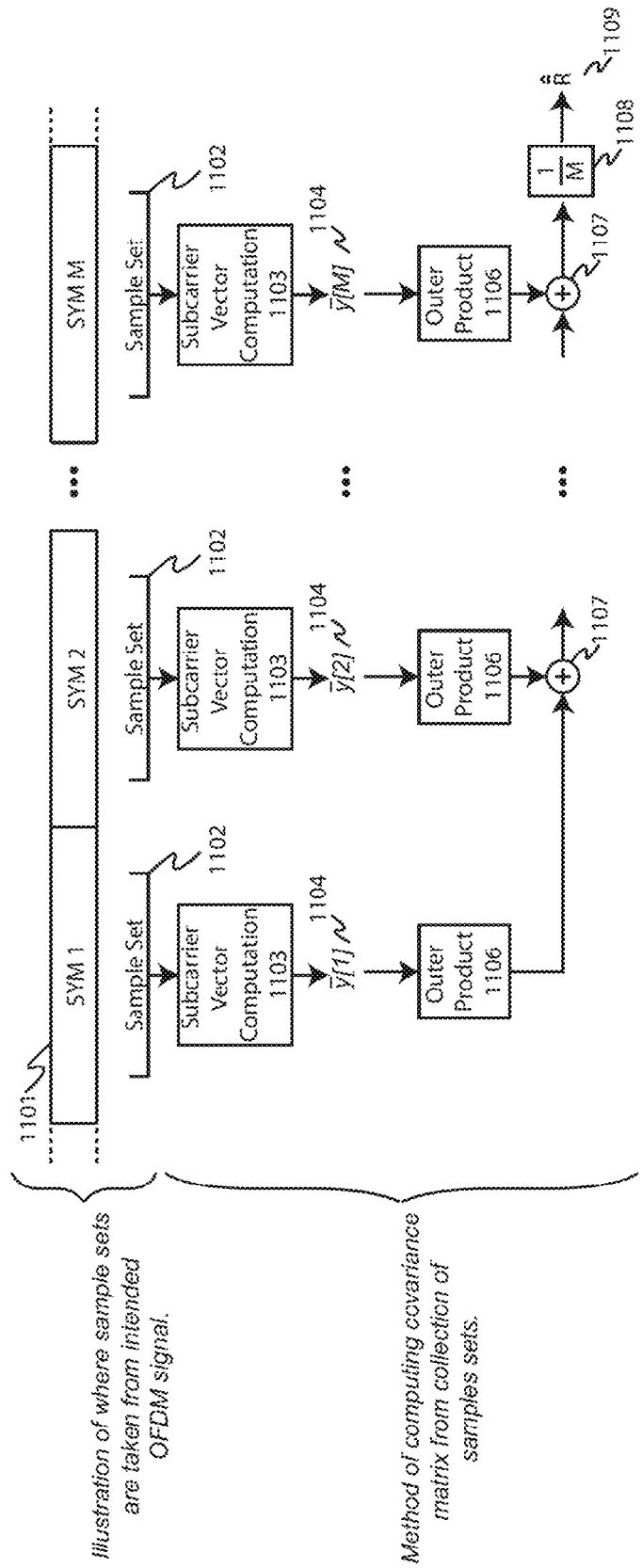

FIG. 11 illustrates the method of estimating $\bar{R}$. For each OFDM symbol used as part of the estimation of $\bar{R}$, a sample set 1102 is taken from each receive antenna. The sample sets 1102 taken at each OFDM symbol are then passed to the subcarrier vector computation 1103 as described in FIG. 4 resulting in a subcarrier vector 1104. The subcarrier vector 1104 is then passed to the outer product computation block 1106 which computes a matrix given by the outer product of the subcarrier vector with itself given by $$\bar{y}[m]\bar{y}^h[m]$$

The resulting matrix is then added 1107 to any previously accumulated outer product matrix results. After the computation has completed for all M symbols used as part of the computation, the accumulated matrix is divided by M as shown in 1108 providing $\hat{\bar{R}}$ 1109 which is the estimate of $\bar{R}$.

Figure 12:
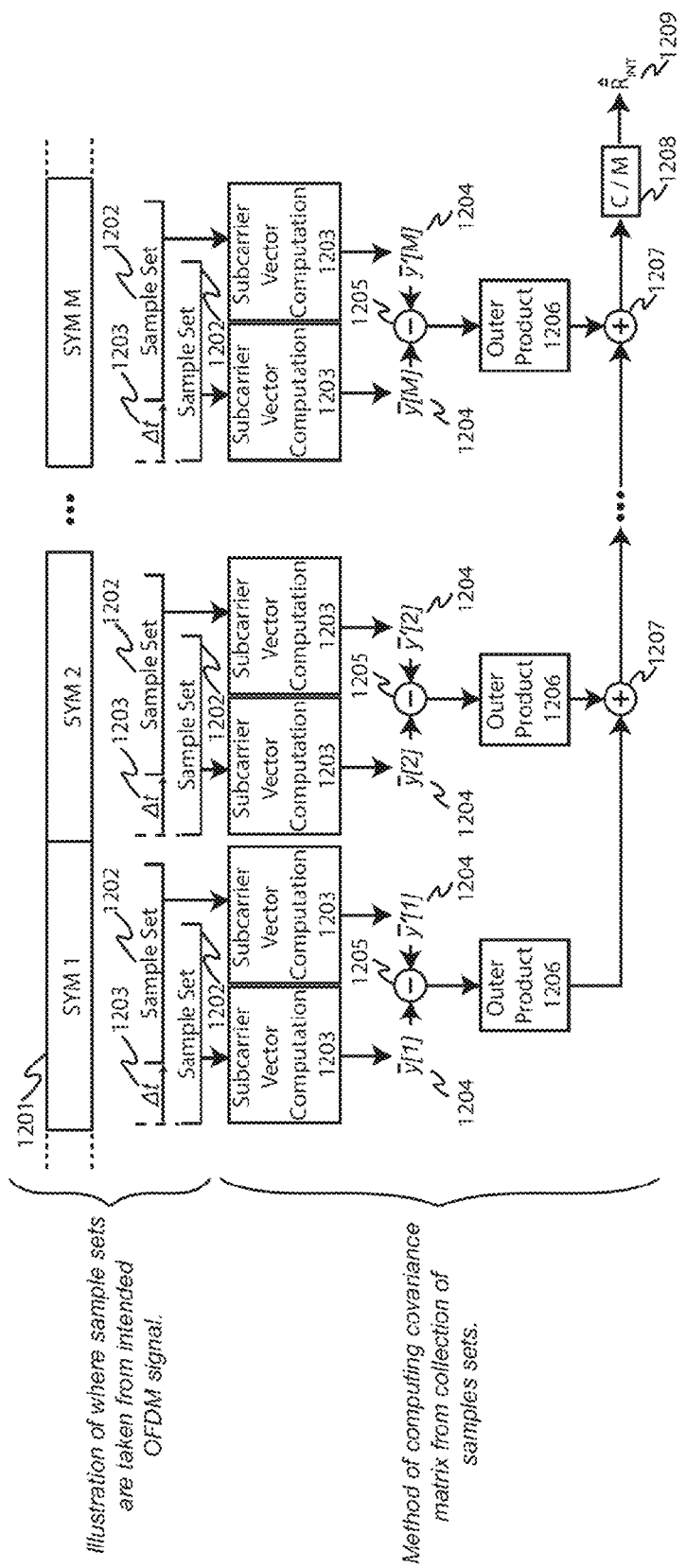

FIG. 12 illustrates the method of estimating $\bar{R}_{INT}$ in the case of blind demodulation in which no prior knowledge of the channel, interferers, or symbol states of the OFDM symbols is available to assist in demodulation. For each OFDM symbol used as part of the estimation of $\bar{R}_{INT}$, two sample sets 1202 are taken from each receive antenna. The sample sets are selected such that there is some relative time difference 1203 between the two sample sets but with both samples sets being within the boundaries of one OFDM symbol of the intended signal. This method does require knowledge of the OFDM symbol boundaries prior to execution, but the OFDM symbol boundaries are known from the packet detection algorithm and information available from demodulating the signal field. Just as in the case of the packet detection and initial weighting vector computation, we expect $\bar{c}$ s to remain constant for sample sets taken within one OFDM symbol. A difference vector is then computed by subtracting one of the signal vectors from the other signal vector taken within the same OFDM symbol. The result of the difference operation 1205 is a linear combination of the interference vectors but with no component of the desired channel response vector $\bar{c}$ because $\bar{c}$ s is equal in each subcarrier vector going into the difference operation. The difference vector is then passed to the outer product 1206 which computes a matrix given by the outer product of the difference vector with itself. The resulting outer product is then added 1207 to any previously accumulated results. After the computation has completed for all M symbols used as part of the computation, the accumulated matrix is multiplied by C/M 1208 where C is a scaling factor depending on the spacing and type of transform used. The result provides $\hat{\bar{R}}_{INT}$ 1209 which is an estimate of $\bar{R}_{INT}$. The estimates of $\bar{R}$ and $\bar{R}_{INT}$ formed as described in FIG. 11 and FIG. 12 provides for determination of a weighting vector as previously discussed.

An interesting aspect of the method disclosed is that it estimates $\bar{R}$ and $\bar{R}_{INT}$ without any knowledge of the symbol information transmitted within each OFDM symbol. The methods used to compute $\bar{R}$ and $\bar{R}_{INT}$ can therefore be applied directly to the data portion of the packet in which the symbol states are not know ahead of time. This is used for 802.11n and 802.11ac packet types as certain subcarriers are only populated in the data portion of the packet and the data portion of the packet generally applies different transmit parameters in comparison to the beginning of the packet that result in the apparent channel response vector changing at the transition from the signal fields to the data portion of the packet.

Figure 13:
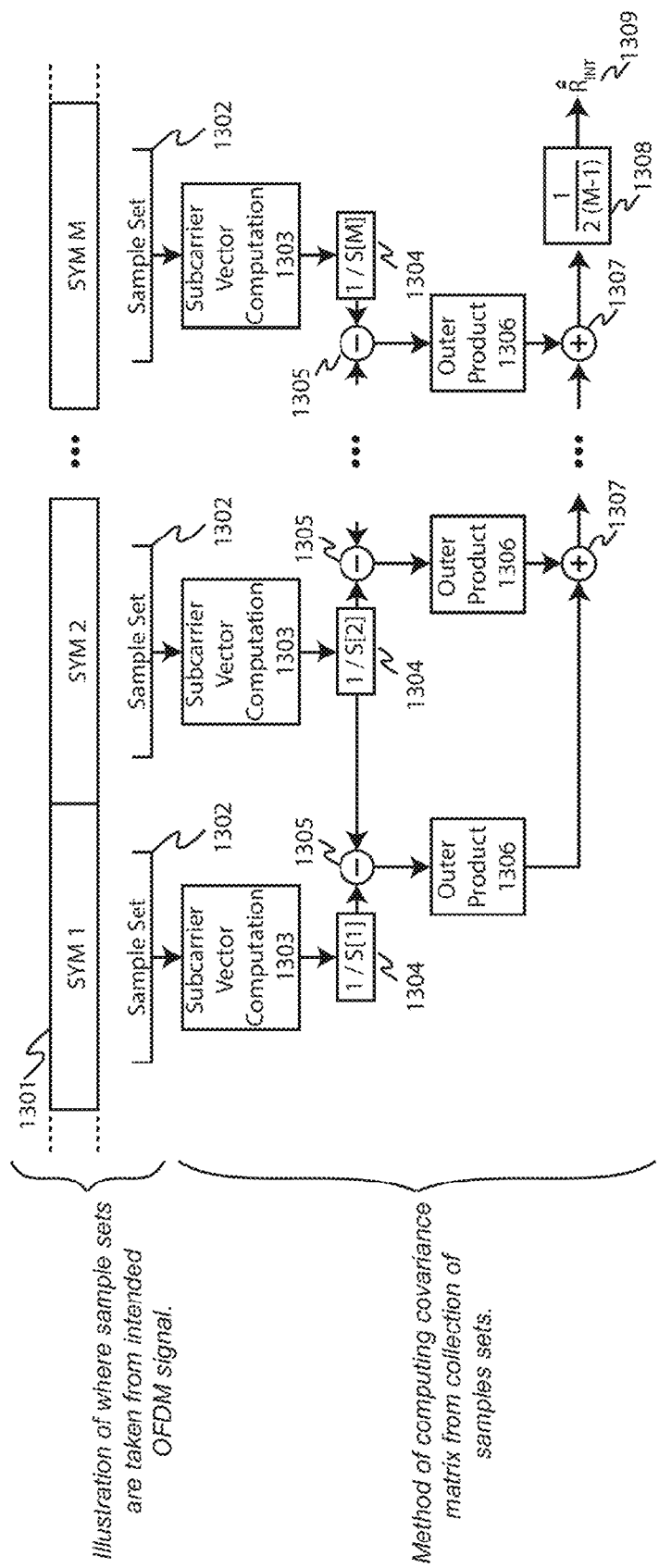

FIG. 13 illustrates an alternative method of estimating $\overline{R}_{INT}$ in which the symbol states of the OFDM symbols are known. For each OFDM symbol used as part of the estimation of $\overline{R}$, a sample set 1302 is taken from each receive antenna. The sample sets 1302 taken at each OFDM symbol are then passed to the subcarrier vector computation 1303 as described in FIG. 4 resulting in a subcarrier vector. The subcarrier vector is then divided by the known symbol state 1304 for the corresponding OFDM symbol at that subcarrier. For the desired signal, dividing the subcarrier vector by the known symbol state results in a vector that is $\overline{c}$ plus a linear combination of the interfering channel vectors. Given that the result of the output of 1304 will be the sum of $\overline{c}$ plus a linear combination of the interfering channel vectors for each OFDM symbol, taking the difference 1305 between two such vectors will result in a vector that is a linear combination of the interference vectors only. The difference vector is then passed to the outer product 1306 which computes a matrix given by the outer product of the difference vector with itself. The resulting matrix is then added to any previously accumulated results in 1307. After the computation has completed for all M symbols used as part of the computation, the accumulated matrix is multiplied by 1/2 (M−1) 1308. The result provides $\overline{R}_{INT}$ 1309 which is an estimate of $\overline{R}_{INT}$. The use of $\overline{R}$ and $\overline{R}_{INT}$ using the methods described in FIG. 11 and FIG. 13 allows for determination of a weighting vector as previously discussed.

The method for estimating $\overline{R}_{INT}$ depicted in FIG. 13 is generally more accurate than that depicted in FIG. 12, but requires knowledge of the symbol states. This technique is always applicable to pilot subcarriers as the pilot subcarriers are known by the receiver. This technique may also be applied to the data subcarriers if the receiver first demodulates the packet using another technique, determines what the ideal symbol states were, and then applies this technique to find a more accurate estimate of $\overline{R}_{INT}$. Such an approach where this technique is applied to the data subcarriers after demodulation is beneficial in situations where the same sources of interference are expected when receiving subsequent packets. This is often the case for Wi-Fi in which devices tend to send multiple packets once they have gained access to the channel. Therefore, the method illustrated in FIG. 12. may be used as part of the computation of the weighting vectors for the first received packet from a device and FIG. 13. may subsequently be used to refine the weighting vector in preparation for receiving additional packets from the same device while expecting the same set of interferers.

Figure 14:
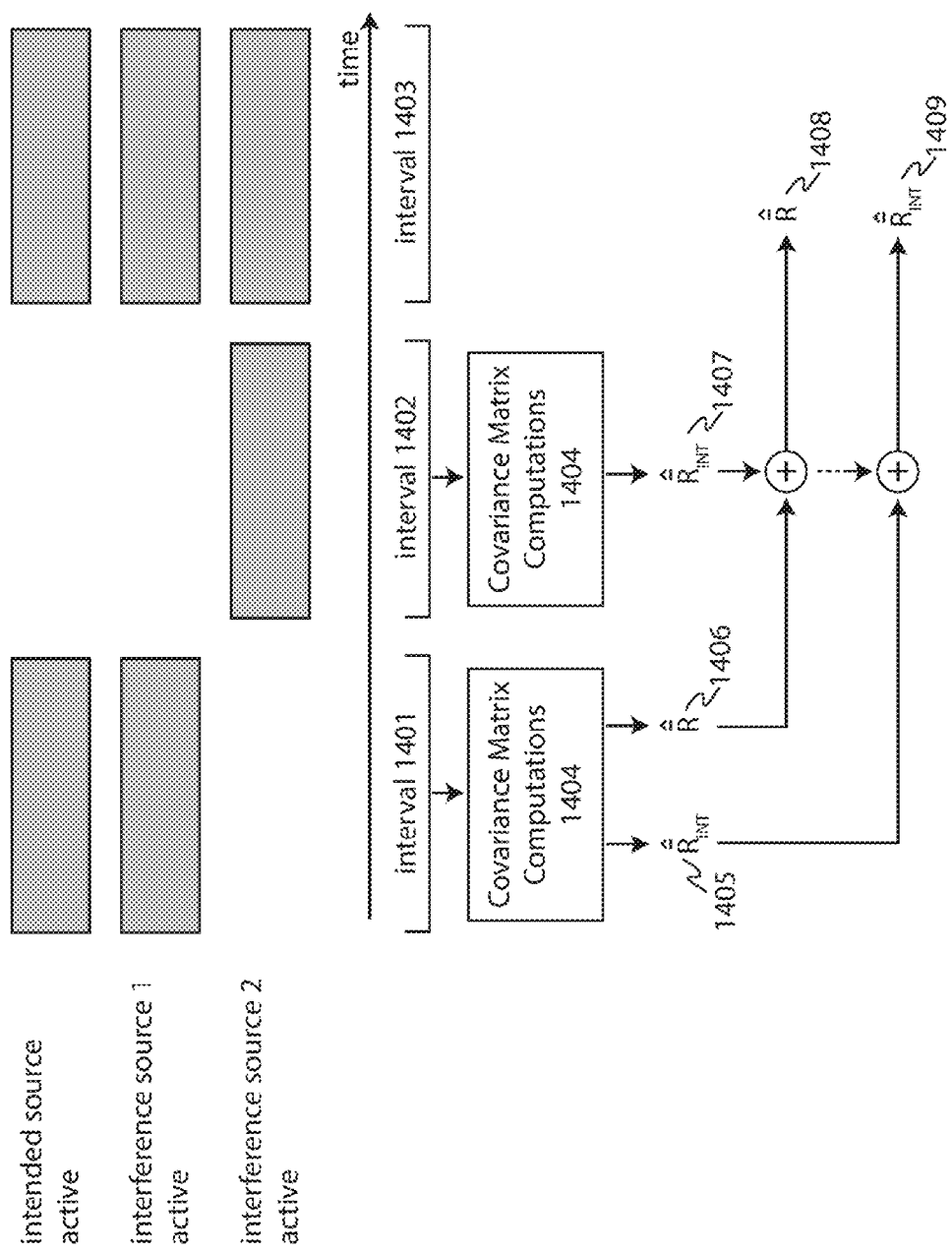

The method for estimating $\overline{R}_{INT}$ and $\overline{R}$ depicted in FIG. 11, FIG. 12, and FIG. 13 are directly applicable to cases in which the intended source and all sources of interference are present at the same time. There may arise circumstances when the sources of interference occur over disjoint time spans and it would be useful to find weighting vectors that would be applicable to future cases involving all interference sources being present simultaneously. Consider FIG. 14 illustrating a case in which an intended source and two interfering sources exist and the various sources are active at different times. The receiver would first encounter interval 1401 where the intended source is active at the same time as interference source 1. Utilizing the methods described previously, a receiver would attempt to determine a weighting vector to recover the signal from the intended source while in the presence of interference source 1. The receiver would later encounter interval 1403 where the intended source is active at the same time as interference source 1 and interference 2. The weighting vector computed for interval 1401, however, would not be applicable in this case to recover the signal from the intended source as the original weighting vector was not computed over a period of time that interference source 2 was active. Assume that we know a-priori that interference source 2 would be active over interval 1402. The method of computing the covariance method as described in FIG. 11 could be used over interval 1402 noting that in this case it would be used to estimate $\overline{R}_{INT}$ rather than $\overline{R}$ and that there would be no requirement to determine the OFDM symbol boundaries as in the previous cases. $\overline{R}_{INT}$ and $\overline{R}$ for interval 1403 could then be directly estimated from the covariance matrices computed over interval 1401 an interval 1402. Specifically, $\tilde{R}_{INT}$ 1408 corresponding to interval 1403 would be estimated by the summation of $\tilde{R}_{INT}$ 1405 corresponding to interval 1401 and $\tilde{R}_{INT}$ 1407 corresponding to interval 1402. $\tilde{R}$ 1409 corresponding to interval 1403 would be estimated by the summation of $\tilde{R}$ 1406 corresponding to interval 1401 and $\tilde{R}_{INT}$ 1407 corresponding to interval 1402. The estimates of $\tilde{R}_{INT}$ and $\tilde{R}$ corresponding to interval 1403 could then be used to determine an a-priori weighting vector for interval 1403 to resolve the intended source with both interfering source 1 and 2 active.

Figure 15:
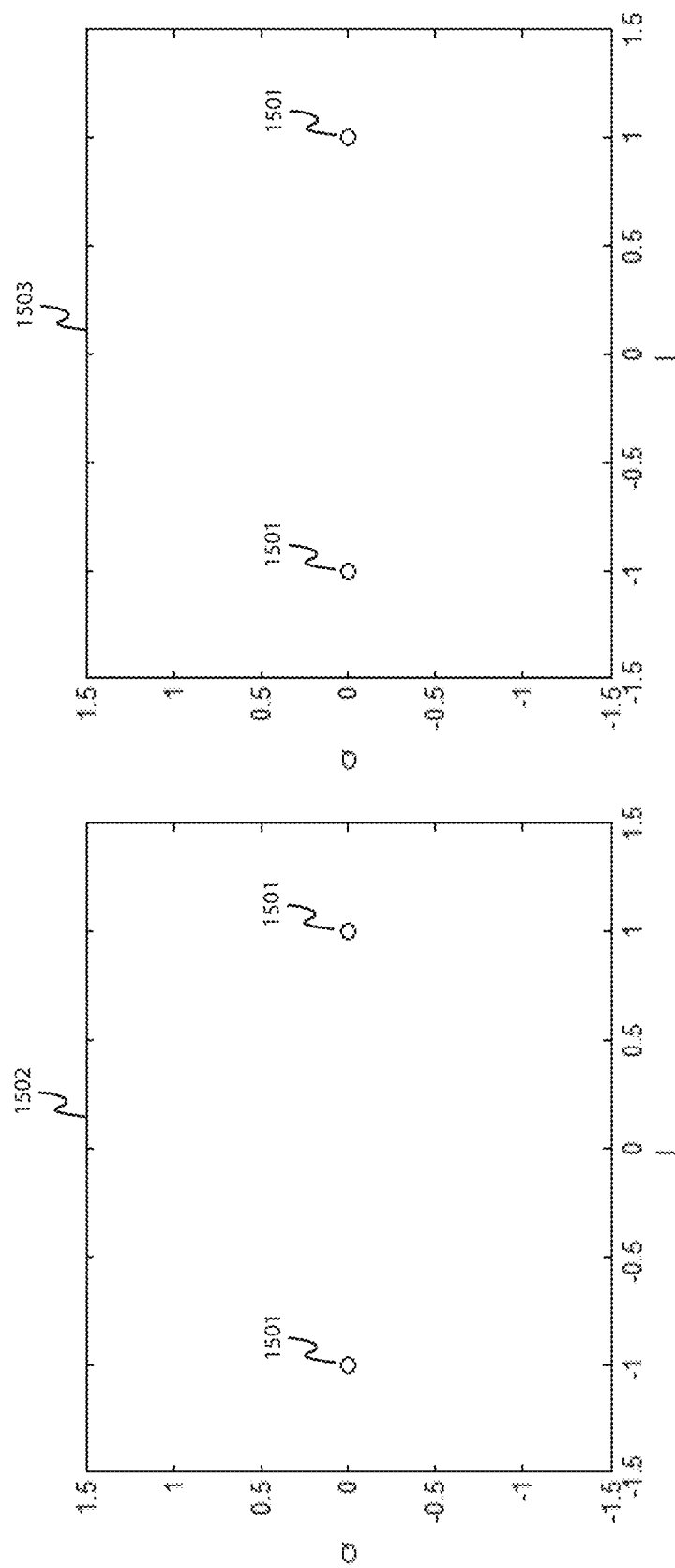
FIG. 15, FIG. 16, and FIG. 17 provide results illustrating the ability of the disclosure to demodulate multiple 802.11 signals simultaneously in accordance with some embodiments of the present invention.
Figure 16:
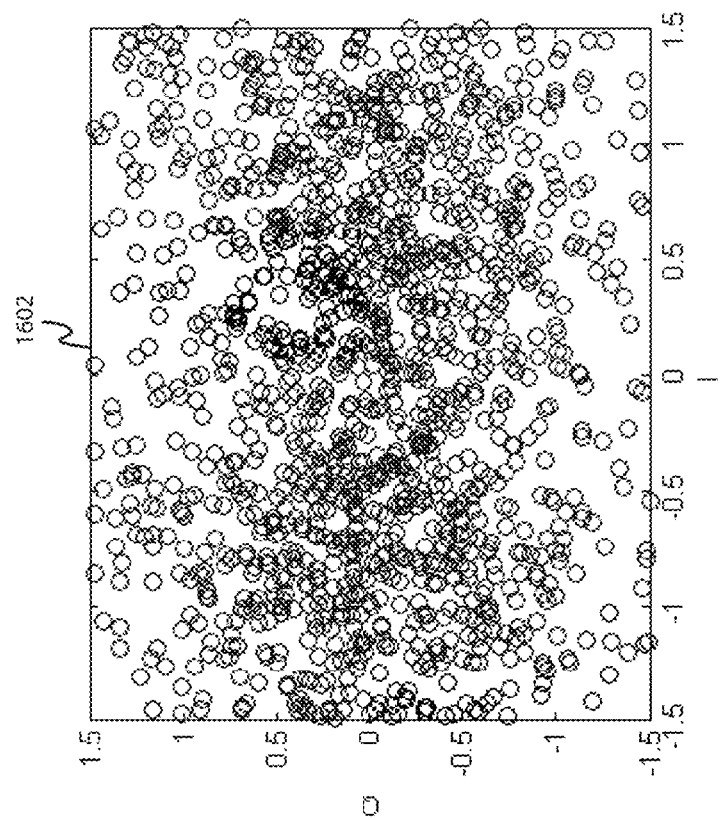
Figure 16:
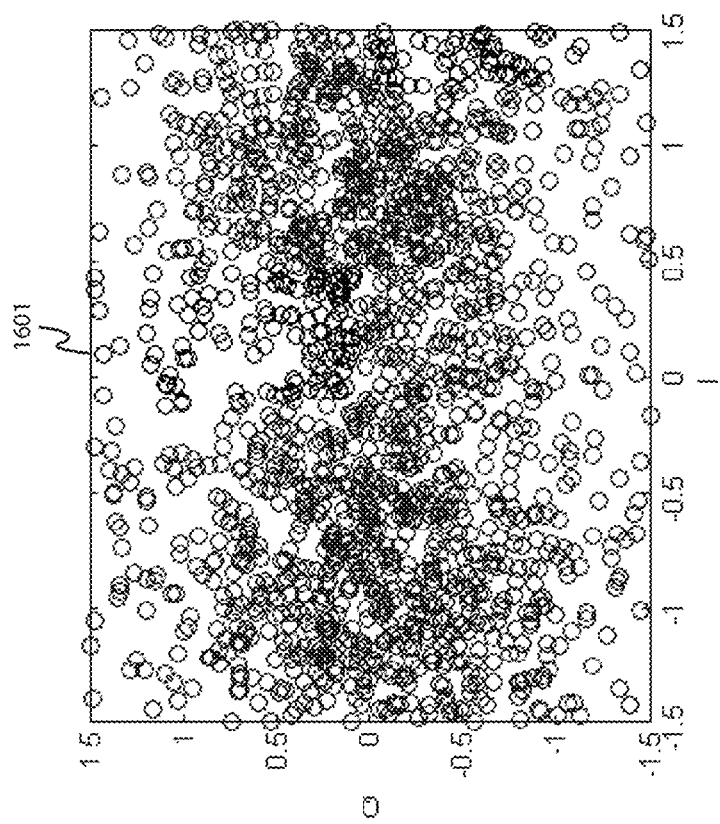
Figure 17:
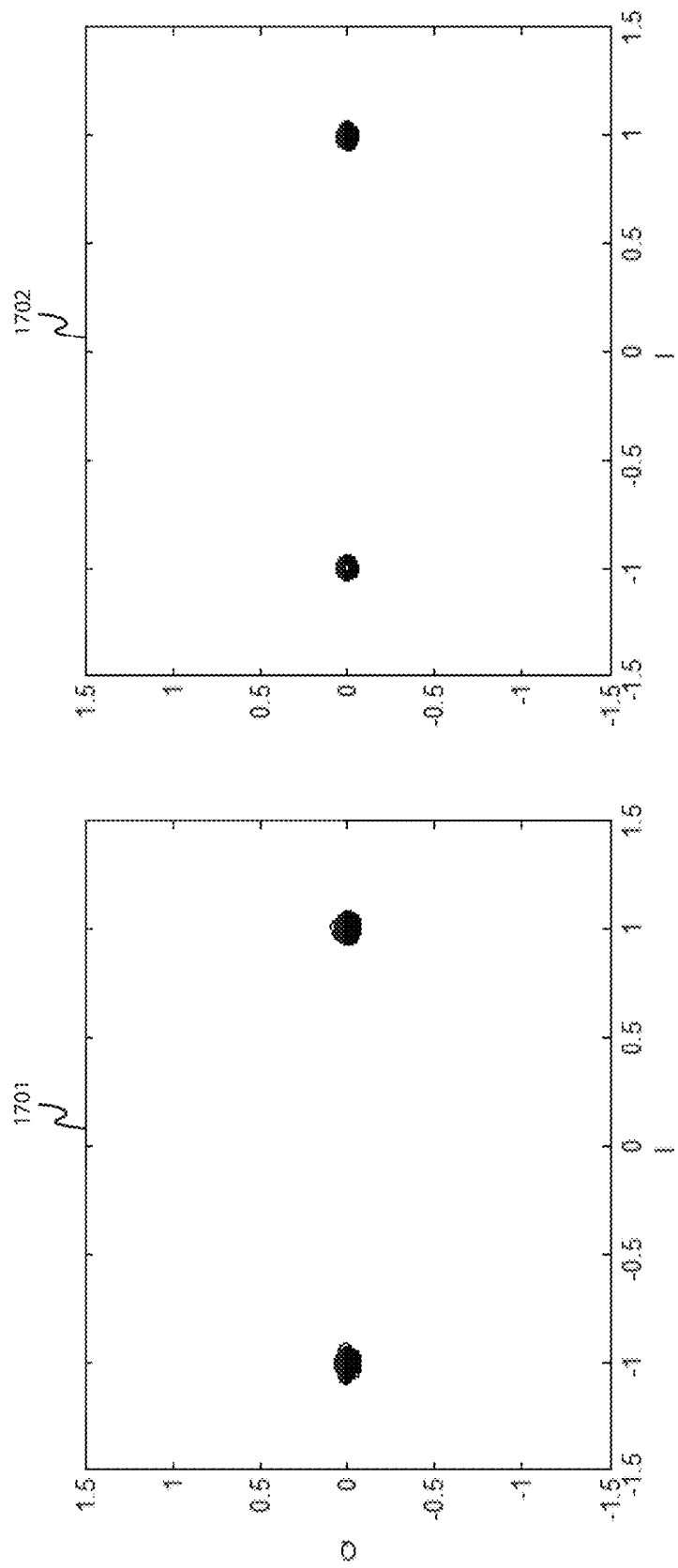

FIG. 15, FIG. 16, and FIG. 17 provide results of using the algorithms described herein to demodulate two WLAN OFDM signals simultaneously. These results illustrate the case when two client devices transmit two different 802.11 signals simultaneously and the disclosed methods are employed to demodulate the signals. FIG. 15 illustrates the binary phase shift keying (BPSK) symbols transmitted from each of the two client devices. The transmitted symbol states for both devices falls very near the ideal BPSK symbol positions 1501. FIG. 16 illustrates the received constellation using a conventional 802.11 PHY architecture. The illustration shows that the received symbol states do not seem to present any meaningful reception of the transmitted data as would be expected given a conventional architecture has no means of separating and demodulating interfering OFDM signals. FIG. 17 illustrates the received symbol states using the disclosed methods and illustrates the transmitted symbols are able to be recovered to a high degree of accuracy using the methods presented herein.

Figure 18:
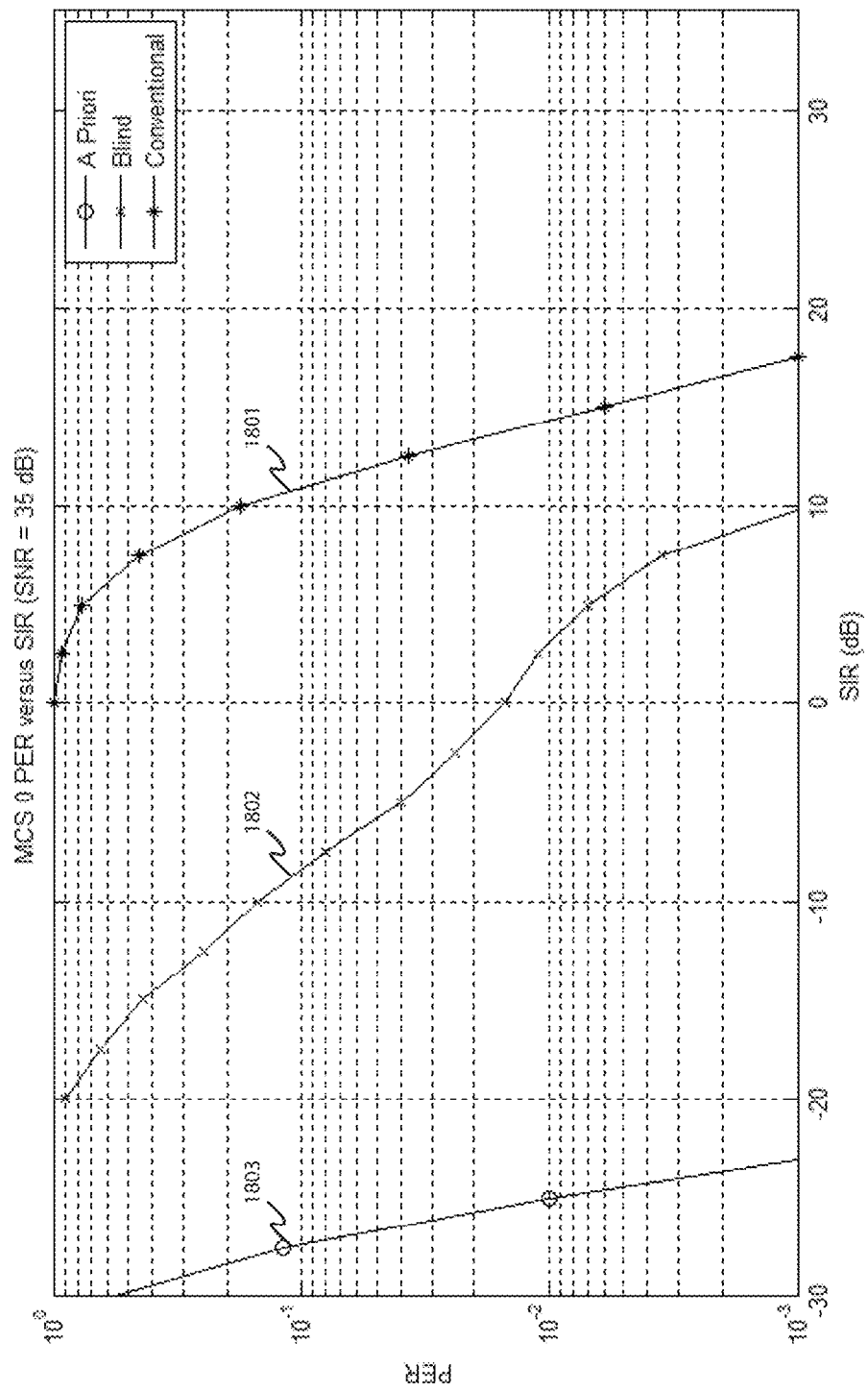
FIG. 18, FIG. 19, and FIG. 20 provide results illustrating the receiver packet error rate versus signal to interference ratio performance of the disclosure in comparison to existing technology in accordance with some embodiments of the present invention.
Figure 19:
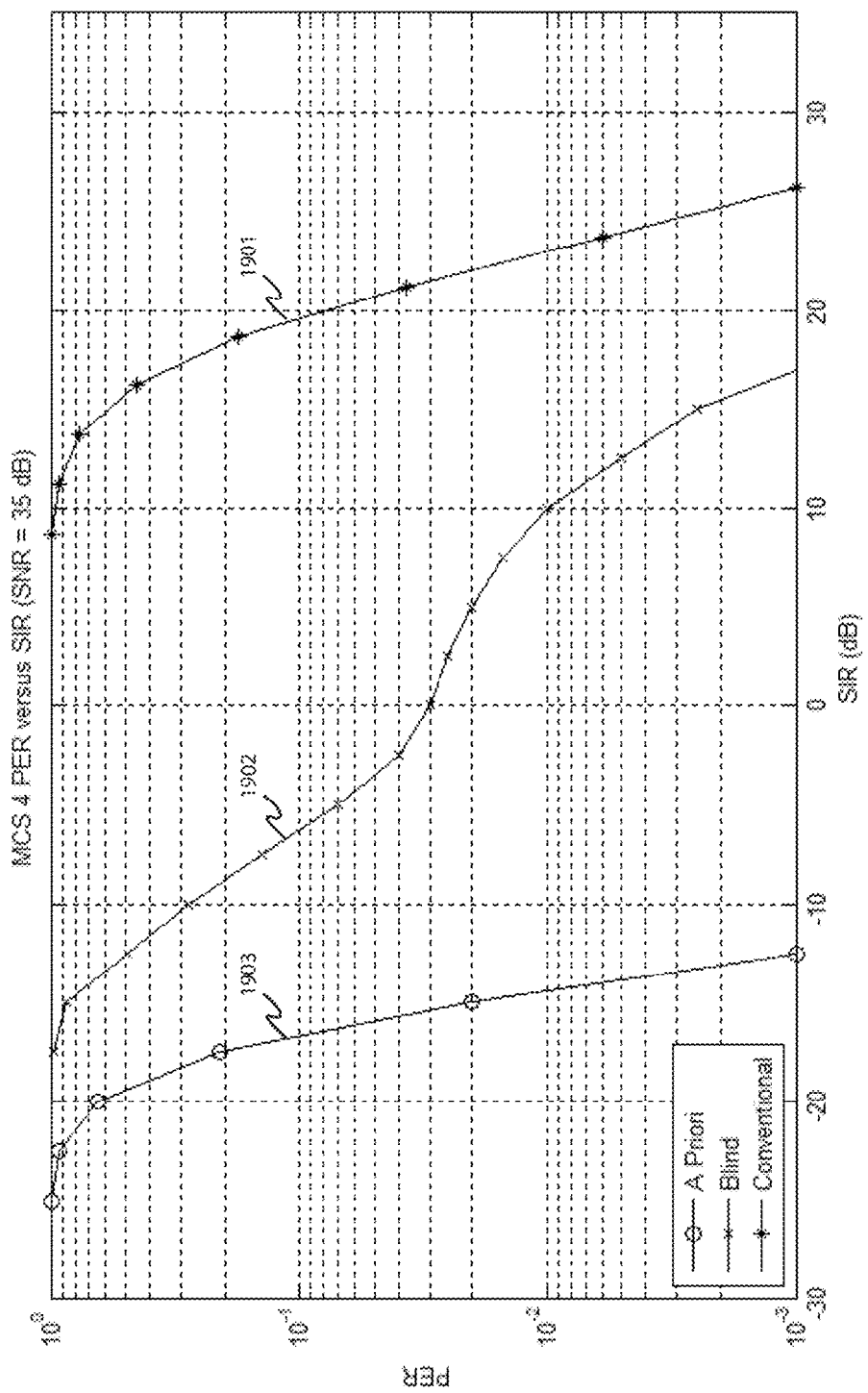
Figure 20:
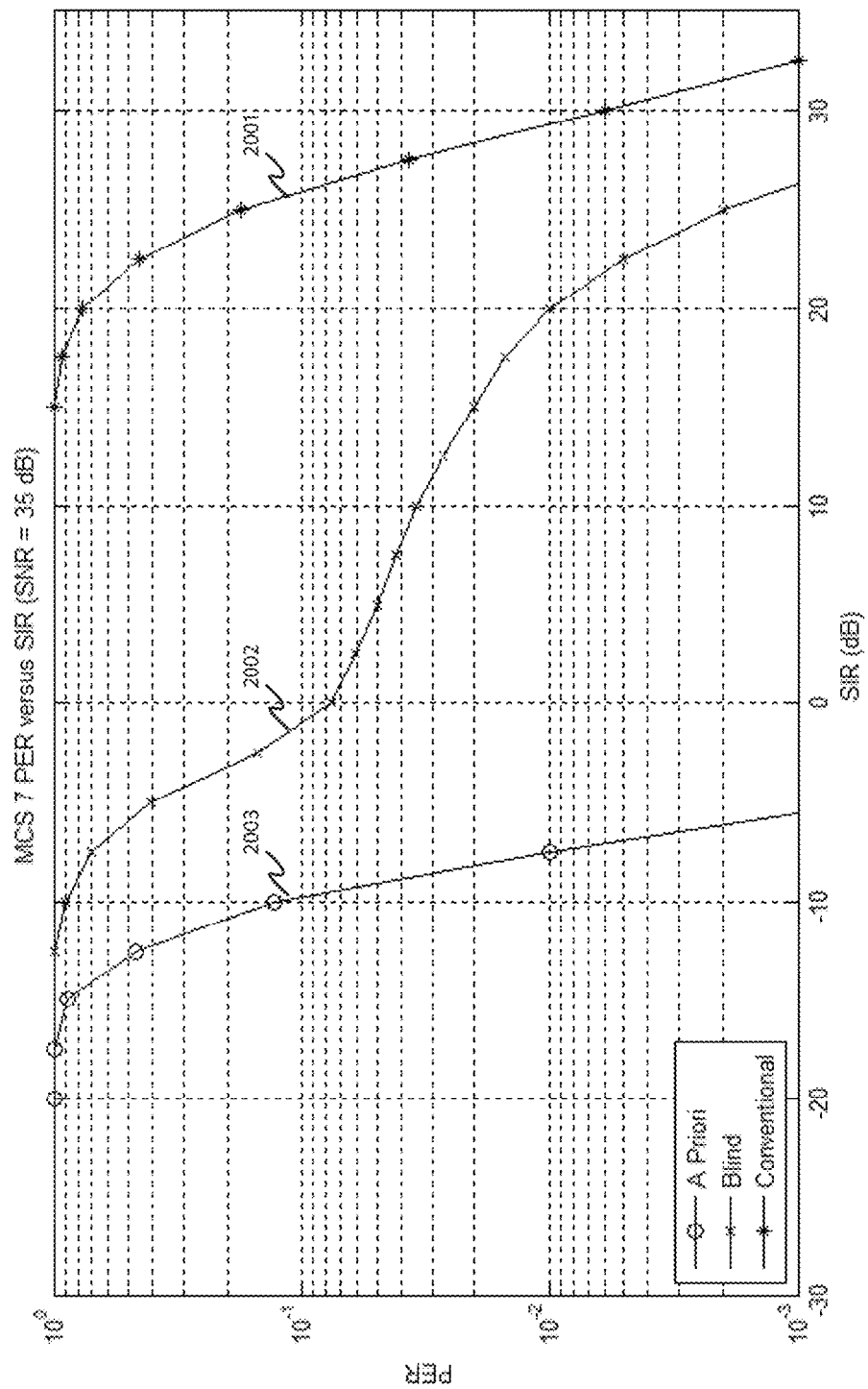

FIG. 18, FIG. 19, and FIG. 20 provide results showing the packet error rate (PER) performance for the methods described herein in comparison to a conventional receiver. For all figures, the results are based on a simulation in which 8 antenna elements are used to receive signals from 3 signal sources. In all cases, the signal types are 20 MHz 802.11n packets. The average signal to noise ratio (SNR) in all cases is maintained at a constant 35 dB relative to the strongest received signal. FIG. 18 provides PER versus signal to interference ratio (SIR) curves for 802.11n modulation and coding scheme 0 which is BPSK modulated with 1/2 rate convolution coding forward error correction. The three different curves correspond to a conventional receiver 1801, a receiver utilizing the methods described in FIG. 11 and FIG. 12 for blind demodulation 1802, and the methods described in FIG. 11 and FIG. 13 in which a priori symbol state information is available 1803. For a PER of 10%, FIG. 18 illustrates that a conventional receiver would need roughly 11 dB of SIR to achieve 10% PER. This means that a conventional receiver would need the intended signal to be roughly 11 dB stronger than the interfering signal power to function properly. In contrast, embodiments of the present invention applying blind demodulation techniques achieves 10% PER with −8 dB SIR which is a 19 dB improvement over a conventional receiver. By refining the solution further using the information gained from successfully demodulated packets, embodiments of the present invention would converge to achieving 10% PER at −27 dB providing a 38 dB improvement over a conventional receiver. FIG. 19 provides PER versus SIR curves for 802.11n modulation and coding scheme 4 which is 16-QAM modulated with 3/4 rate convolution coding forward error correction. The three curves correspond to a conventional receiver 1901, a receiver utilizing the methods described in FIG. 11 and FIG. 12 for blind demodulation 1902, and the methods described in FIG. 11 and FIG. 13 in which a priori symbol state information is available 1903. For a PER of 10%, FIG. 19 illustrates that a conventional receiver would need roughly 19 dB of SIR to achieve 10% PER. In contrast, embodiments of the present invention applying blind demodulation techniques achieves 10% PER with −6.5 dB SIR which is a 25.5 dB improvement over a conventional receiver. By refining the solution further using the information gained from successfully demodulated packets, embodiments of the present invention would converge to achieving 10% PER at −17 dB providing a 36 dB improvement over a conventional receiver. FIG. 20 provides PER versus SIR curves for 802.11n modulation and coding scheme 7 which is 64-QAM modulated with 5/6 rate convolution coding forward error correction. The three curves correspond to a conventional receiver 2001, a receiver utilizing the methods described in FIG. 11 and FIG. 12 for blind demodulation 2002, and the methods described in FIG. 11 and FIG. 13 in which a priori symbol state information is available 2003. For a PER of 10%, FIG. 20 illustrates that a conventional receiver would need roughly 26 dB of SIR to achieve 10% PER. In contrast, embodiments of the present invention applying blind demodulation techniques achieves 10% PER with −1.5 dB SIR which is a 27.5 dB improvement over a conventional receiver. By refining the solution further using the information gained from successfully demodulated packets, embodiments of the present invention would converge to achieving 10% PER at −9 dB providing a 35 dB improvement over a conventional receiver.

Figure 21:
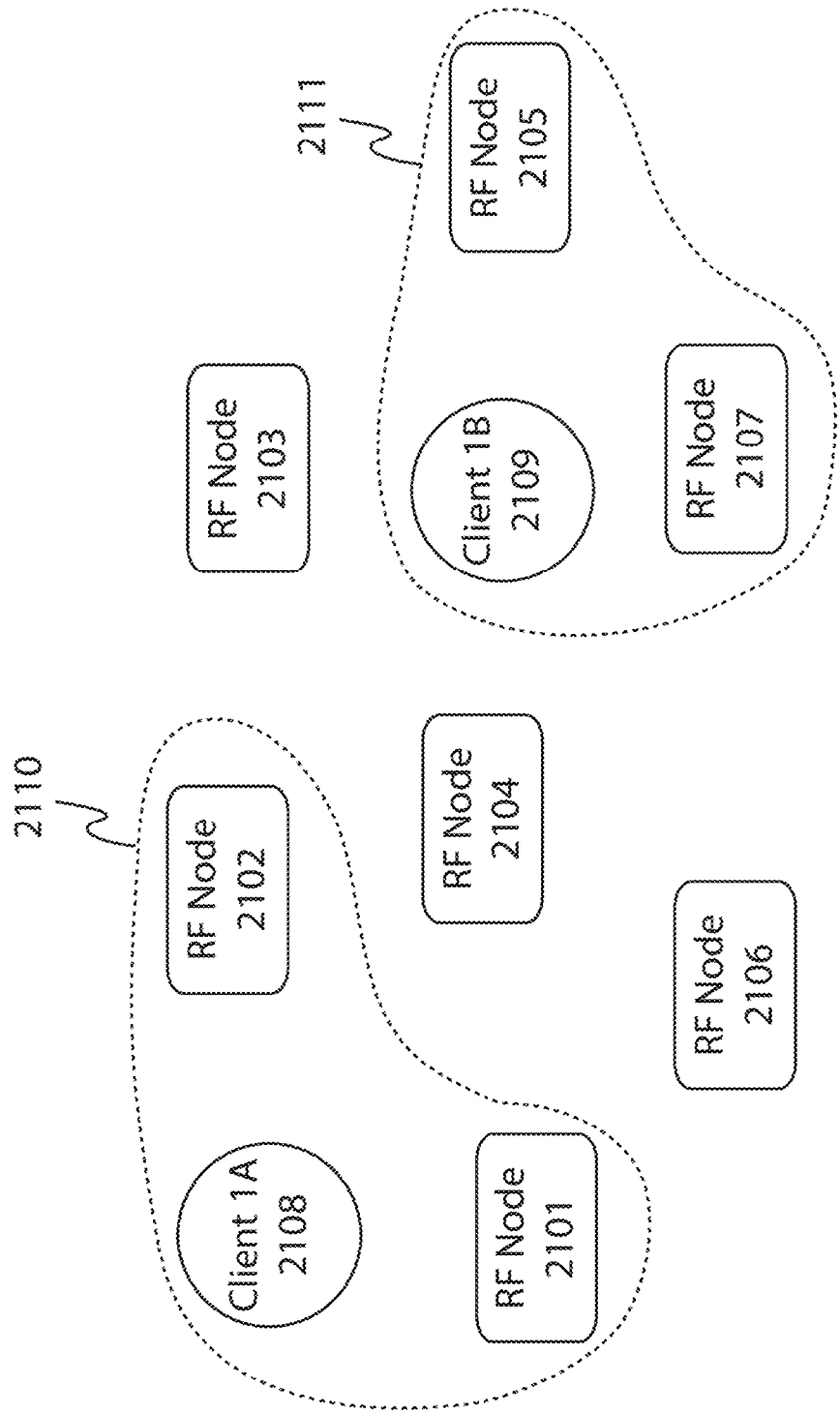
FIG. 21 and FIG. 22 illustrate how UL MU-MIMO is enabled in accordance with some embodiments of the present invention.
Figure 22:
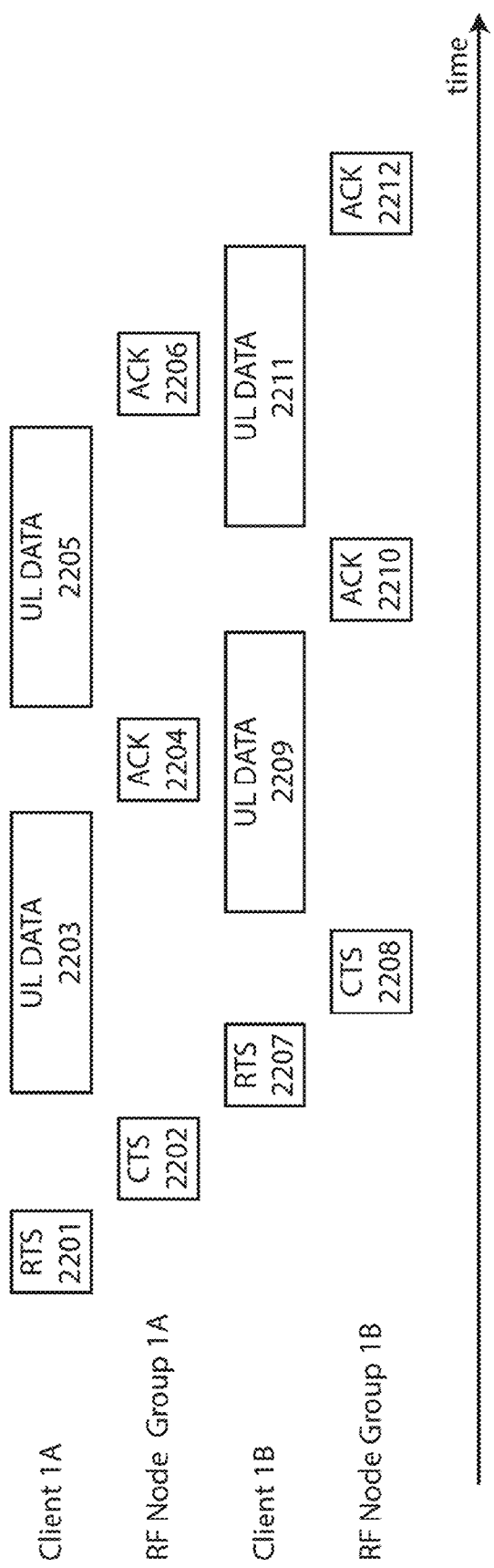

An advantage of embodiments of the present invention includes the enablement of UL MU-MIMO. UL MU-MIMO requires the ability to receive multiple signals simultaneously, but additionally requires the ability to transmit responses to individual client devise as needed. Given that WLAN client devices will not be synchronized in any manner, UL MU-MIMO for WLAN requires the ability to simultaneously receive from one or more client devices while simultaneously transmitting to one or more other client devices. Consider FIG. 21 in which RF Nodes 2101, 2102, 2103, 2104, 2105, 2106, and 2107 are used to simultaneously receive UL transmissions from Client 1A 2108 and Client 1B 2109. Although not explicitly shown, it is assumed that all RF Nodes shown connect to an aggregator is previously described in FIG. 1, FIG. 2, and FIG. 3. Further consider FIG. 22 which illustrates a potential set of packet exchanges corresponding to the devices illustrated in FIG. 21. In FIG. 22, each row provides a timeline of when packets originate from a particular client device or set of RF nodes. FIG. 22 illustrates a scenario in which Client 1 initiates an UL data transmission by sending a request to send (RTS) packet 2201. The aggregator could send a response to Client 1A 2108 through all RF nodes, but would then be unable to receive other incoming RF signals. The aggregator may instead choose to reply to RTS 2201 using RF Node 2101 and RF Node 2102 which together form RF Node Group 1A 2110 which is in the immediate vicinity with Client 1A 2108. Considering the physical separation between RF Node 2101 and RF Node 2202 from the other RF Nodes, transmitting on RF Node 2101 and RF Node 2102 does not prevent the remaining RF Nodes from simultaneously being used for reception. At some later point in time, Client 1A 2108 begins sending UL DATA 2203 at approximately the same time when Client 1B 2109 sends an RTS 2207 to initiate sending UL data. At the end of the RTS 2207, the aggregator will simultaneously be able to continue reception of UL DATA 2203 and send a response to RTS 2207. The aggregator may choose to reply to RTS 2207 using RF Node 2105 and RF Node 2107 which together form RF Node Group 1B 2111 which is in the immediate vicinity with Client 1B 2109. Due to the unsynchronized nature of WLAN, there are various other examples where simultaneous reception and transmission are needed. The aggregator generally handles this by allocating a subset of RF Nodes to respond to Client 1A 2108 when needed, allocating another subset of RF Nodes to respond to Client 1B 2109 when needed, and retaining a subset of RF nodes exclusively to receiving. In this manner, the disclosures permits UL MU-MIMO by providing both the simultaneous reception of multiple 802.11 signals and the ability to send responses to individual client devices as needed. The invention could alternatively be performed with a different architecture performing similar functions. For example, a set of access APs each with the ability to receive multiple WLAN packets simultaneously could work in a collaborative manner in which all APs virtually share the same basic service set identifier (BSSID) to enable UL MU-MIMO. In this case, specific APs with would be assigned to handle responses to specific client devices. Such an architecture would have requirements to enable coordination as to what AP is responsible for a specific client, but the architecture would also enable UL MU-MIMO. Those familiar with the art would recognize that such an architecture still utilizes embodiments of the present invention by requiring the ability to receive multiple WLAN signals simultaneously on the various APs and the ability to use one set of antennas (in this case, an AP) to communicate to one client device and another set of antennas (in this case, another AP) to communicate to another client.

Figure 23:
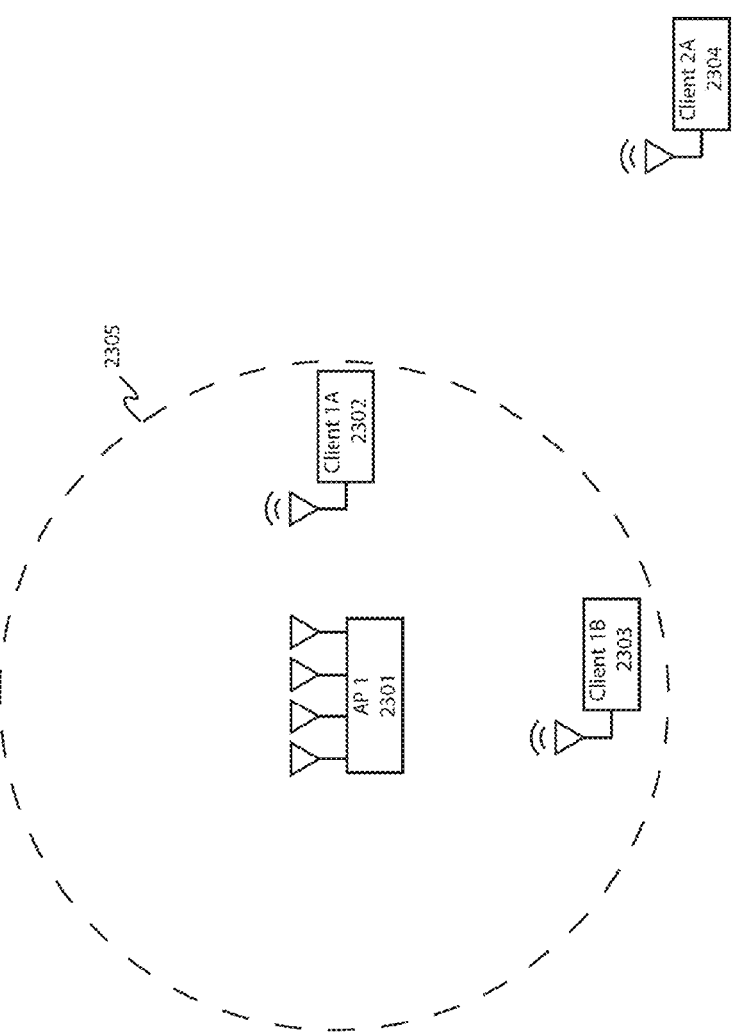
FIG. 23 and FIG. 24 illustrate how the interference suppression benefits are applicable to transmitting in addition to receiving in accordance with some embodiments of the present invention.

Another advantage of embodiments of the present invention is the enablement of efficient DL MU-MIMO and improvements in WLAN scalability. This result derives from the principles of electromagnetic reciprocity, the fact that WLAN utilizes the same frequency for both UL and DL transmissions, and that embodiments of the present invention inherently find a weighting vector solution specific to each client which minimizes interference from all perceived interference sources. Consider FIG. 23 in which AP 1 2301 is receiving while signals from Client 1A 2302, Client 1B 2303, and Client 2A 2304 are transmitted. Client 1A 2302 and Client 1B 2302 are within the intended coverage area 2305 of AP 1 2301 and it is therefore assumed in this case that AP 1 2301 is able to demodulate the signals from these devices. Client 2A 2304 is well outside the intended coverage area 2305 and therefore the signal from Client 2A 2304 may be too week to AP 1 2301 to demodulate but could still provide significant interference. For the remainder of this discussion, the term AP will be used to refer to either a conventional WLAN AP or a combination of aggregator and RF nodes as described in FIG. 1, FIG. 2, and FIG. 3 which perform a similar function as a conventional WLAN AP. Assume AP 1 2301 determines a weighting vector that allows for the reception of the signal from Client 1A 2302 while simultaneously suppressing interference caused by the signals from Client 1B 2303 and Client 2A 2304. Now consider FIG. 24 in which AP 1 2401 transmits information to Client 1A 2402 using the same weighting vector that was determined for the reception of the signal from Client 1A 2402. The RF signal energy from AP 1 2401 generally extends well beyond the intended coverage area 2405 and propagates to a much larger area 2406 that is detectable by other WLAN devices. The use of the weighting vector will concentrate signal power specifically in local area 2407 corresponding to the antenna of Client 1A 2402. Additionally, the use of the weighting vector will reduce the signal power in local areas 2408 and 2409 corresponding to the antennas of Client 1B 2403 and Client 2A 2404 respectively which were the perceived sources of interference when forming the weighting vector. Therefore, although embodiments of the present invention don't constrain the RF signal within the intended coverage area 2405 in comparison to existing technology, it does boost the signal to the desired client while reducing signal power to areas which were the perceived sources of interference while receiving.

Figure 24:
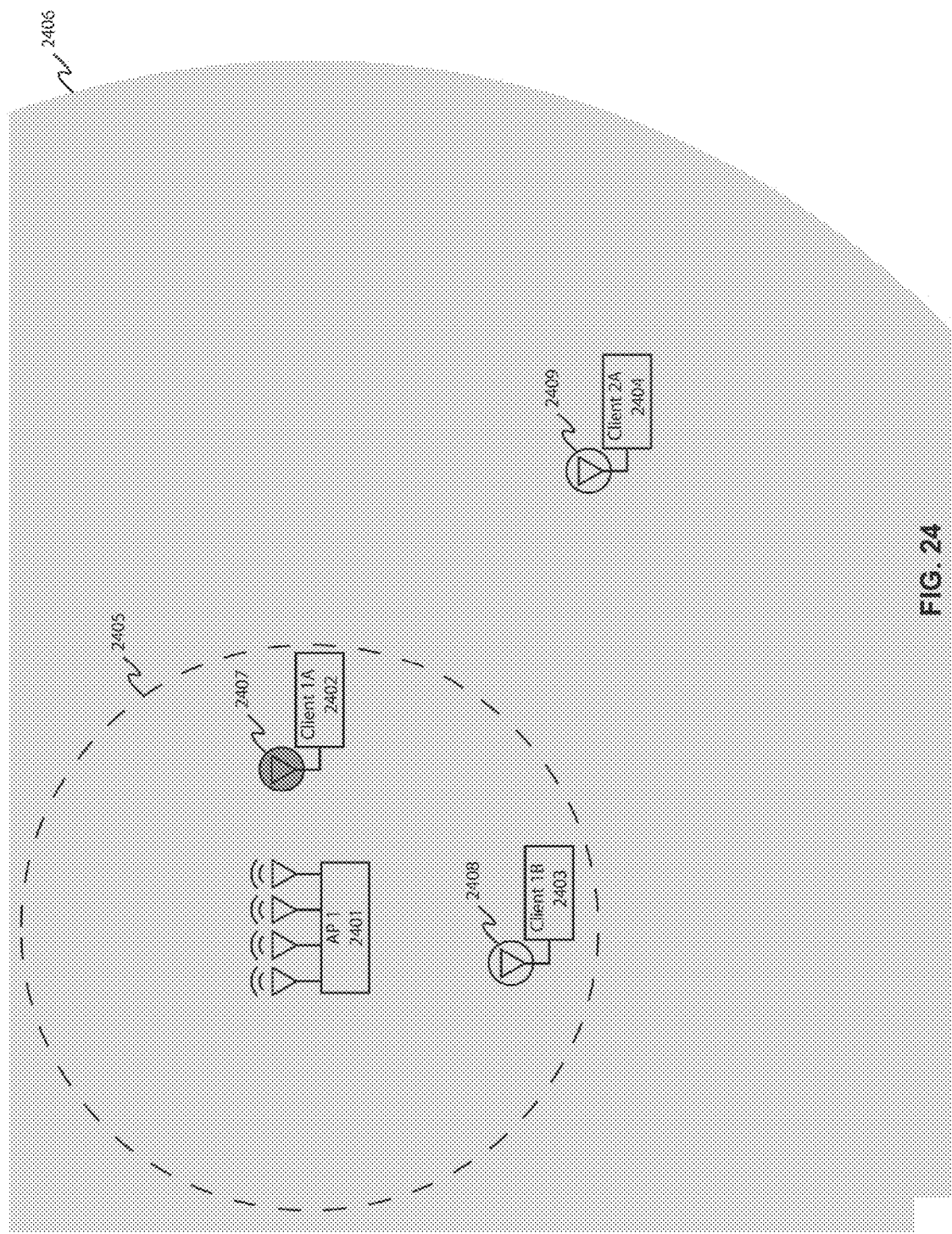
Figure 25:
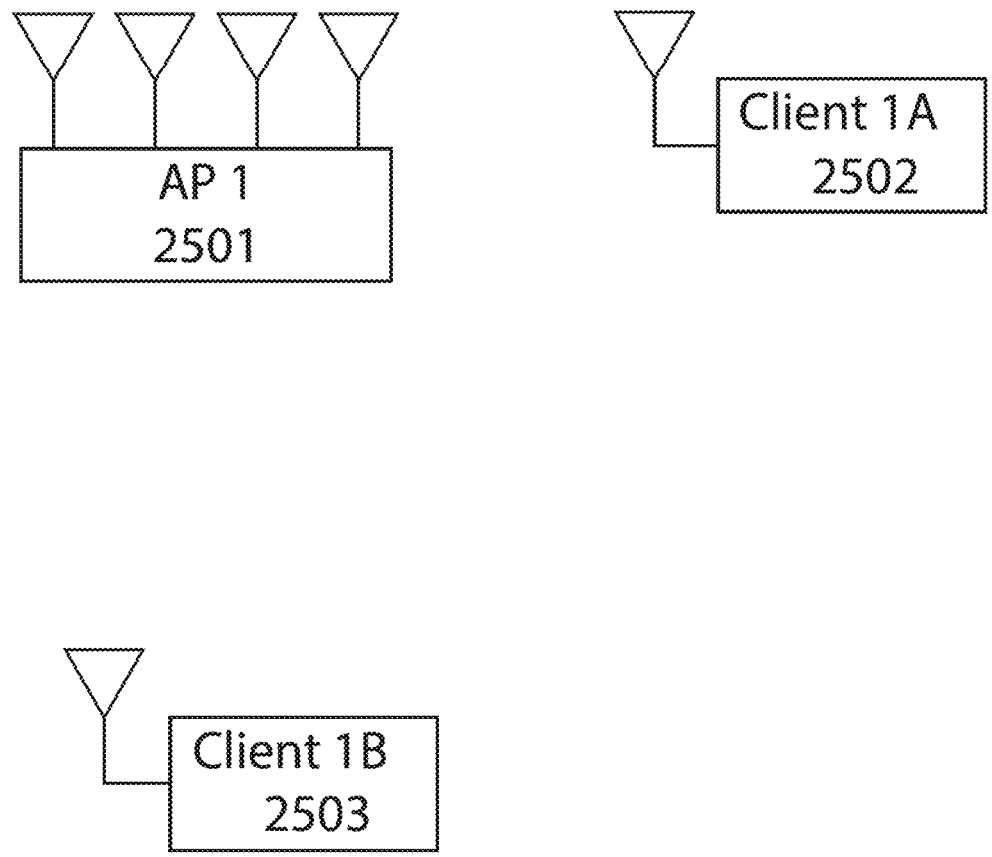
FIG. 25 and FIG. 26 illustrate how DL MU-MIMO is enabled in accordance with some embodiments of the present invention.
Figure 26:
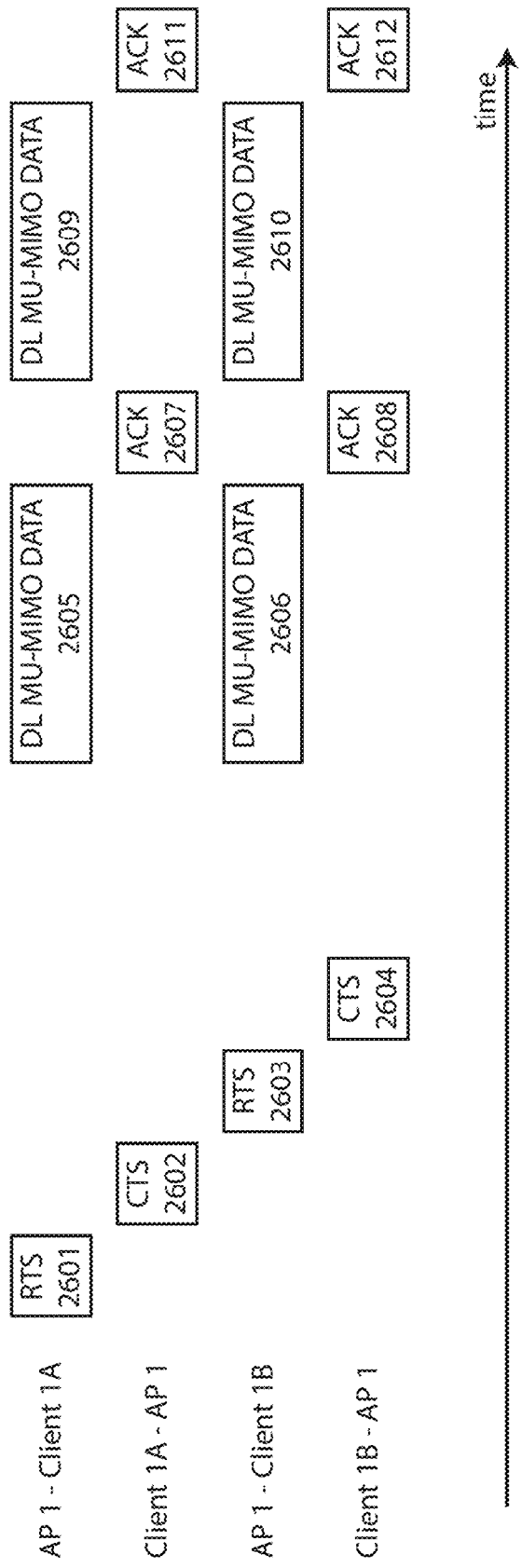

The invention utilizes the properties of the weighting vectors illustrated in FIG. 24 to enable DL MU-MIMO as illustrated in FIG. 25 and FIG. 26. FIG. 25 illustrates an AP 2501 which may choose to transmit information to Client 1A 2502 and Client 1B 2503 simultaneously. Although FIG. 25 depicts an AP communicating with two clients, embodiments of the present invention are applicable in scenarios with a different number of client devices. FIG. 26 illustrates one possible protocol that could be used to provide a DL MU-MIMO transmissions to client devices 2502 and 2503. Each row of the diagram corresponds to the flow of packets from one device to another device. Specifically, the top row of FIG. 26 represents packets from AP 1 2501 to Client 1A 2502, the second row represents packets from Client 1A 2502 to AP 1 2501, the third row represents packets from AP 1 2501 to Client 1B 2503, and the fourth row represents packets from Client 1B 2503 to AP 1 2501. AP 1 2501 would initiate a DL MU-MIMO transmission by sending a request to send (RTS) packet 2601 to Client 1A 2502. Client 1A 2502 would then respond with a clear to send (CTS) packet 2602. AP 1 2501 would then send a RTS packet 2603 to and receive a CTS packet 2604 from Client 1B 2503. For each client, the AP would form a weighting vector specifically for that client from the information received from the reception of CTS packets 2602 and 2604 using the methods described in FIG. 14 in which the covariance matrices are computed over disjoint time intervals corresponding to the CTS packets 2602 and 2604. Using these weighting vectors, the AP would transmit DL MU-MIMO data packets 2605 and 2606 destined for Client 1A 2502 and Client 1B 2503 respectively. Client 1A 2502 and Client 1B 2503 would then respond with acknowledgement (ACK) 2607 and 2608 respectively. Given the ability to receive multiple packets simultaneously, AP 1 2501 would be able to determine which client devices received the information sent. Additionally, reception of the ACK packets simultaneously would allow AP 1 2501 to update the weighting vectors used for the transmission and reception of future packets. The process would be repeated with the AP sending additional DL MU-MIMO data packets 2609 and 2610 simultaneously and client devices sending ACK packets 2611 and 2612 upon successful reception of their respective data packets. This process of the AP sending DL MU-MIMO transmissions and the client devices sending ACK packets could be repeated numerous times until all the desired information was delivered to the various client devices. Those familiar with the art would recognize there are alternative protocols that may be utilized to provide for DL MU-MIMO transmissions utilizing the ability to receive multiple packets simultaneously. For example, the protocol could alternatively use block acknowledgement requests (BAR) and block acknowledgements (BA) rather than ACKs to determine if the packets were received and update channel information. Such variations, however, would still be performed with the AP sending information to a group of devices simultaneously and receiving a response from the same group of clients simultaneously and therefore does not change the intent of embodiments of the present invention.

In addition to enabling efficient DL MU-MIMO within an intended coverage area of one AP, embodiments of the present invention also intrinsically reduces interference between DL MU-MIMO transmissions originating from different APs by synchronizing transmissions. Consider FIG. 27 in which AP 1 2701 wishes to send DL data to Client 1A 2703 and Client 1B 2704 simultaneously. At the same time, AP 2 2702 wishes to send DL data to Client 2A 2705. Assume both AP 1 2701 and AP 2 2702 have the ability to synchronize their transmissions to a predetermined schedule as illustrated in FIG. 28. AP 1 2701 and AP 2 2702 would transmit RTS packets 2801 and 2805 respectively with the two packets being aligned in time. Given that Client 1A 2703 is generally closer to AP 1 2701 and that a robust modulation and coding scheme is used for the transmission of RTS packets, it is reasonable to assume that Client 1A 2703 will receive RTS 2801. Similarly, it is reasonable to assume Client 2A 2705 will receive RTS 2805. Assuming Client 1A 2703 receives RTS 2801 and Client 2A 2705 receives RTS 2805, CTS packets 2802 and 2806 would be transmitted from Client 1A 2703 and Client 2A 2705 respectively with both being fairly aligned in time as the standard dictates a specific response time in which devices should respond to RTS packets. Given the ability to receive multiple packet simultaneously and in the presence of interference, CTS 2802 should be received by AP 1 2701 and CTS 2806 should be received by AP 2 2702. AP 1 2701 would additionally transmit RTS 2803 to and receive CTS 2804 from Client 1B 2704. For each client, the APs would form a weighting vector specifically for that client from the information received over the intervals of CTS packets 2802, 2804, and 2806 using the methods described in FIG. 14 in which the covariance matrices are computed over disjoint time intervals. Using these weighting vectors, the AP would transmit DL MU-MIMO data packets 2807, 2808, and 2809 destined for Client 1A 2702, Client 1B 2703, and Client 1C 2704 respectively. Client 1A 2703, Client 1B 2704, and Client 2A 2705 would then respond with acknowledgement (ACK) 2810, 2811, and 2812 respectively. Given the ability to receive multiple packets simultaneously, the APs would be able to determine which client devices received the information sent to them. Additionally, reception of the ACK packets simultaneously would allow the APs to update the weighting vectors used for the transmission and reception of future packets. The process would be repeated with the APs sending additional DL MU-MIMO data packets 2813, 2814, and 2815 and client devices sending ACK packets 2816, 2817, and 2818 upon successful reception of their respective data packets. This process of the APs sending DL MU-MIMO transmissions and the client devices sending ACK packets could be repeated numerous times until all the desired information was delivered to the various client devices.

Figure 27:
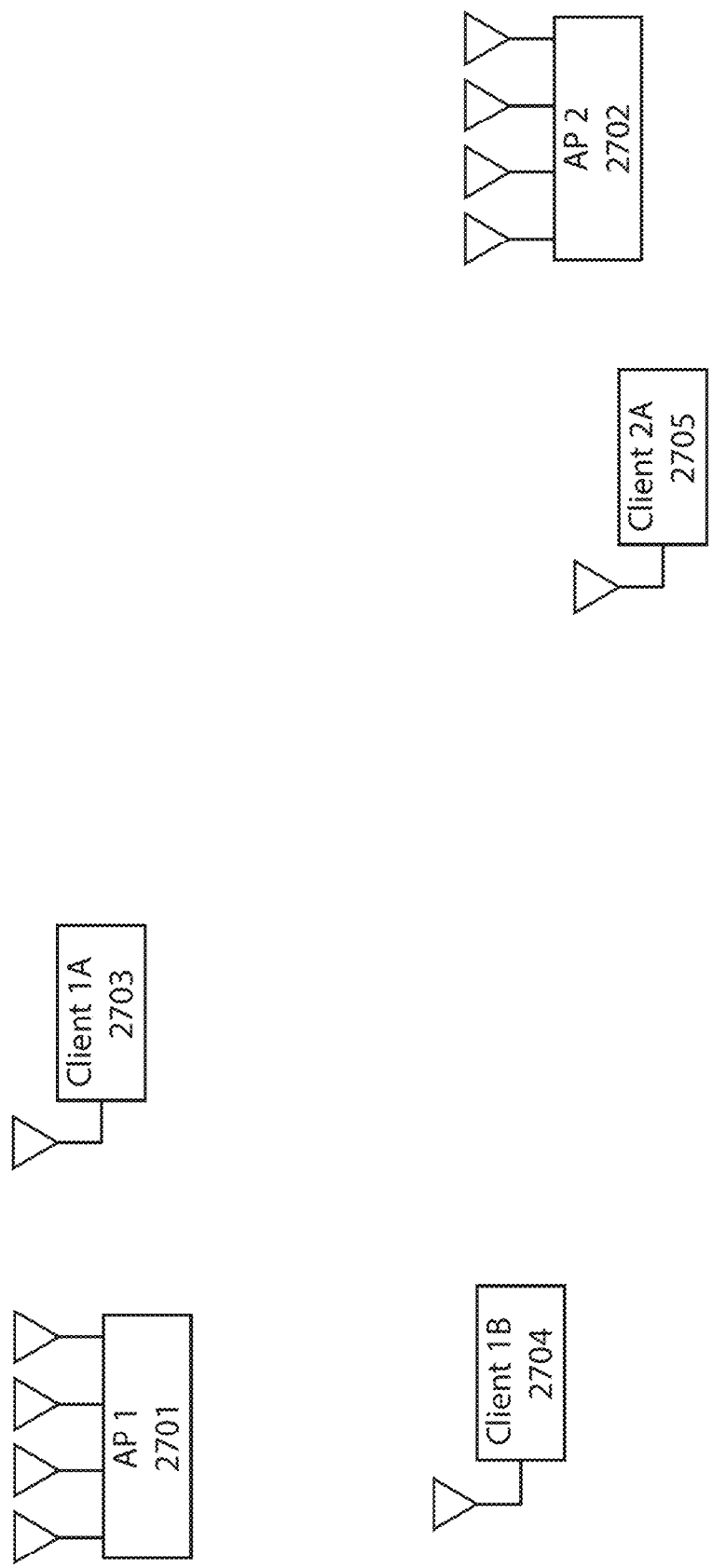
FIG. 27 and FIG. 28 illustrate multiple cells are enabled to perform DL MU-MIMO simultaneously while minimizing interference between cells in accordance with some embodiments of the present invention.
Figure 28:
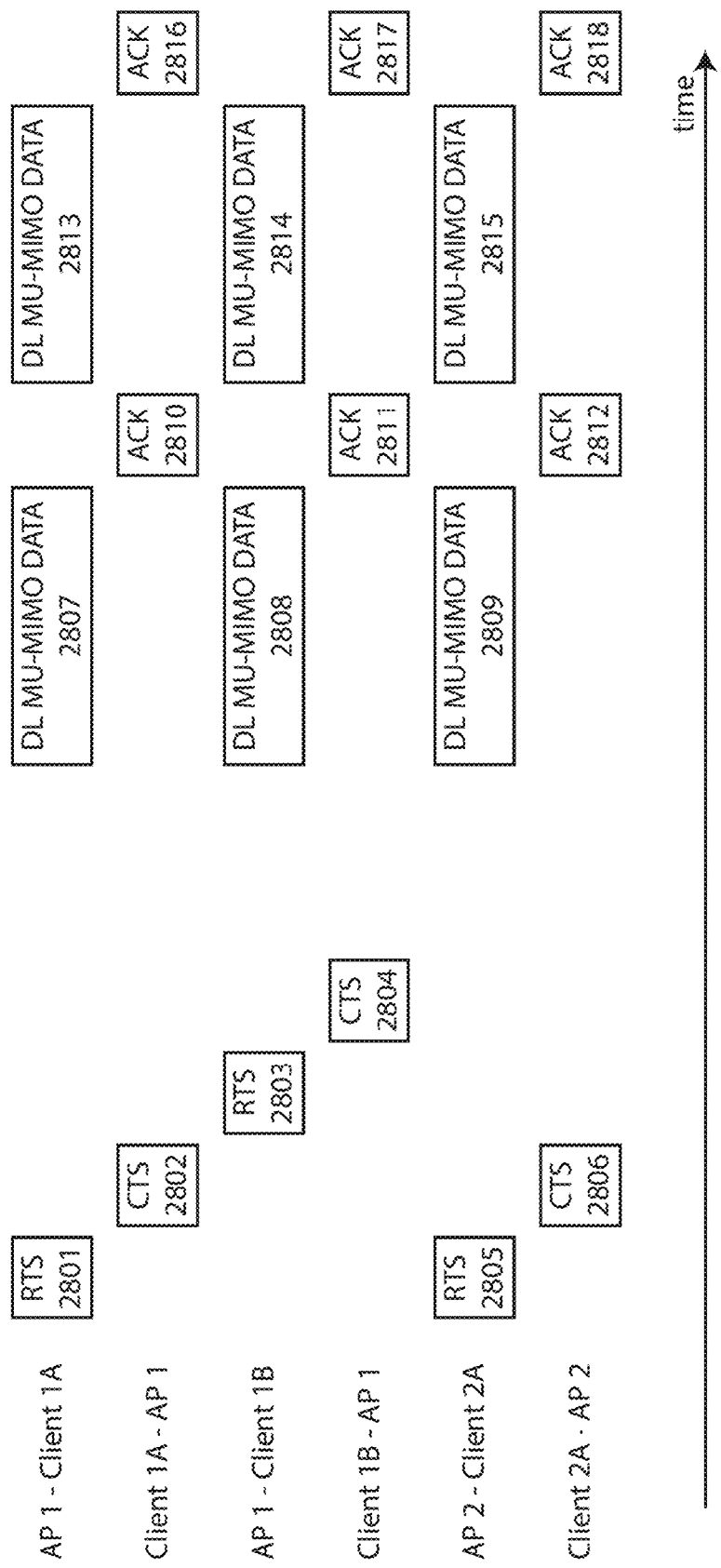

The ability to effectively minimize interference for DL MU-MIMO transmissions as illustrated in FIG. 27 and FIG.

28 relies on APs being able to synchronize transmissions. The synchronization required may be achieved in any number of ways including utilizing a timing protocol such as IEEE 1588 and/or SyncE that is transmitted over the wired backhaul connection 313 in FIG. 3, utilizing a GPS receiver in scenarios where this is practical, or by using an over the air method of synchronization. The over the air method of synchronization may be accomplished by one AP being designated as a timing master and all other APs synchronizing their internal clocks to the beacons transmitted by the master AP.

Figure 29:
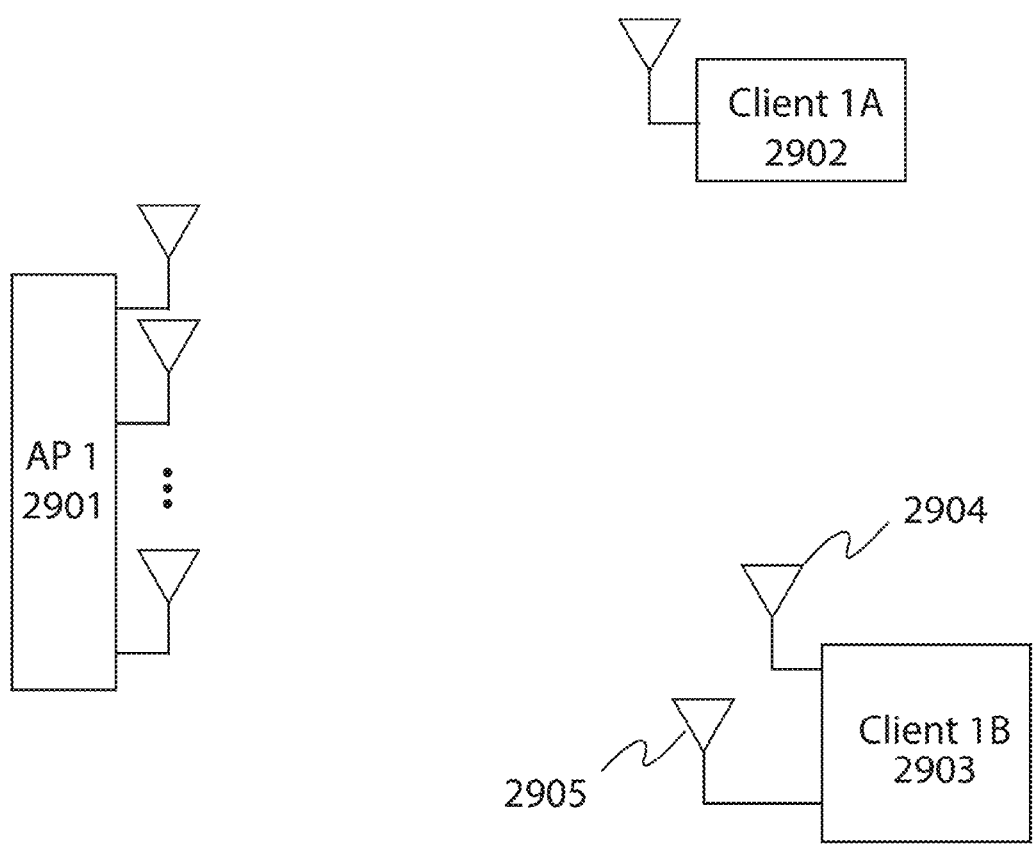
FIG. 29 and FIG. 30 illustrate the complications of performing DL MU-MIMO to client devices with multiple antennas in accordance with some embodiments of the present invention.
Figure 30:
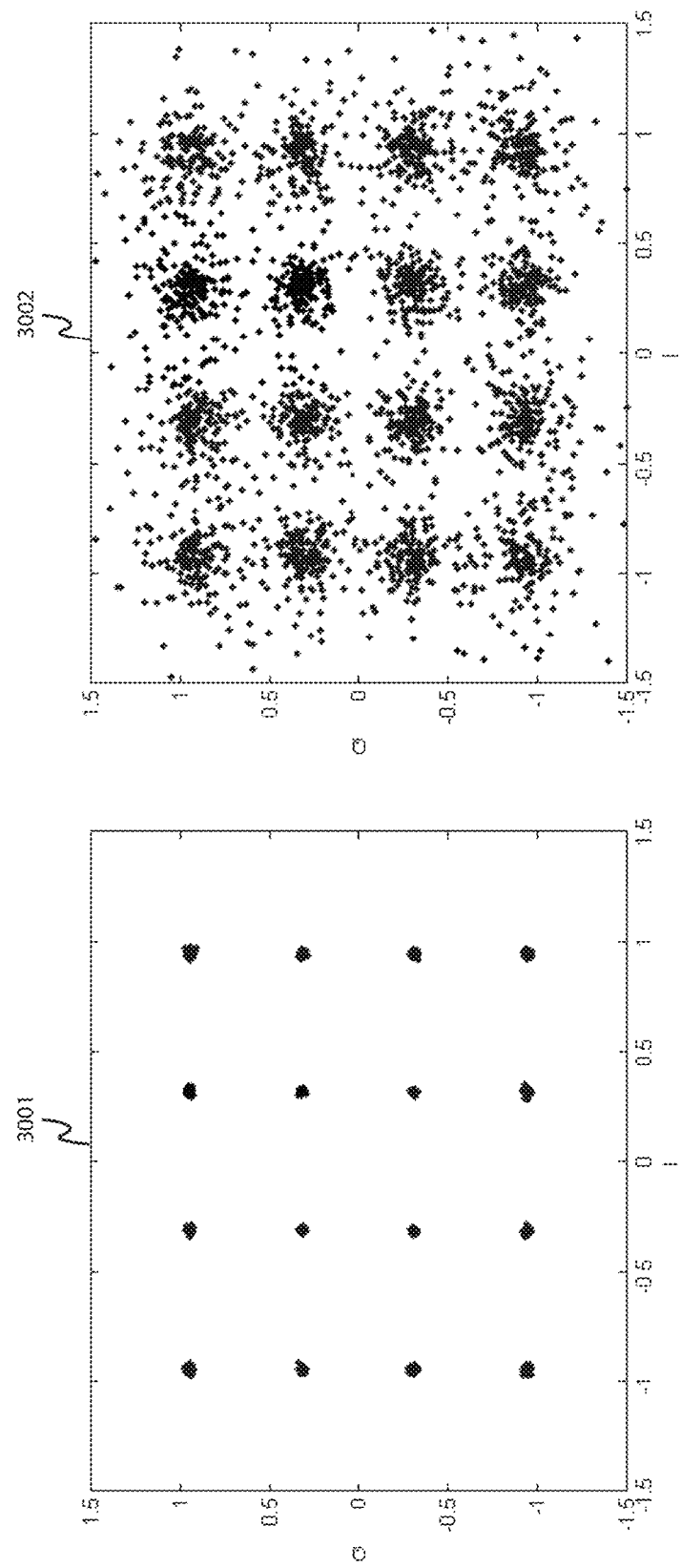

The methods described permitting DL MU-MIMO described previously rely on the AP being able to determine the channel between the antennas of the AP and client devices. FIG. 29 illustrates a scenario where AP 1 2901 is associated to Client 1A 2902 and Client 1B 2903, where Client 1A 2902 has one antenna and Client 1B 2903 has two antennas. For multi-antenna devices, various packet types including RTS, CTS, and ACK packets are transmitted with the same information being sent on both antennas. The result is the channel observed at AP 1 2901 from Client 1B 2903 is a composite of the channel vectors corresponding to antenna 2904 and antenna 2905. Assuming this composite channel vector is used as part of the weighting vector computation, energy will still be focused in the general vicinity of the Client 1B 2903, but the signal quality is generally degraded. FIG. 30 shows the results of a test in which the methods described previously for DL MU-MIMO are used in a scenario such as FIG. 29. Both clients are at approximately the same distance from the AP and 3001 shows the received constellation for Client 1A 2902 and 3002 shows the received constellation for Client 1B 2903. Although the constellation for Client 1B 2903 still allows for the information to be recovered which would not be possible without embodiments of the present invention, there is noticeable degradation for the constellation of the client with 2 antenna elements in comparison to the client with 1 antenna element.

WLAN devices generally apply cyclic shift diversity (CSD) to information sent from different antennas when a device has multiple antenna elements. Although the purpose of CSD is to avoid devices unintentionally concentrating energy in specific directions, the implementation results in what appears to be the information from each antenna being time delayed relative to information sent on other antennas. In addition to the purposes previously stated, embodiments of the present invention further have the ability to resolve time delays of individual signal components. This aspect of the invention in combination with CSD applied by WLAN allows embodiments of the present invention to resolve channel estimates from individual antennas in the case where the client has multiple antennas. This is beneficial for overcoming the issue described in FIG. 29 and FIG. 30.

Figure 31:
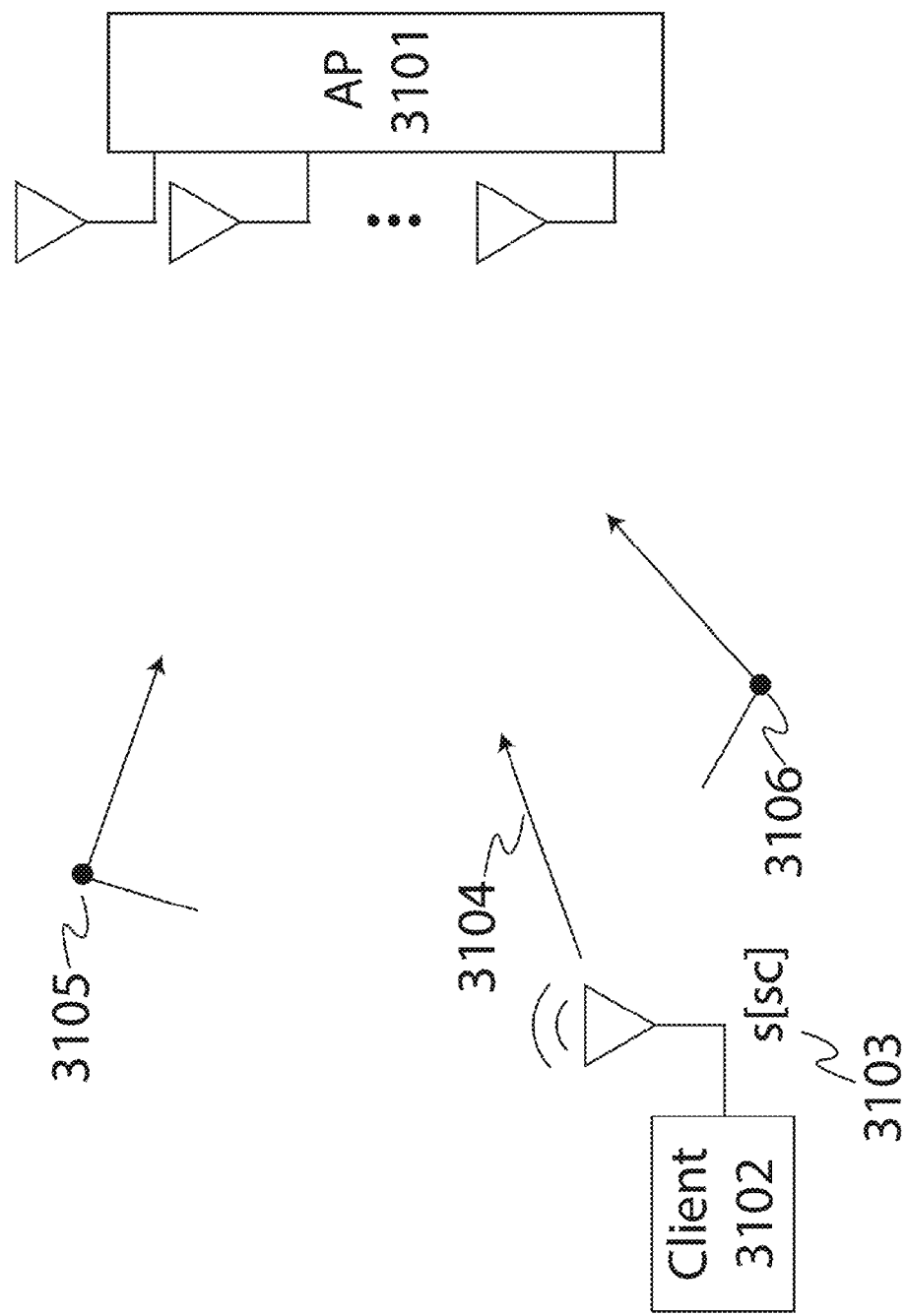
FIG. 31, FIG. 32, and FIG. 33 illustrate time of arrival estimation of signal multi-path components is enabled in accordance with some embodiments of the present invention.

FIG. 31 illustrates Client 3102 transmitting symbol s[sc] 3103 into the wireless medium and received by AP 3101. The information travels to the AP via multiple paths 3104, 3105, and 3106. The signal arriving at AP 3101 will be a combination of the signals from the various paths given by $$\bar{c}[sc] = s[sc] \sum_{p=1}^{P} \bar{c}_p e^{-j2\pi f_{sc} \tau_p}$$

where $\bar{c}[sc]$ is the composite channel response vector at a particular subcarrier, s[sc] is transmitted symbol at a particular subcarrier, $\bar{c}_p$ is the channel response vector for the $p^{th}$ path, $f_{sc}$ is the frequency offset corresponding a to a particular subcarrier index, and $\tau_p$ is a relative delay associated with the $p^{th}$ path. Note that $\bar{c}[sc]$ and s[sc] are represented as functions of sc to signify that these are dependent on the subcarrier index whereas they were previously represented as constants. This is because previous derivations were all referenced to the same subcarrier index value whereas the present derivation utilizes the change in $\bar{c}[sc]$ with subcarrier index. Also notice, however, that the underlying channel vectors associated with individual multi-paths are assumed to be independent of the subcarrier index. We define $$\bar{y}[sc, \tau] = \left(\frac{\bar{c}[sc]}{s[sc]}\right) e^{j2\pi f_{sc}\tau}$$

where $\tau$ is an assumption as to what the delay of an individual multi-path may be. Substitution provides $$\bar{y}[sc, \tau] = \left[\sum_{p=1}^{P} \bar{c}_p e^{-j2\pi f_{sc}\tau_p}\right] e^{j2\pi f_{sc}\tau}$$

Now assume we select $\tau$ equal to $\tau_1$. In this case, $$\bar{y}[sc, \tau_1] = \bar{c}_1 + \sum_{p=2}^{P} \bar{c}_p e^{-j2\pi f_{sc}(\tau_p - \tau_1)}$$

which is $\bar{c}_1$ plus a linear combination of $\bar{c}_2, \bar{c}_3, \ldots \bar{c}_P$. Assume we take the difference between two such vectors formed at consecutive subcarriers giving $$\bar{y}_{diff}[sc,\tau_1] = \bar{y}[sc,\tau_1] - \bar{y}[sc+1,\tau_1]$$

Given that both $\bar{y}[sc, \tau_1]$ and $\bar{y}[sc+1, \tau_1]$ will contain $\bar{c}_1$, the difference between the two vectors will contain a linear combination of $\bar{c}_2, \bar{c}_3, \ldots, \bar{c}_P$ given by $$\bar{y}_{diff}[sc, \tau_1] = \sum_{p=2}^{P} \bar{c}_p \left[e^{-j2\pi f_{sc_1}(\tau_p - \tau_1)} - e^{-j2\pi f_{sc_2}(\tau_p - \tau_1)}\right]$$

Collecting a set of N such vectors provides $$\bar{y}_{diff}[sc,\tau_1], \bar{y}_{diff}[sc+1,\tau_1], \ldots, \bar{y}_{diff}[sc+N-1,\tau_1]$$

with each difference vector being a different linear combination of $\bar{c}_2, \bar{c}_3, \ldots, \bar{c}_P$, but with no component of $\bar{c}_1$. Using Gram-Schmidt orthogonalization, we may produce an orthonormal basis $(\bar{v}_1, \ldots, \bar{v}_{N-1})$ from the set of difference vectors. We may then subtract the components of $\bar{c}[sc]$ that lie within the span of $(\bar{v}_1, \ldots, \bar{v}_{N-1})$ according to $$\bar{z} = \bar{c}[sc] - \sum_{n=1}^{N-1} \bar{v}_n^h \bar{c}[sc]$$

where $\bar{z}$ is the computed vector orthogonal to $\bar{c}_2, \bar{c}_3, \ldots, \bar{c}_P$. The weighting vector is formed by normalizing $\bar{z}$ according to $$\overline{w} = \frac{\overline{z}}{\sqrt{\overline{z}^h \overline{z}}}.$$

$\overline{w}$ can be used to determine the energy in $\overline{c}[sc]$ orthogonal to $\overline{c}_2, \overline{c}_3, \ldots, \overline{c}_P$ relative to the total energy in $\overline{c}[sc]$ using $$\frac{\overline{w}^h \overline{c}[sc]}{\sqrt{\overline{c}^h[sc]\overline{c}[sc]}}.$$

The above detection steps providing a relative power output is repeated at various assumed values of $\tau$ to detect what delays correspond to the relative power computation produces peaks across the spectrum of possible client device frequency offsets.

Figure 32:
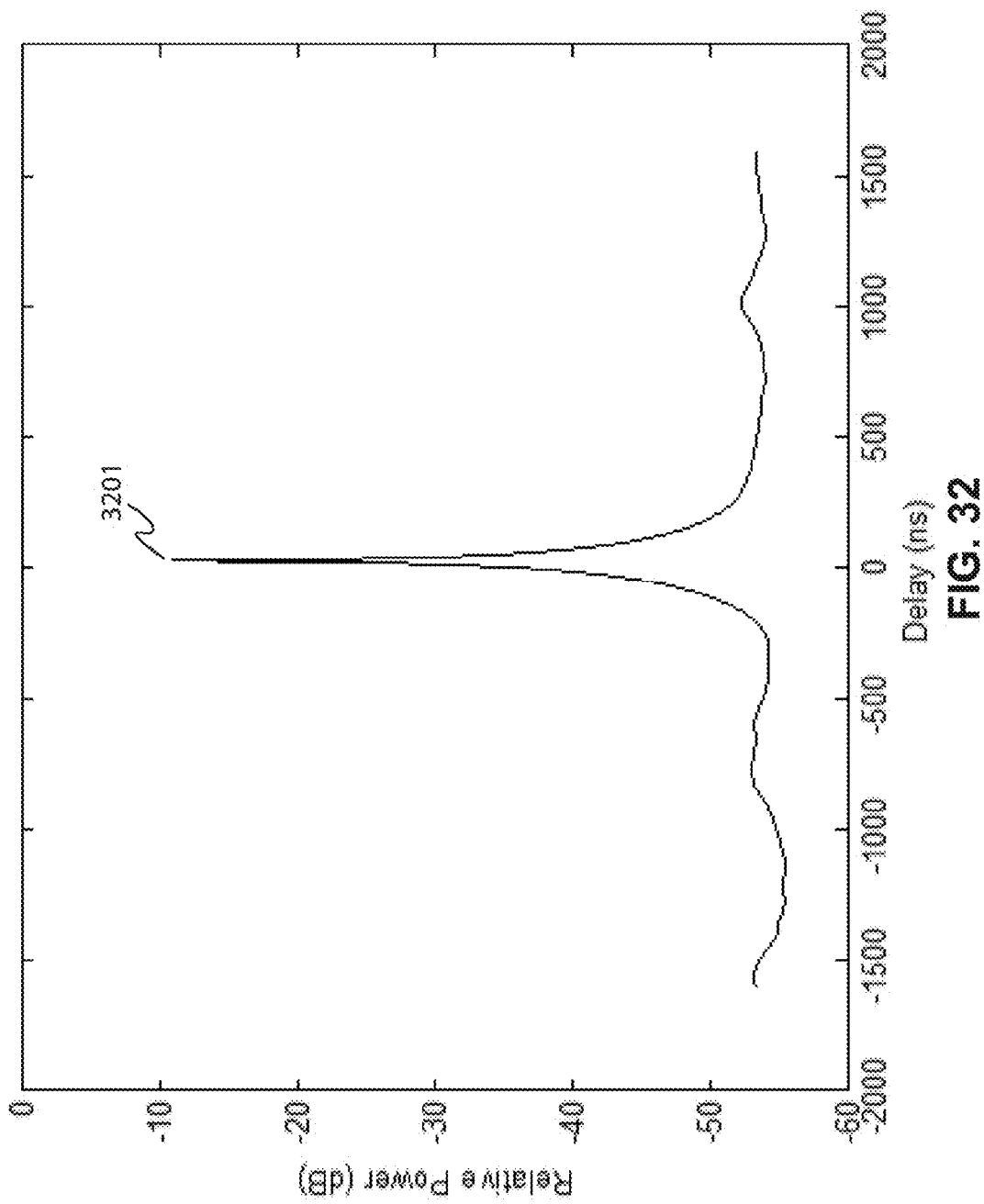
Figure 33:
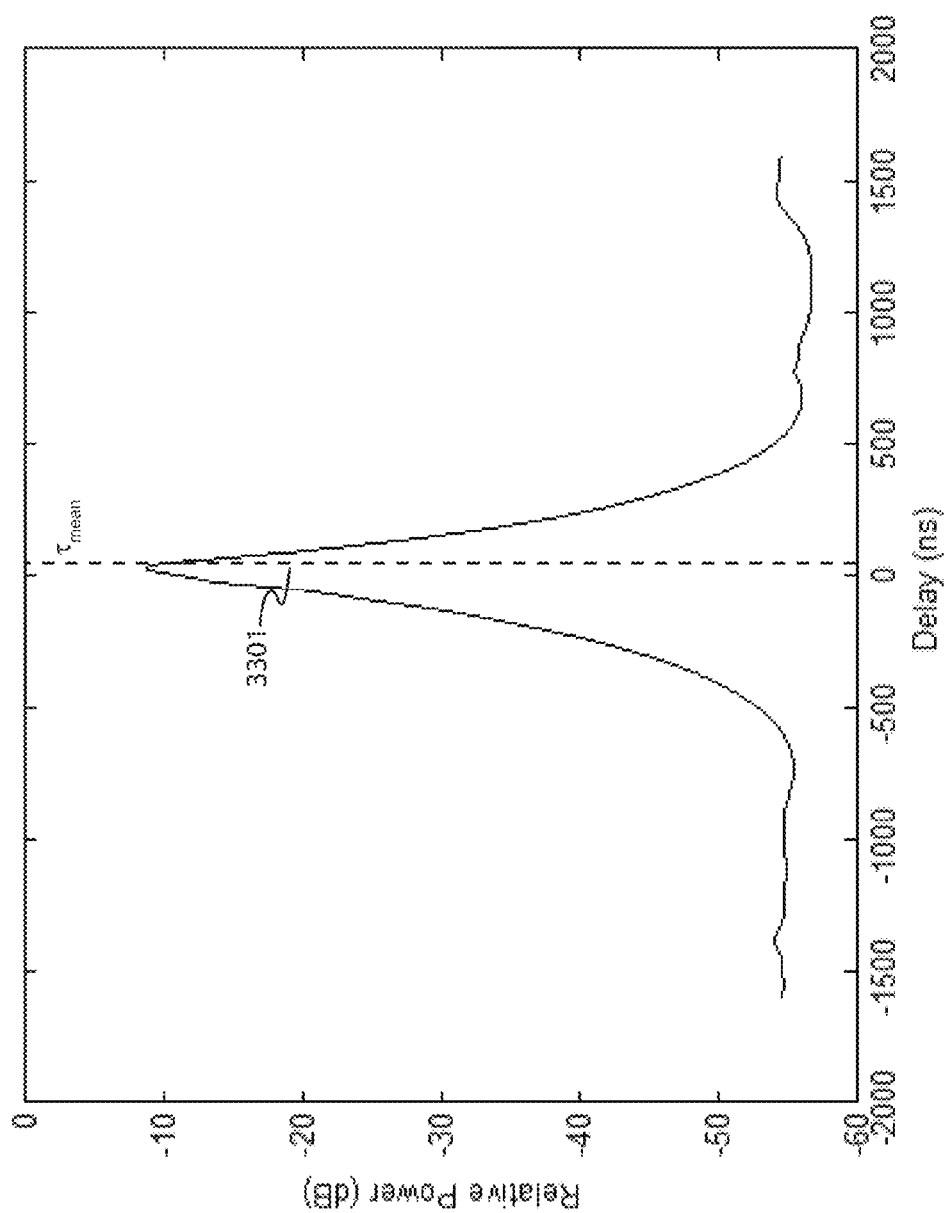
Figure 34:
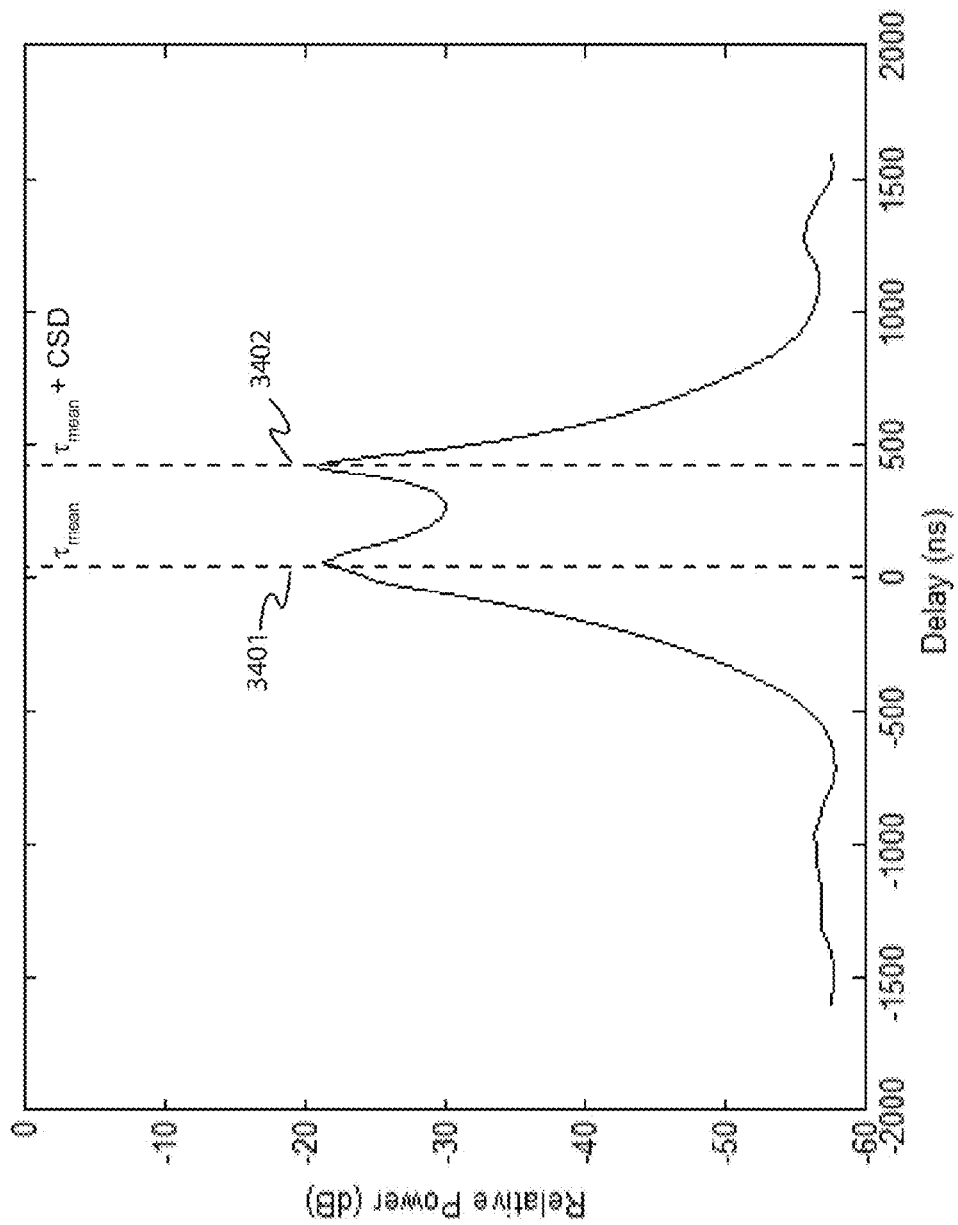
FIG. 34 and FIG. 35 illustrate how the ability to perform time of arrival estimation overcomes the complications of performing DL MU-MIMO to client devices with multiple antennas in accordance with some embodiments of the present invention.

FIG. 32 illustrates the output of the above methods in resolving the time of arrival of signal components of an 802.11 OFDM packet in a predominantly line of sight channel. The plot in FIG. 32 shows the relative output power versus delay value. In this case, there is a distinct peak 3201 in the delay profile corresponding to the predominant path. FIG. 33 illustrates the output of the above methods in resolving the time of arrival of signal components in an 802.11 OFDM packet in a channel with significantly more delay spread. As seen in FIG. 33, the peak is not as distinct as in FIG. 32 because there are a range of multi-path components now. The invention still allows for an approximation of $\tau_{mean}$ 3301 corresponding to approximate mean delay of the multi-path components. FIG. 34 illustrates the output of the above methods in resolving the time of arrival of multi-path components in an 802.11 OFDM packet in the same channel used in FIG. 33, but now with a two antenna WLAN client device. We now see two distinct peaks corresponding to the information transmitted from the two different antenna paths with one of the antennas having a CSD of 400 nS in this case. The invention determines the approximate delay associated with each signal from the two antennas as indicated by relative peak 3401 corresponding to $\tau_{mean}$ and relative peak 3402 corresponding to $\tau_{mean}$ +CSD.

The composite channel vector as a result of the signals from both client antennas 2904 and 2905 to the AP as illustrated in FIG. 29 at a particular subcarrier index may be written as $$\overline{c}_{comp}[sc] = \overline{c}_{ANT1}[sc] + \overline{c}_{ANT2}[sc]$$

where $\overline{c}_{comp}[sc]$ is the composite channel vector at a particular subcarrier index, $\overline{c}_{ANT1}[sc]$ is the channel vector associated with one of the antennas at a particular subcarrier index, and $\overline{c}_{ANT2}[sc]$ is the channel vector associated with the other antenna at a particular subcarrier index. Assuming the delay spread of the individual multi-paths are relatively small in comparison to the inverse of the subcarrier spacing, $\overline{c}_{ANT1}[sc]$ can be approximated by $$\overline{c}_{ANT1}[sc] \approx \overline{c}_{ANT1}[sc+1] e^{-j2\pi\Delta f \tau_{mean}}.$$

Likewise, $\overline{c}_{ANT2}[sc]$ can be approximated by $$\overline{c}_{ANT2}[sc] \approx \overline{c}_{ANT2}[sc+1] e^{-j2\pi\Delta f(\tau_{mean}+CSD)}.$$

Using the approximations for $\overline{c}_{ANT1}[sc]$ and $\overline{c}_{ANT2}[sc]$ and substituting into $$\overline{c}_{comp}[sc] - \overline{c}_{comp}[sc+1] e^{+j2\pi\Delta f \tau_{mean}}$$

produces $$\overline{c}_{ANT2}(1 - e^{-j2\pi\Delta f CSD}).$$

Solving for $\overline{c}_{ANT2}$ gives $$\overline{c}_{ANT2} = \frac{\overline{c}_{comp}[sc] - \overline{c}_{comp}[sc+1] e^{+j2\pi\Delta f \tau_{mean}}}{1 - e^{+j2\pi\Delta f CSD}}.$$

Similarly, using the approximations for $\overline{c}_{ANT1}[sc]$ and $\overline{c}_{ANT2}[sc]$ and substituting into $$\overline{c}_{comp}[sc] - \overline{c}_{comp}[sc+1] e^{+j2\pi\Delta f(\tau_{mean}+CSD)}$$

produces $$\overline{c}_{ANT1}(1 - e^{+j2\pi\Delta f CSD}).$$

Solving for $\overline{c}_{ANT1}$ gives $$\overline{c}_{ANT1} = \frac{\overline{c}_{comp}[sc] - \overline{c}_{comp}[sc+1] e^{+j2\pi\Delta f(\tau_{mean}+CSD)}}{1 + e^{+j2\pi\Delta f CSD}}.$$

Therefore, with knowledge of the composite channel using the methods described previously for resolving signals in the presence of interference along with the additional ability to determine the delay of signals associated with the various antenna elements, embodiments of the present invention have the ability to determine the individual channel vectors associated with each antenna of a multi-antenna device.

Figure 35:
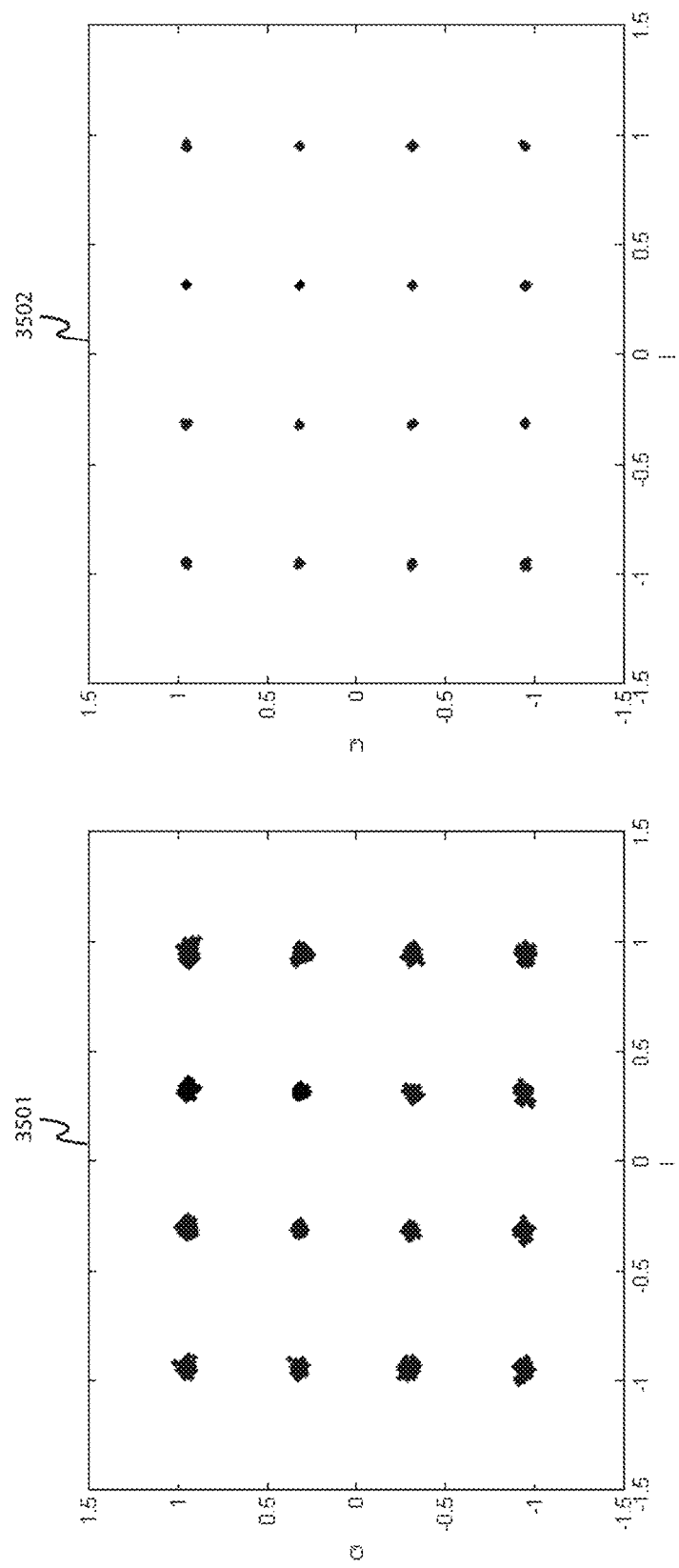

FIG. 35 shows the results of a test in which the methods described previously for DL MU-MIMO are used in a scenario such as FIG. 29. Both clients are at approximately the same distance from the AP and 3501 shows the received constellation for Client 1A 2902 and 3502 shows the received constellation for Client 1B 2903. Notice that in comparison to FIG. 30 in which no attempt was made to resolve the channel vectors of the individual antenna elements, FIG. 35 illustrates that both the constellation of the single antenna device 3501 and the constellation of the client with 2 antennas 3502 show low error indicating a much higher signal to interference ratio in comparison to previous results.

The disclosed method enables receiving a plurality of packets received simultaneously. In some cases, the plurality of simultaneously received packets will include one or more packets intended for the receiver and one or more packets not intended for the receiver. It may be advantageous to reduce complexity or processing requirements for the receiver to only attempt to demodulate the packets intended for it rather than attempting to demodulate all packets. Enabling the receiver to know which packets to demodulate and which packets can be discarded without needing to demodulate each packet may be accomplished in one of several methods as described below.

Figure 36:
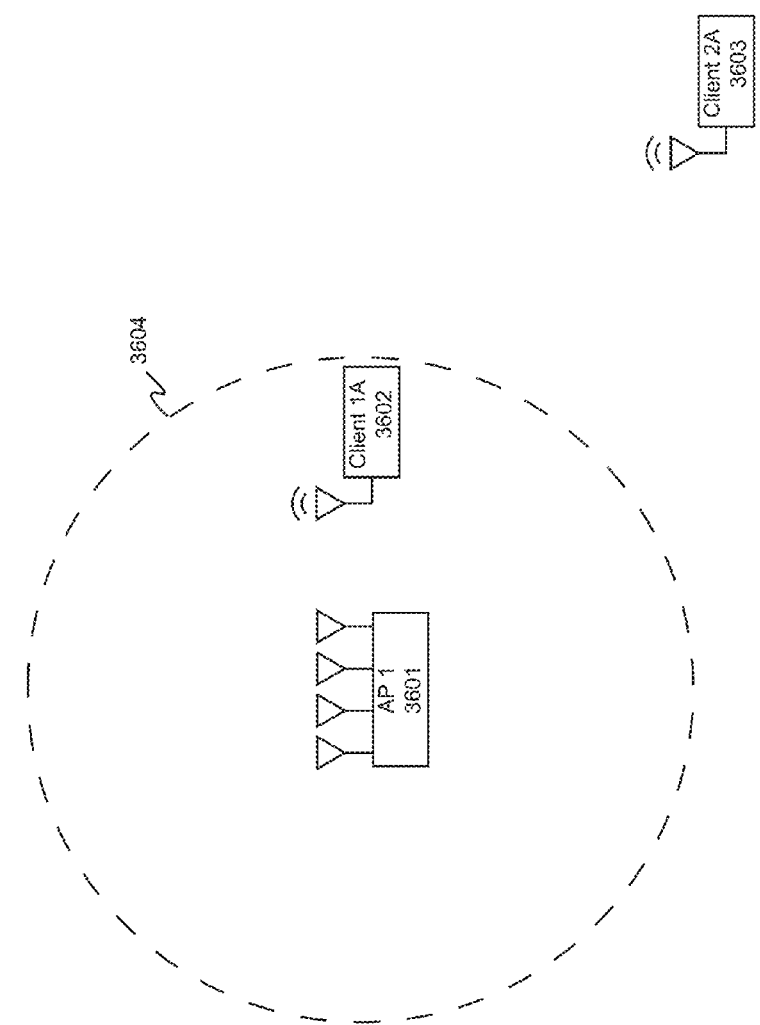
FIG. 36, FIG. 37, and FIG. 38 illustrate methods of enabling a receiver to discern packets of interest from packets that are not of interest when multiple packets are received simultaneously, in accordance with some embodiments of the present invention.

The disclosed method has the ability to discern packets during the detection process based on relatively small differences in timing offset or frequency offset as explained in FIG. 3, FIG. 4, FIG. 5, FIG. 6, FIG. 7, FIG. 8, and FIG. 9. Consider FIG. 36 in which AP 1 3601 is receiving while signals from Client 1A 3602 and Client 2A 3603 are transmitted. Client 1A 3602 is within the intended coverage area 3604 of AP 1 3601 and therefore likely associated to AP 1 3601 while Client 2A 3603 is outside the intended coverage area 3604 and therefore likely not associated to AP 1 3601.

Therefore, AP 1 3601 would generally want to receive the packet originating from Client 1A 3602 while not wanting to receive the packet from Client 2A 3603. Wireless devices generally derive their center frequency from a reference clock which has some uncertainty which results in some frequency offset between the center frequency of the signal originating from the device and the ideal channel center frequency. Although all devices do have some frequency offset due to the uncertainty of the reference clock, the frequency offset of the devices tend to remain relatively stable if observed over a relatively short time interval. For example, if the frequency offset of a Client 1A 3602 is +31.32 kHz from the ideal channel center frequency, the frequency offset of the device would tend to remain very close to +31.32 kHz if checked at some small time later. AP 1 3601 may keep track of the frequency offset of previously received packets from Client 1A 3602. Upon reception of packets arriving simultaneously from Client 1A 3602 and Client 2A 3603, AP1 3601 could determine if the frequency offset of one of the detected packets matches the expected frequency offset of Client 1A 3602. If the frequency offset of a detected packet matches Client 1A 3602, and attempt would be made to demodulate that packet whereas other detected packets such as those originating from Client 2A 3606 would be discarded or decoded at a lower priority. This approach could be extended to multiple client devices associated to AP 1 3601 by AP 1 3601 tracking the frequency offsets of all associated client devices.

Alternatively, Client 1A 3602 could assist AP 1 3601 by matching the frequency offset of AP 1 3601. In general, a client device will regularly receive beacon packets from the various APs within range of the client device. Given that WLAN receivers typically also determine the frequency offset of a packet prior to demodulating it, a client device generally knows or could be easily modified to know the frequency offset of the AP it is associated to. The client device could further be modified to apply a frequency offset to the transmitted packet such that it matches that of the associated AP. Client 1A 3602 would therefore determine the frequency offset of AP 1 3601 and utilize that same frequency offset when transmitting packets destined for AP 1 3601. By doing so, AP 1 3601 would know that packets received with a frequency offset matching its own frequency offset are also the packets that should be demodulated whereas packets received not matching its own frequency offset could be discarded or demodulated at a lower priority.

Figure 37:
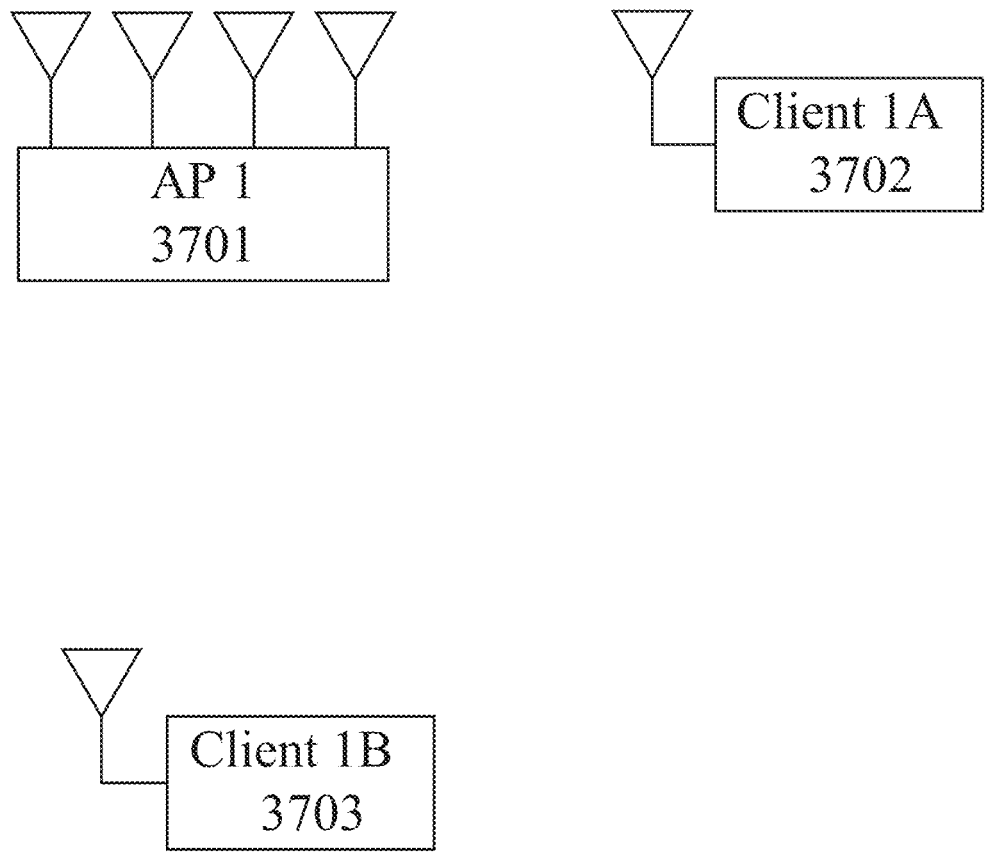

In the case where the AP has multiple client devices within its cell that it wishes to receive signals from simultaneously, the AP could additionally instruct the various client devices to each operate on one of or both a unique time offset or frequency offset relative to the AP itself. Consider FIG. 37 in which AP 1 3701 expects to sometimes receive packets from Client 1A 3702 and Client 1B 3703 simultaneously. AP 1 3701 could instruct both Client 1A 3702 and Client 1B 3703 to utilize one of or both a unique timing offset or frequency offset. This would ensure AP 1 3701 could discern packets originating from Client 1A 3702 versus packets from Client 1B 3703 without needing to demodulate each of the packets. Upon packet detection of multiple simultaneously received packets, AP 1 3701 could determine if any of the detected packets matches one of or both the timing offset or frequency offset associated with Client 1A 3702 or Client 1B 3703. AP 1 3701 could then prioritize reception of certain higher priority packets of packets associated to it while also discarding or demodulating at a lower priority packets not associated with one of or both a timing offset or frequency offset specified by AP 1 3701.

Figure 38:
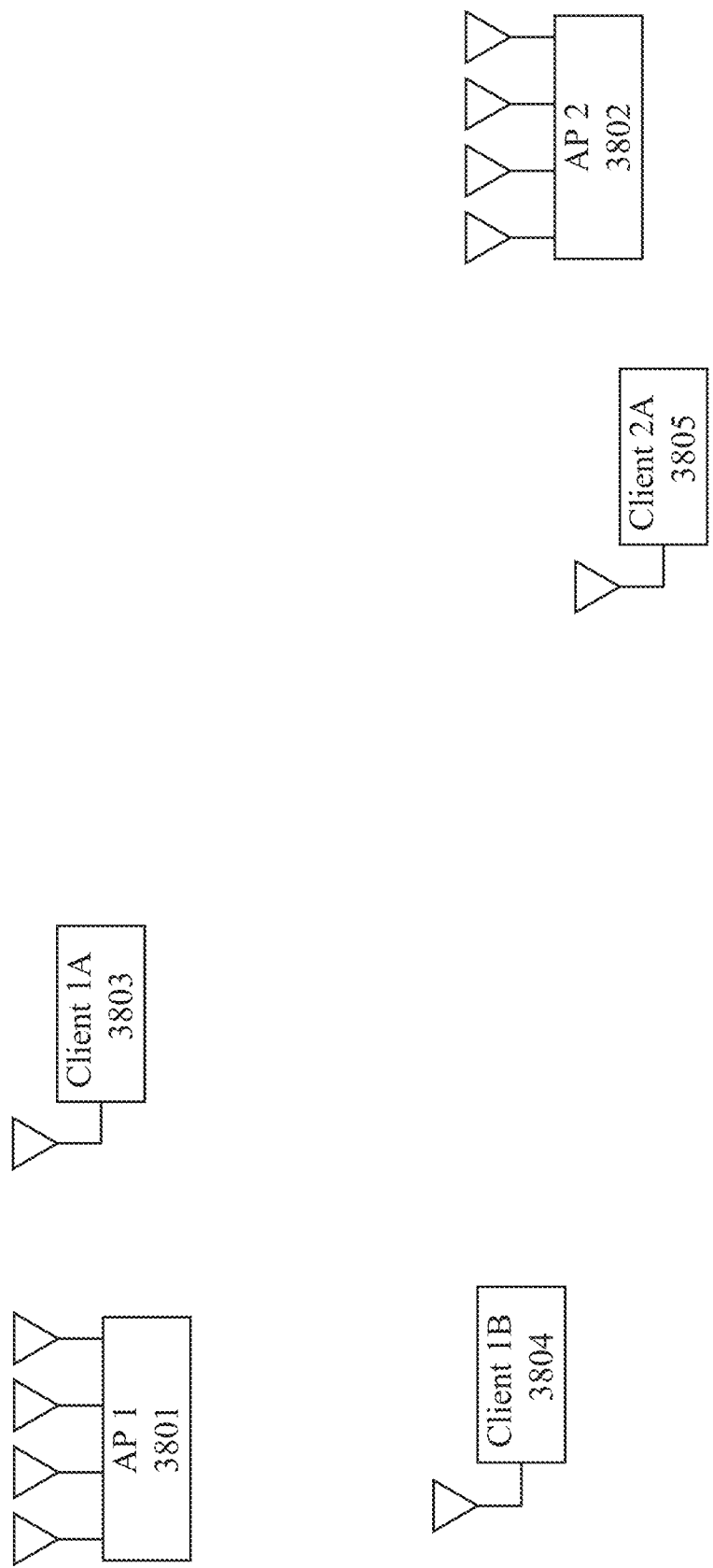

In the case where multiple APs are deployed and each AP has the ability to receive multiple packets simultaneously, it would be desirable for each AP to operate on one of or both a unique timing offset or frequency offset. Consider FIG. 38 in which AP 1 3801 and AP 2 3802 both have the ability to receive multiple packets simultaneously. Client 1A 3803 and Client 1B 3804 are associated with AP 1 3801 and therefore all packets originating from Client 1A 3803 and Client 1B 3804 would be destined for AP 1 3801. Similarly Client 2A 3805 is associated to AP 2 3802 and therefore all packets originating from Client 2A 3805 would be destined from AP 2 3802. Assuming Client 1A 3803 and Client 1B 3804 either match the frequency offset to that of AP 1 3801 or utilize one of or both a unique timing offset or frequency offset as instructed by AP 1 3801, AP 1 3801 would be able to discern packets originating from Client 1A 3803 and Client 1B 3804 from other packets received simultaneously without needing to demodulate all of the packets. Likewise, AP 2 3802 having Client 2A 3805 either matching the frequency offset to that of AP 2 3802 or utilizing one of or both a unique timing offset or frequency offset as instructed by AP 2 3802, AP2 3802 would be able to discern packets originating from Client 2A 3805 without needing to demodulate all packets received simultaneously. The determination of one of or both a unique timing offset or frequency offset for each AP may be accomplished in multiple ways including, but not limited to, a separate network device such as a network controller assigning one of or both a unique timing offset or unique frequency offset to each AP, the various APs communicating either over the wireless or wired medium to negotiate one of or both a unique timing offset or frequency offset for each AP, or each AP may scan the wireless medium to find one of or both an unoccupied timing offset or frequency offset. Furthermore, if the various APs instruct their associated client devices to operate on one of or both a unique time offset or frequency offset, the APs would additionally negotiate which time offsets or frequency offsets would be utilized by each AP.

The embodiments of the present invention may be embodied as methods, apparatus, electronic devices, and/or computer program products. Accordingly, the embodiments of the present invention may be embodied in hardware and/or in software (including firmware, resident software, microcode, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit embodiments of the present invention to the precise forms disclosed. Many modifications and variations are possible in view of the above teachings. The embodiments were chosen and described in order to best explain the principles of the present disclosure and its practical applications, to thereby enable others skilled in the art to best utilize embodiments of the present invention and various embodiments with various modifications as may be suited to the particular use contemplated.

FIG. 39 depicts a computer system 3900 that can be utilized in various embodiments of the present invention to implement the computer and/or the display, according to one or more embodiments.

Various embodiments of method and apparatus for organizing, displaying and accessing contacts in a contact list, as described herein, may be executed on one or more computer systems, which may interact with various other devices. One such computer system is computer system 3900 illustrated by FIG. 39, which may in various embodiments implement any of the elements or functionality illustrated in the Figures included herein. In various embodiments, computer system 3900 may be configured to implement methods described above. The computer system 3900 may be used to implement any other system, device, element, functionality or method of the above-described embodiments. In the illustrated embodiments, computer system 3900 may be configured to implement the methods described herein as processor-executable executable program instructions 3922 (e.g., program instructions executable by processor(s) 3910) in various embodiments.

In the illustrated embodiment, computer system 3900 includes one or more processors 3910a-3910n coupled to a system memory 3920 via an input/output (I/O) interface 3930. Computer system 3900 further includes a network interface 3940 coupled to I/O interface 3930, and one or more input/output devices 3950, such as cursor control device 3960, keyboard 3970, and display(s) 3980. In various embodiments, any of the components may be utilized by the system to receive user input described above. In various embodiments, a user interface may be generated and displayed on display 3980. In some cases, it is contemplated that embodiments may be implemented using a single instance of computer system 3900, while in other embodiments multiple such systems, or multiple nodes making up computer system 3900, may be configured to host different portions or instances of various embodiments. For example, in one embodiment some elements may be implemented via one or more nodes of computer system 3900 that are distinct from those nodes implementing other elements. In another example, multiple nodes may implement computer system 3900 in a distributed manner.

In different embodiments, computer system 3900 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 3900 may be a uniprocessor system including one processor 3910, or a multiprocessor system including several processors 3910 (e.g., two, four, eight, or another suitable number). Processors 3910 may be any suitable processor capable of executing instructions. For example, in various embodiments processors 3910 may be general-purpose or embedded processors implementing any of a variety of instruction set architectures (ISAs). In multiprocessor systems, each of processors 3910 may commonly, but not necessarily, implement the same ISA.

System memory 3920 may be configured to store program instructions 3922 and/or data 3932 accessible by processor 3910. In various embodiments, system memory 3920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 3920. In other embodiments, program instructions and/or data may be received, sent or stored upon different types of computer-accessible media or on similar media separate from system memory 3920 or computer system 3900.

In one embodiment, I/O interface 3930 may be configured to coordinate I/O traffic between processor 3910, system memory 3920, and any peripheral devices in the device, including network interface 3940 or other peripheral interfaces, such as input/output devices 3950. In some embodiments, I/O interface 3930 may perform any necessary protocol, timing or other data transformations to convert data signals from one component (e.g., system memory 3920) into a format suitable for use by another component (e.g., processor 3910). In some embodiments, I/O interface 3930 may include support for devices attached through various types of peripheral buses, such as a variant of the Peripheral Component Interconnect (PCI) bus standard or the Universal Serial Bus (USB) standard, for example. In some embodiments, the function of I/O interface 3930 may be split into two or more separate components, such as a north bridge and a south bridge, for example. Also, in some embodiments some or all of the functionality of I/O interface 3930, such as an interface to system memory 3920, may be incorporated directly into processor 3910.

Network interface 3940 may be configured to allow data to be exchanged between computer system 3900 and other devices attached to a network (e.g., network 3990), such as one or more external systems or between nodes of computer system 3900. In various embodiments, network 3990 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 3940 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 3950 may, in some embodiments, include one or more display terminals, keyboards, keypads, touchpads, scanning devices, voice or optical recognition devices, or any other devices suitable for entering or accessing data by one or more computer systems 3900. Multiple input/output devices 3950 may be present in computer system 3900 or may be distributed on various nodes of computer system 3900. In some embodiments, similar input/output devices may be separate from computer system 3900 and may interact with one or more nodes of computer system 3900 through a wired or wireless connection, such as over network interface 3940.

In some embodiments, the illustrated computer system may implement any of the operations and methods described above. In other embodiments, different elements and data may be included.

Those skilled in the art will appreciate that computer system 3900 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 3900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 3900 may be transmitted to computer system 3900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer-implemented method for simultaneous communication with multiple wireless communication devices, the method comprising:
    applying, by a plurality of wireless stations, at least one of a unique timing offset or a unique frequency offset to each packet of a plurality of packets transmitted by each of the plurality of wireless stations within a first wireless channel relative to a frequency offset of a first wireless station intended to receive the plurality of packets;
    receiving, using a plurality of antennas at the first wireless station, the plurality of packets, wherein each of the plurality of packets include orthogonal frequency division multiplexing (OFDM) wireless signals, wherein the plurality of packets are received simultaneously from the plurality of wireless stations, and wherein each of the simultaneously received packets includes a plurality of frequency tones;
    frequency domain transform the received packets;
    grouping frequency domain transform outputs for each subcarrier;
    determining a difference between subcarrier groups formed over different sample sets; and
    determining a set of weights for each subcarrier, wherein the weights are selected such that the first wireless station can at least one of detect or demodulate the received plurality of packets, wherein the first wireless station assigns unique frequency offsets or timing offsets to a plurality of other wireless stations permitting the first wireless station to determine which packets originate from which wireless station without needing to demodulate each packet while also ensuring each packet has the frequency offset.

2. The computer-implemented method of claim 1, wherein the plurality of packets substantially conform to an OFDM variant of an IEEE 802.11 standard.

3. The computer-implemented method of claim 2, wherein the OFDM wireless signals simultaneously received do not require any frequency or timing alignment beyond what is specified by the IEEE 802.11 standard.

4. The computer-implemented method of claim 3, where the first wireless station is an access point.

5. The computer-implemented method of claim 3, where the first wireless station is a collection of distributed elements capable of receiving radio frequency signals and transferring signal information to a central unit for processing.

6. The computer-implemented method of claim 3, wherein individual packets can be resolved without information regarding phase or amplitude changes caused by a wireless medium used for transmission of the wireless signals.

7. The computer-implemented method of claim 3, wherein the receiver relies only on information available in a long symbol for computing weighting vectors used to resolve the signal from other interfering sources.

8. The computer-implemented method of claim 1, wherein the plurality of packets substantially conform to an OFDM variant of the LTE (3GPP TS 36) standard.

9. The computer-implemented method of claim 1, wherein individual multiple stations, each with the capability of transmitting and receiving signals to an associated plurality of other wireless stations, are assigned the timing offset or frequency offset ensuring that each of the individual wireless stations can demodulate the packets intended for that individual wireless station without needing to demodulate all of the packets present in the wireless channel.

10. A system for simultaneous communication with multiple wireless communication devices, the system comprising:
    a first wireless station comprising:
    a plurality of antennas configured to detect a plurality of packets simultaneously received from a plurality of other wireless stations in which the plurality of other wireless stations adjust at least one of a timing offset or a frequency offset of their transmitted signal relative to at least one of a timing offset or a frequency offset of the first wireless station;
    a plurality of RF nodes each coupled to at least one of the plurality of antennas, wherein each of the RF nodes performs signal packaging and unpackaging of the plurality of packets; and
    at least one aggregator communicatively coupled to the plurality of RF nodes, wherein the at least one aggregator is configured to process the plurality of packets received simultaneously without a-priori information obtained from demodulation of previous packets received from the plurality of other wireless stations, wherein the at least one aggregator is configured to: frequency domain transform the received packets, group frequency domain transformed outputs for each subcarrier, determine a difference between subcarrier groups formed over different sample sets, and determine a set of weights for each subcarrier, wherein the weights are selected such that the first wireless station can at least one of detect or demodulate the received plurality of packets.

11. The system of claim 10, wherein each of the simultaneously transmitted packets is comprised of orthogonal frequency division multiplexing (OFDM) wireless signals and includes a plurality of frequency tones.

12. The system of claim 10, where the first wireless station is an access point.

13. The system of claim 10, where the first wireless station is a collection of distributed elements capable of receiving radio frequency signals and transferring signal information to a central unit for processing.

14. The system of claim 10, wherein a wireless station intending to communicate with the first wireless station is configured to align the frequency offset of transmitted packets to match the frequency offset of the first wireless station permitting the first wireless station to determine which packets are intended for the first wireless station without needing to demodulate each packet.

15. A computer-implemented method for simultaneous communication with multiple wireless communication devices, the method comprising:
    receiving, by a first wireless station from a plurality of wireless stations within a first wireless channel and using a plurality of antennas, a plurality of packets each packet having at least one of a unique timing offset or a unique frequency offset relative to a frequency offset of the first wireless station, wherein each packet of the plurality of packets include orthogonal frequency division multiplexing (OFDM) wireless signals, wherein the plurality of packets are received simultaneously from the plurality of wireless stations, and wherein each of the simultaneously received packets includes a plurality of frequency tones;
    frequency domain transform the received packets;
    grouping frequency domain transform outputs for each subcarrier;
    determining a difference between subcarrier groups formed over different sample sets; and
    determining a set of weights for each subcarrier, wherein the weights are selected such that the first wireless station can at least one of detect or demodulate the received plurality of packets,
    wherein the first wireless station assigns unique frequency offsets or timing offsets to a plurality of other wireless stations permitting the first wireless station to determine which packets originate from which wireless station without needing to demodulate each packet while also ensuring each packet has the frequency offset.

* * * * *